(12) United States Patent
Otsuki et al.

(10) Patent No.: US 7,545,781 B2
(45) Date of Patent: Jun. 9, 2009

(54) WIRELESS PACKET COMMUNICATION METHOD AND WIRELESS PACKET COMMUNICATION APPARATUS

(75) Inventors: Shinya Otsuki, Yokohama (JP);
Tomoaki Kumagai, Yokosuka (JP);
Kengo Nagata, Yokohama (JP);
Kazuyoshi Saito, Hachioji (JP); Satoru Aikawa, Yokohama (JP); Yasuhiko Inoue, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 527 days.

(21) Appl. No.: 10/549,242

(22) PCT Filed: Jul. 14, 2004

(86) PCT No.: PCT/JP2004/010355

§ 371 (c)(1),
(2), (4) Date: Sep. 12, 2005

(87) PCT Pub. No.: WO2005/006660

PCT Pub. Date: Jan. 20, 2005

(65) Prior Publication Data
US 2007/0019592 A1 Jan. 25, 2007

(30) Foreign Application Priority Data

| Jul. 14, 2003 | (JP) | ............................. 2003-196301 |
| Sep. 30, 2003 | (JP) | ............................. 2003-341315 |
| Sep. 30, 2003 | (JP) | ............................. 2003-341316 |
| Mar. 23, 2004 | (JP) | ............................. 2004-084302 |
| May 17, 2004 | (JP) | ............................. 2004-146345 |

(51) Int. Cl.
*H04Q 7/24* (2006.01)

(52) U.S. Cl. ...................... 370/338; 370/445; 370/448; 370/341; 370/329; 455/509

(58) Field of Classification Search ................. 370/322, 370/324, 328–338, 346, 459, 445–456, 458, 370/341; 455/450, 509, 513, 517, 524, 63.1, 455/67.13
See application file for complete search history.

(56) References Cited

U.S. PATENT DOCUMENTS 5,159,702 A * 10/1992 Aratake ...................... 455/464

(Continued)

FOREIGN PATENT DOCUMENTS

| JP | 2001-053745 A | 2/2001 |
| JP | 2003-124938 A | 4/2003 |

OTHER PUBLICATIONS

International Standard ISO/IEC 8802-11 ANSI/IEEE Std 802.11, 1999 edition, Information technology—Telecommunications and information exchange between systems—Local and metropolitan area networks—Specific requirements—Part 11: Wireless LAN Medium Access Control (MAC) and Physical Layer (PHY) specifications.

(Continued)

*Primary Examiner*—Kamran Afshar
(74) *Attorney, Agent, or Firm*—Harness, Dickey & Pierce, P.L.C.

(57) ABSTRACT

A transmit-side STA transmits a wireless packet using a wireless channel which has been determined to be idle by both a physical carrier sense for determining based on received power whether the wireless channel is busy or idle and a virtual carrier sense for determining the wireless channel to be busy during set transmission inhibition time. At this time, the transmit-side STA sets transmission time used for the virtual carrier sense to a paired wireless channel which is affected by leakage from a transmitting wireless channel. This allows for setting transmission inhibition time to a paired wireless channel even when the paired wireless channel cannot successfully receive due to the effect caused by leakage from the transmitting wireless channel.

34 Claims, 46 Drawing Sheets

U.S. PATENT DOCUMENTS

| | | | | |
|---|---|---|---|---|
| 5,870,388 | A * | 2/1999 | Yung et al. | 370/347 |
| 6,192,053 | B1 * | 2/2001 | Angelico et al. | 370/448 |
| 2002/0181492 | A1 * | 12/2002 | Kasami et al. | 370/445 |
| 2004/0203383 | A1 * | 10/2004 | Kelton et al. | 455/519 |
| 2005/0201314 | A1 * | 9/2005 | Hirano | 370/315 |
| 2006/0109813 | A1 * | 5/2006 | Saito et al. | 370/329 |
| 2006/0154628 | A1 * | 7/2006 | Mochizuki | 455/134 |
| 2006/0209874 | A1 * | 9/2006 | Nagata | 370/445 |

OTHER PUBLICATIONS

IEEE Std 802.11-1997, Information technology—Telecommunications and information exchange between systems—Local and metropolitan area networks—specific requirements—Part 11: Wireless LAN Medium Access Control (MAC) and Physical Layer (PHY) specifications.

Low-powered Data Communication System/Broadband Mobile Access Communication System (CSMA) standard, ARIB STD-T71 version 1.0, Association of Radio Industries and Businesses (with English Translation), issued in year 2000.

Kurosaki et al., "100Mbit/s SDM-COFDM over MIMO Channel for Broadband Mobile Communications", Technical Report of The Institute of Electronics, Information and Communication Engineers, A P2001-96, RCS2001-135, Oct. 2001.

* cited by examiner

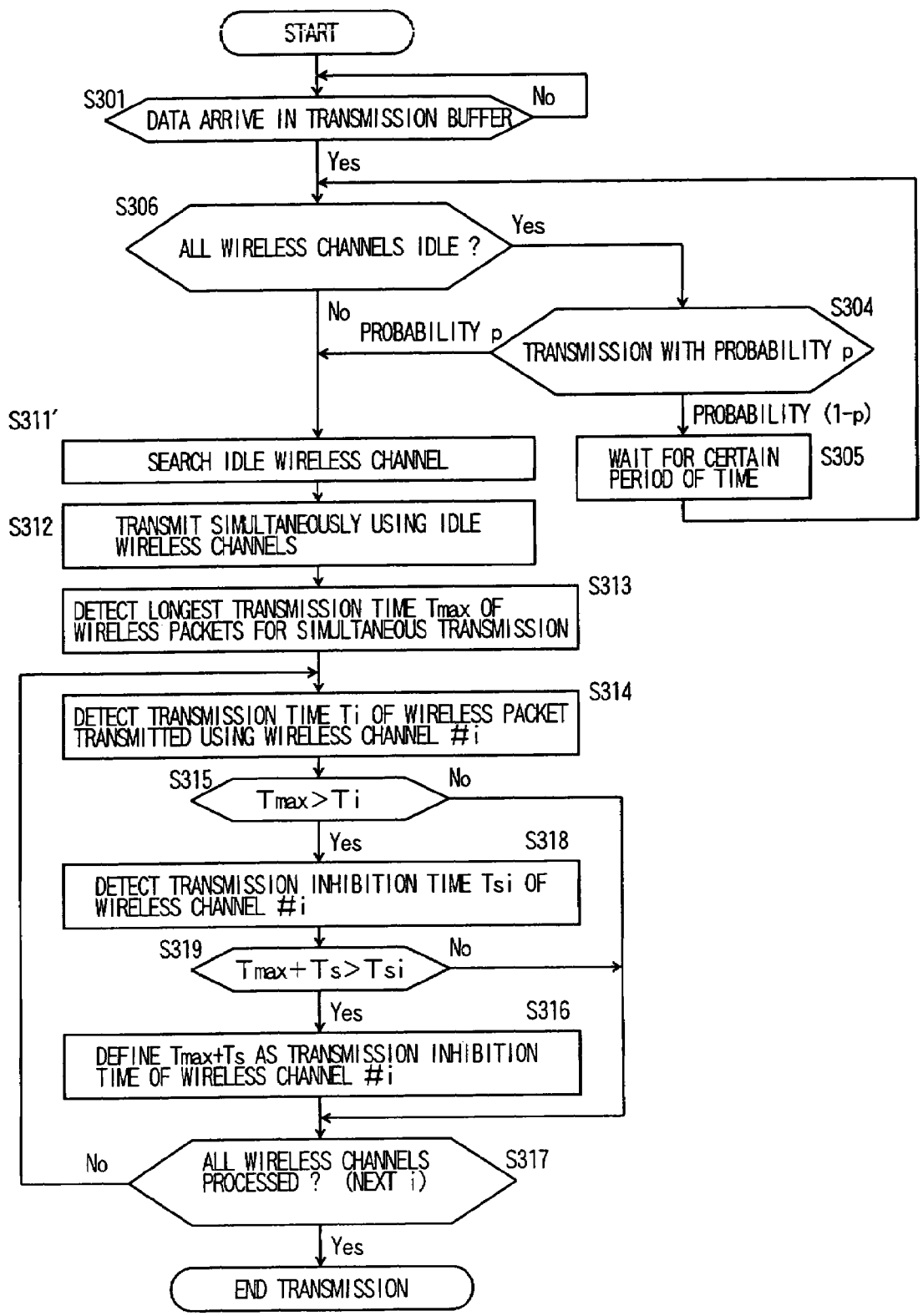

F I G. 3 8
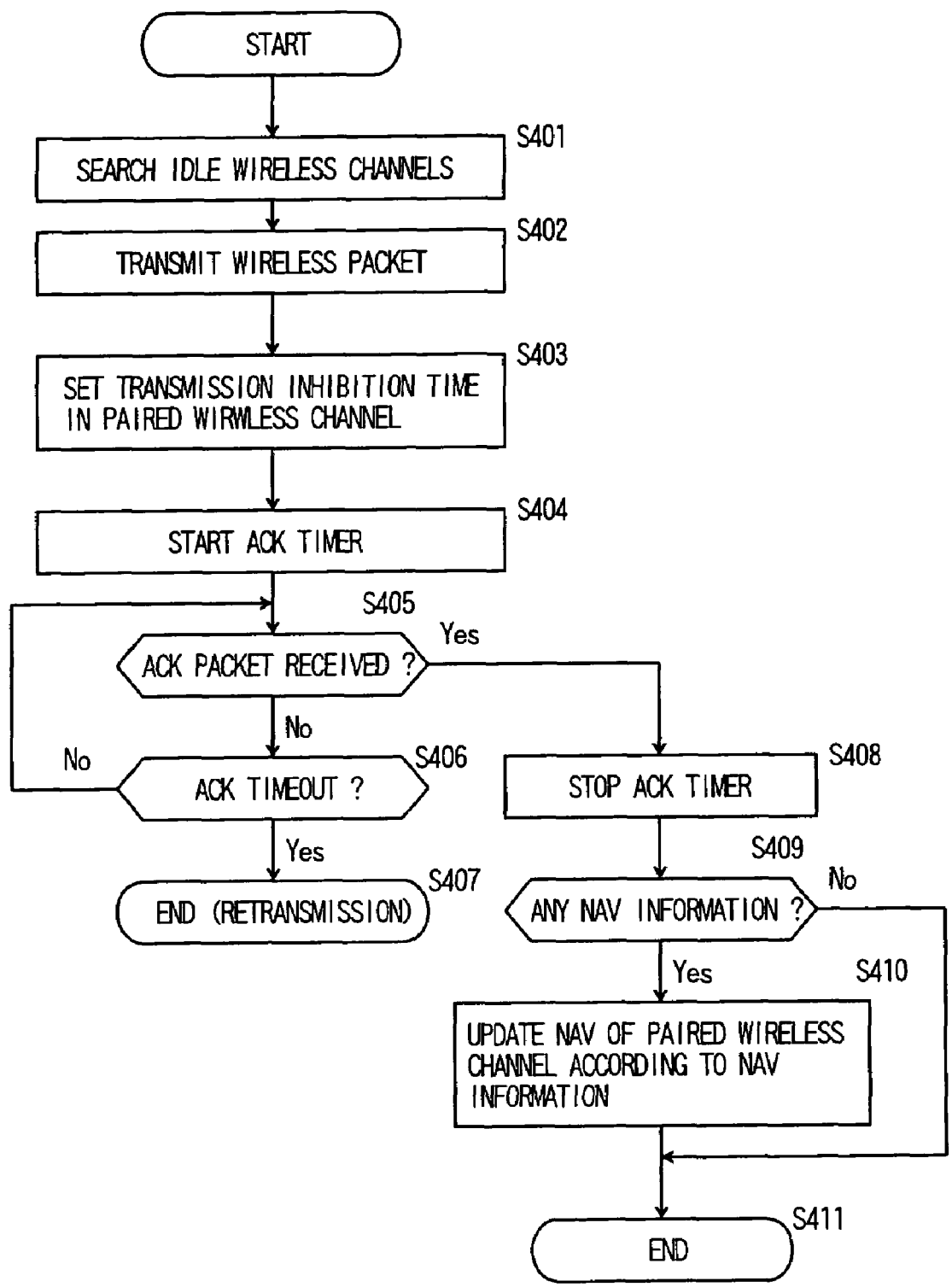

FIG. 40
(1)
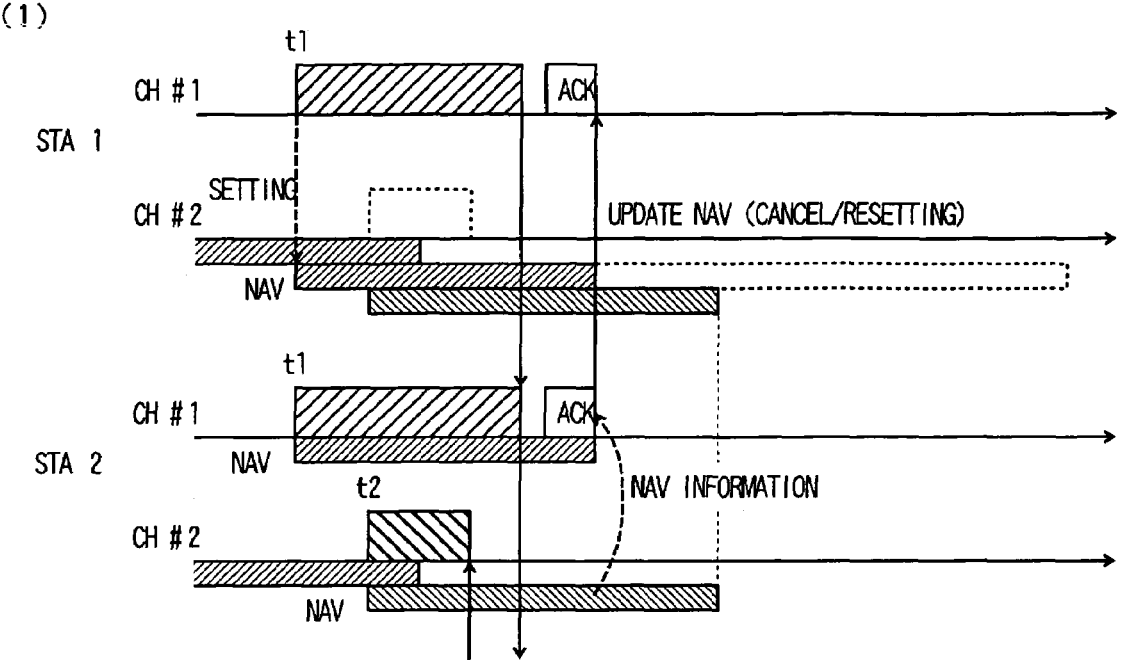
(2)
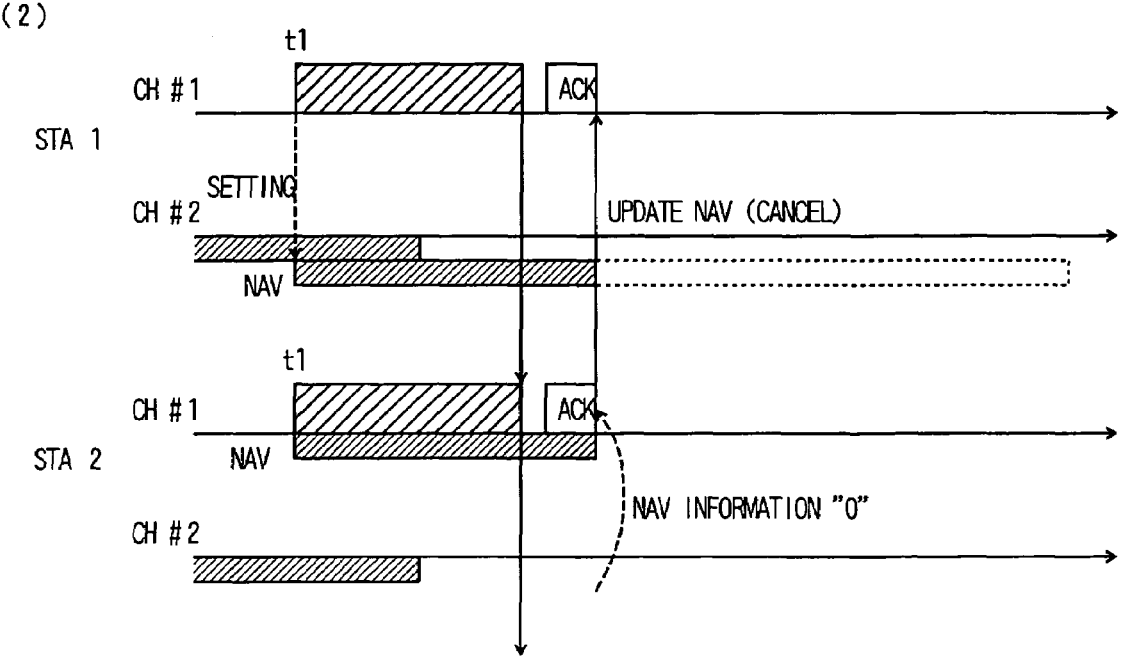

FIG. 43
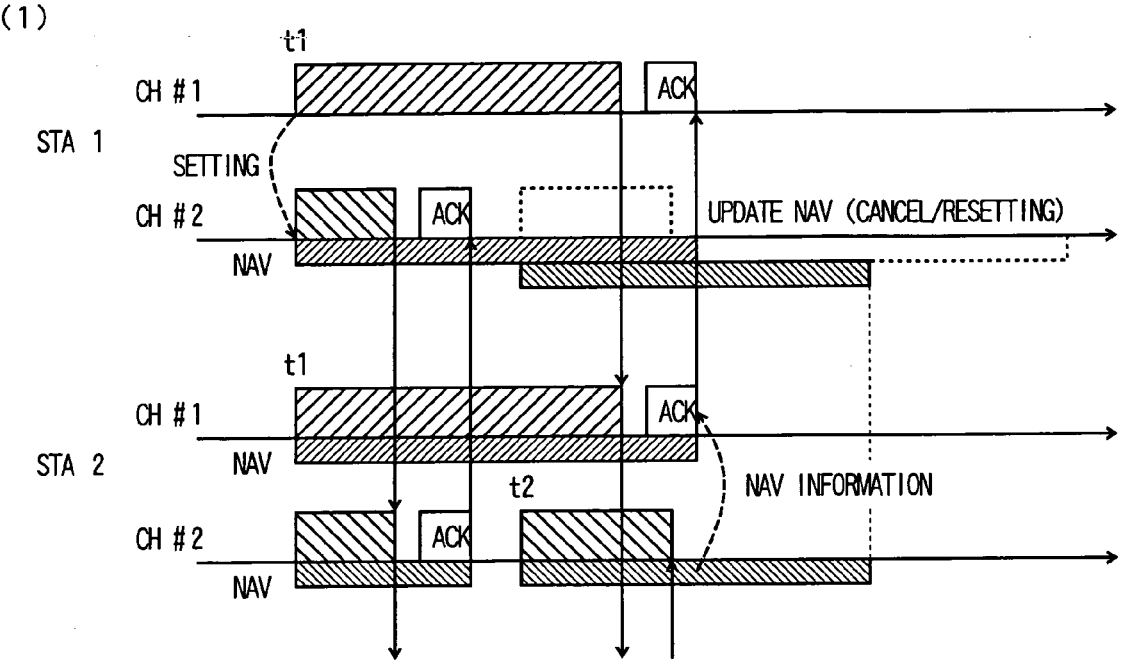
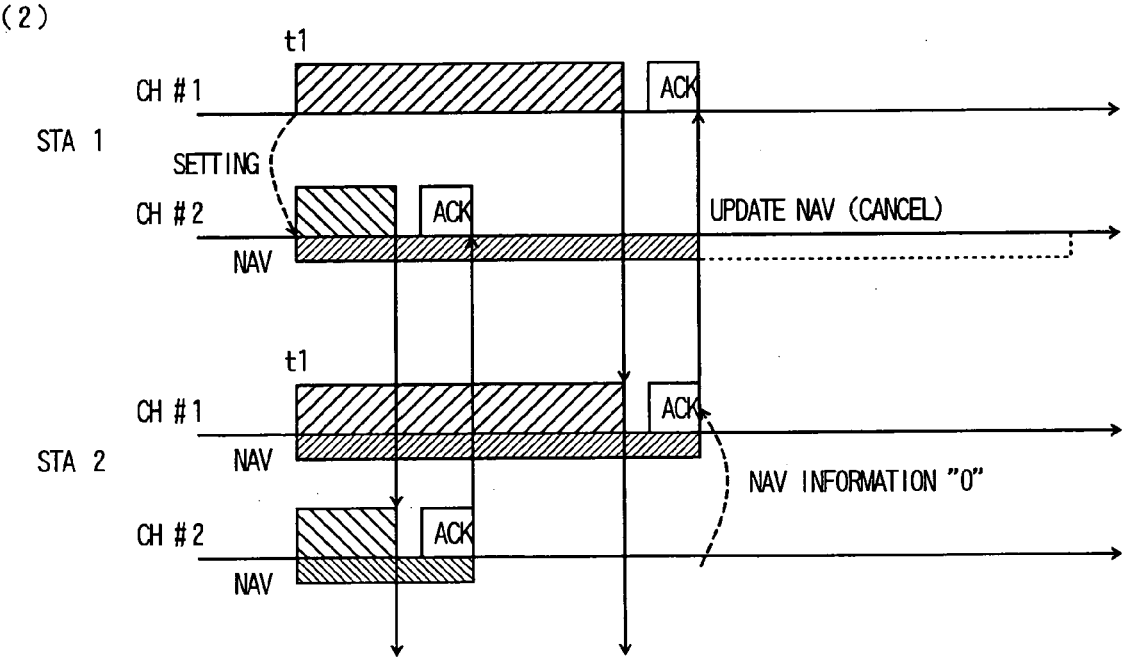

WIRELESS PACKET COMMUNICATION METHOD AND WIRELESS PACKET COMMUNICATION APPARATUS

CROSS-REFERENCE TO RELATED APPLICATION

This application is based upon and claims the benefit of priority from Japanese Patent Application No. 2003-196301, filed Jul. 14, 2003, Application No. 2003-341315, filed Sep. 30, 2003, Application No. 2003-341316, filed Sep. 30, 2003, Application No. 2004-084302, filed Mar. 23, 2004, and Application No. 2004-146345, filed May 17, 2004, the entire contents of which are incorporated herein by reference.

TECHNICAL FIELD

The present invention relates to a method and an apparatus for wireless packet communication in which multiple wireless channels are used to transmit a wireless packet.

The present invention also relates to a method and an apparatus for wireless packet communication in which multiple wireless channels are used to transmit a plurality of wireless packets simultaneously.

BACKGROUND ART

Conventional wireless packet communication apparatuses are adapted to proactively determine only one wireless channel to be used and detect prior to the transmission of a wireless packet whether or not the wireless channel is idle (or performs carrier sense), then transmitting one wireless packet only when the wireless channel is idle. Such transmission control by carrier sense allowed one wireless channel to be shared among a plurality of stations (hereinafter, STAs) on a time division basis ((1), International Standard ISO/IEC 8802-11 ANSI/IEEE Std. 802.11, 1999 edition, Information technology—Telecommunications and information exchange between systems—Local and metropolitan area networks—Specific requirements—Part 11: Wireless LAN Medium Access Control (MAC) and Physical Layer (PHY) specifications: (2) "Low-powered Data Communication System/Broadband Mobile Access Communication System (CSMA) Standard", ARIB STD-T71 version 1.0, Association of Radio Industries and Businesses, settled in 2000).

More specifically, the method of carrier sense used includes the following two types: one is a physical carrier sense method in which the received power of a wireless channel is measured using an RSSI (Received Signal Strength Indication) or the like to detect whether or not another station is using the wireless channel to transmit a wireless packet. The other is a virtual carrier sense method in which the occupied time of a wireless channel to be used in transmission and reception of a wireless packet described in the header of the wireless packet is used to set the wireless channel to a busy status only during the occupied time.

This virtual carrier sense method will be now described with reference to an example of a wireless packet communication method which uses two wireless channels as shown in FIG. 49. The STAs have a timer for indicating a so-called NAV (Network Allocation Vector) or the time which a wireless channel takes until it becomes idle. The NAV being "0" indicates that the wireless channel is idle, while the NAV being not "0" indicates that the wireless channel is busy due to a virtual carrier sense. When one STA has received a wireless packet transmitted from the other STA, the one STA reads the occupied time described in the header of the wireless packet. If the value thereof is greater than the current value of the NAV, then the one STA sets the NAV to the value.

At this time, the actual transmission time of the wireless packet may be defined as the occupied time described in the header of the wireless packet. In this case, both the physical carrier sense by the RSSI and the virtual carrier sense by the NAV indicate a busy status, and thus the carrier sense according to the aforementioned two methods serves substantially in the same manner. On the other hand, an occupied time greater than the actual transmission time of a wireless packet may be described in the header. In this case, even after the wireless packet has been completely received, the wireless channel is made busy due to a virtual carrier sense, thereby effectively inhibiting the use of the wireless channel for transmission. As used herein, the occupied time in this case is referred to as the "transmission inhibition time". The STA transmitting a wireless packet determines the wireless channel to be idle only when it is found idle by both of the two carrier senses, and performs transmission.

In FIG. 49, at timing t1, a wireless channel #2 has a setting of NAV, and a wireless channel #1 is determined to be idle. Accordingly, a STA 1 transmits a wireless packet to a STA 2 using the wireless channel #1. The STA 2 and other STAs receive the wireless packet transmitted from the STA 1, thereby allowing the wireless channel #1 to have a setting of NAV. This causes the wireless channel #1 to be inhibited from transmission in the STAs other than the STA 2, thereby allowing the STA 2 to transmit an ACK packet to the STA 1 using the wireless channel #1. On the other hand, at timing t2, the STA 1 and the STA 2 receive a wireless packet transmitted from another STA using the wireless channel #2, so that a corresponding NAV is defined (updated). Accordingly, the wireless channel #2 is inhibited from transmission, so that the STA 1 and the STA 2 cannot transmit using the wireless channel #2.

In the wireless packet communication utilizing multiple wireless channels assigned consecutively along a frequency axis, it is anticipated that the characteristics of a transmission/reception filter and the non-linearity of an amplifier may cause a signal transmitted in a wireless channel to leak into an adjacent wireless channel. When a received signal stays in the adjacent wireless channel suffering from the leakage, the received signal may not be successfully accepted depending on the difference between the incoming leakage power and the power of the received signal. Typically, power leakage from an adjacent wireless channel upon transmission is much greater than the received power of the wireless packet which has been transmitted from a remote STA, thus making it impossible to receive the wireless packet. When the wireless packet cannot be received, there will occur a problem as shown in FIG. 50.

It is assumed that during transmission of a wireless packet using the wireless channel #1 which is idle at timing t1, a wireless packet transmitted from another STA using the wireless channel #2 at timing t2 is scheduled to set the NAV to a longer transmission inhibition time than the transmission time thereof. At this time, an occurrence of leakage from the wireless channel #1 to the wireless channel #2 in the STA 1 would make it impossible to receive the wireless packet in the wireless channel #2 and set (update) the NAV. For this reason, in the wireless channel #2, the primary virtual carrier sense is not properly performed, so that the wireless channel #2 will be determined to be idle at the next timing t3. That is, the STA 1 cannot inhibit transmission over the wireless channel #2. On the other hand, in the STA 2, the wireless channel #2 has a setting of NAV to inhibit transmission. At this time, in the wireless channel #2, it is anticipated that the wireless packet transmitted from the STA 1 at timing t3 may collide against a wireless packet transmitted from another STA, thus resulting in reduction in throughput. Furthermore, it is difficult to live alongside the conventional wireless packet transmission method that utilizes only the wireless channel #2.

It is also anticipated that leakage into wireless channels may occur not only into adjacent channels but also into many other wireless channels such as the next adjacent wireless channels, thereby causing the virtual carrier sense not to be properly performed over a wider range.

It is an object of the present invention to provide a method and device for wireless packet communication which can reduce factors responsible for decreased throughput resulting from leakage into adjacent channels or the like in a wireless packet communication system that uses multiple wireless channels.

DISCLOSURE OF THE INVENTION

According to a first aspect of the invention, a transmit-side STA transmits a wireless packet using a wireless channel which has been determined to be idle by both a physical carrier sense for determining based on received power whether the wireless channel is busy or idle and a virtual carrier sense for determining the wireless channel to be busy during set transmission inhibition time. At this time, the transmit-side STA sets transmission inhibition time used for the virtual carrier sense to a paired wireless channel which is affected by leakage from a transmitting wireless channel.

This allows for providing a setting of transmission inhibition time, corresponding to the transmission time of the wireless packet, to the paired wireless channel even when the paired wireless channel cannot successfully receive due to the effect caused by leakage from the transmitting wireless channel. This in turn allows the virtual carrier sense to be properly performed.

According to a second aspect of the invention, a transmit-side STA transmits a plurality of wireless packets simultaneously using multiple wireless channels which have been determined to be idle by both a physical carrier sense for determining based on received power whether the wireless channels are busy or idle and a virtual carrier sense for determining the wireless channels to be busy during set transmission inhibition time. At this time, the transmit-side STA sets time (Tmax+Ts) obtained by adding the predetermined time Ts to the Tmax as transmission inhibition time used for the virtual carrier sense to a paired wireless channel other than a wireless channel which requires the longest transmission time Tmax among wireless channels used for simultaneous transmission.

According to a third aspect of the invention, in the transmit-side STA according to the invention of claim 2, if an existing set transmission inhibition time for the virtual carrier sense is smaller than time (Tmax+Ts), then the time (Tmax+Ts) is set to the paired wireless channel as a new transmission inhibition time.

According to a second and third aspect of the invention, even when due to the effect of leakage from a wireless channel having the longest transmission time among wireless channels transmitting simultaneously, another wireless channel cannot successfully receive, it is possible to set transmission inhibition time corresponding to the longest transmission time to another wireless channel. This in turn allows the virtual carrier sense to be properly performed.

According to a forth aspect of the invention, a transmit-side STA predetermines a combination of wireless channels which have an effect of leakage of transmitted power on each other among multiple wireless channels, and sets time (Ti+Ts) obtained by adding the predetermined time Ts to the time Ti as transmission inhibition time used for the virtual carrier sense to a paired wireless channel other than a wireless channel which requires the longest transmission time Ti among each combination of wireless channels.

According to a fifth aspect of the invention, in the transmit-side STA according to the invention of claim 4, if an existing set transmission inhibition time for the virtual carrier sense is smaller than (Ti+Ts), then the transmit-side STA sets (Ti+Ts) to the paired wireless channel as a new transmission inhibition time.

According to a forth and fifth aspect of the invention, a transmit-side STA predetermines a combination of wireless channels which have an effect of leakage of transmitted power on each other among multiple wireless channels. Even when due to the effect of leakage from a wireless channel having the longest transmission time in each combination of wireless channels, another wireless channel cannot successfully receive, it is possible to set transmission inhibition time corresponding to the longest transmission time to another wireless channel. This in turn allows the virtual carrier sense to be properly performed.

According to a sixth aspect of the invention, the transmit-side STA according to the first to fifth aspects of the invention detects received power caused by leakage from a transmitting wireless channel in the paired wireless channel, and sets transmission inhibition time to a paired wireless channel having the received power greater than or equal to a predetermined threshold value.

This allows for determining that a wireless channel in which the predetermined received power has not been detected is not affected by leakage, thereby making it possible not to set transmission inhibition time to the wireless channel. Accordingly, while allowing the virtual carrier sense to be properly performed, it is possible to avoid unnecessary setting of transmission inhibition time and thereby provide improved efficiency.

According to a seventh aspect of the invention, the transmit-side STA according to a first to sixth aspects of the invention, detects an error in a received signal in the paired wireless channel, and set the transmission inhibition time to a paired wireless channel having an error detected.

This allows for determining that a wireless channel having no (less) error in a received signal is not affected by leakage, thereby making it possible not to set transmission inhibition time to the wireless channel. Accordingly, while allowing the virtual carrier sense to be properly performed, it is possible to avoid unnecessary setting of transmission inhibition time and thereby provide improved efficiency.

According to a eighth aspect of the invention, the transmit-side STA according to the first to seventh aspects of the invention detects an error in a wireless packet received upon having received the wireless packet over the paired wireless channel. In this case, if a wireless channel having successfully received a wireless packet directed to the own STA has set transmission inhibition time, the transmit-side STA cancels the transmission inhibition time. Additionally, if occupied time is set in a header of the received wireless packet, the transmit-side STA the transmission inhibition time in accordance with new set transmission inhibition time.

When a wireless packet is successfully received during set transmission inhibition time, it is thus possible to cancel the current transmission inhibition time as well as to update the transmission inhibition time according to the occupied time described in the header. Accordingly, while allowing the virtual carrier sense to be properly performed, it is possible to avoid unnecessarily setting transmission inhibition time and thereby provide improved efficiency.

According to a ninth aspect of the invention, in the transmit-side STA according to the first to eighth aspects of the invention, if there is a wireless channel having the set transmission inhibition time when transmission data is generated, the transmit-side STA waits until the transmission inhibition time elapses and then transmits a wireless packet using the wireless channel determined to be idle.

Thus, if any one of multiple wireless channels has set transmission inhibition time, the transmit-side STA waits until the transmission inhibition time elapses, and then transmits a plurality of wireless packets simultaneously using idle wireless channels with all wireless channels having no set transmission inhibition time. Accordingly, even when set transmission inhibition time is forcedly set in consideration of the effect of leakage from another wireless channel, no set transmission inhibition time will be successively set. It is thus possible to prevent a specific wireless channel from being continually busy.

According to a tenth aspect of the invention, in the transmit-side STA according to the first to eighth aspects of the invention, when transmission data is generated, if the longest transmission inhibition time of wireless channels having set transmission inhibition time is smaller than a predetermined threshold value, the transmit-side STA waits until the transmission inhibition time elapses and then transmits a wireless packet using the wireless channel determined to be idle. Alternatively, if the longest transmission inhibition time is greater than or equal to the predetermined threshold value, the transmit-side STA transmits a wireless packet, without waiting until the transmission inhibition time elapses, using the wireless channel determined to be idle.

Thus, if the longest transmission inhibition time of wireless channels having set transmission inhibition time is greater than or equal to a predetermined threshold value, the transmit-side STA transmits a plurality of wireless packets simultaneously, without waiting until the transmission inhibition time elapses, using idle wireless channels. On the other hand, if the longest transmission inhibition time of wireless channels having set transmission inhibition time is smaller than the predetermined threshold value, the transmit-side STA waits until the transmission inhibition time elapses and then transmits a plurality of wireless packets simultaneously using idle wireless channels with all wireless channels having no set transmission inhibition time. Accordingly, it is possible to set an upper wait time limit as well as to properly avoid successive settings of transmission inhibition time even when the transmission inhibition time is forcedly set.

According to an eleventh aspect of the invention, in the transmit-side STA according to the first to eighth aspect of the invention, if there is a wireless channel having the set transmission inhibition time when transmission data is generated, the transmit-side STA transmits a wireless packet, without waiting with a predetermined probability until the transmission inhibition time elapses, using the wireless channel determined to be idle.

Thus, if there is a wireless channel having set transmission inhibition time, the transmit-side STA transmits a plurality of wireless packets simultaneously using idle wireless channels without waiting with a predetermined probability until the transmission inhibition time elapses. On the other hand, the transmit-side STA waits with a predetermined probability until the transmission inhibition time elapses, and then transmits a plurality of wireless packets simultaneously using idle wireless channels with all wireless channels having no set transmission inhibition time. Accordingly, it is possible to set an upper wait time limit as well as to properly avoid successive settings of transmission inhibition time even when the transmission inhibition time is forcedly set.

According to a twelfth aspect of the invention, in the transmit-side STA according to the first to eighth aspects of the invention, when transmission data is generated, the transmit-side STA waits until all wireless channels are determined to be idle by the physical carrier sense and the virtual carrier sense, and then transmits a wireless packet using the wireless channel determined to be idle.

Thus, if any one of multiple wireless channels is busy, the transmit-side STA waits until the wireless channel becomes idle, and when all the wireless channels become idle, transmits a plurality of wireless packets simultaneously using the wireless channels. Accordingly, it is possible to set a number of wireless channels to be used for simultaneous transmission. Even when set transmission inhibition time is forcedly set, no transmission inhibition time will be successively set. It is thus possible to prevent a specific wireless channel from being continually busy.

According to a thirteenth aspect of the invention, in the transmit-side STA according to the first to eighth aspects of the invention, when transmission data is generated, the transmit-side STA waits until all wireless channels are determined to be idle by the physical carrier sense and the virtual carrier sense, and then transmits wireless packets using the wireless channels that have been determined to be idle. Alternatively, if the longest transmission inhibition time of wireless channels having set transmission inhibition time is greater than or equal to a predetermined threshold value, the transmit-side STA transmits wireless packets, without waiting until the transmission inhibition time elapses, using the wireless channels that have been determined to be idle.

Thus, if the longest transmission inhibition time of wireless channels having set transmission inhibition time is greater than or equal to a predetermined threshold value, the transmit-side STA transmits a plurality of wireless packets simultaneously using idle wireless channels without waiting until the transmission inhibition time elapses. On the other hand, if the longest transmission inhibition time of wireless channels having set transmission inhibition time is smaller than the predetermined threshold value, the transmit-side STA waits until all wireless channels become idle, and then transmits a plurality of wireless packets simultaneously using the idle wireless channels. Accordingly, it is possible to set an upper wait time limit as well as to properly avoid successive settings of transmission inhibition time even when the transmission inhibition time is forcedly set as described above.

According to a fourteenth aspect of the invention, in the transmit-side STA according to the tenth or twelfth aspect of the invention, when there is a wireless channel having the set transmission inhibition time: if the wireless channel has set transmission inhibition time smaller than a predetermined threshold value, the transmit-side STA waits until the transmission inhibition time elapses and then transmits a wireless packet using the wireless channel determined to be idle. Alternatively, if no wireless channel has set transmission inhibition time smaller than the predetermined threshold value, the transmit-side STA transmits a wireless packet, without waiting until the transmission inhibition time elapses, using the wireless channel determined to be idle.

According to a fifteenth aspect of the invention, in the transmit-side STA according to the fourteenth aspect of the invention, if there is a wireless channel having the set transmission inhibition time and the wireless channel has set transmission inhibition time smaller than a predetermined threshold value, the transmit-side STA waits until the transmission inhibition time elapses and then returns to determine whether there is a wireless channel having the set transmission inhibition time.

According to a fourteenth and fifteenth aspect of the invention, if none of wireless channels having set transmission inhibition time has set transmission inhibition time smaller than a predetermined threshold value, the transmit-side STA transmits a plurality of wireless packets simultaneously, without waiting until the transmission inhibition time elapses, using idle wireless channels. On the other hand, if there is a wireless channel having set transmission inhibition time smaller than the predetermined threshold value, the transmit-side STA waits until the transmission inhibition time elapses and then transmits a plurality of wireless packets using idle wireless channels. It is thus possible to set an upper wait time limit as well as to efficiently transmit a wireless packet while making effective use of the wait time.

According to a sixteenth aspect of the invention, in the transmit-side STA according to the first to eighth aspects of the invention, when transmission data is generated, the transmit-side STA waits or does not wait with a predetermined probability until all wireless channels are determined to be idle by the physical carrier sense and the virtual carrier sense, and then transmits a wireless packet using the wireless channel determined to be idle.

Accordingly, if there is a wireless channel having set transmission inhibition time, the transmit-side STA transmits a plurality of wireless packets simultaneously, without waiting with a predetermined probability until the transmission inhibition time elapses, using idle wireless channels. On the other hand, the transmit-side STA waits with a predetermined probability until all wireless channels become idle, and then transmits a plurality of wireless packets simultaneously using the idle wireless channels. It is thus possible to set an upper wait time limit as well as to properly avoid successively setting transmission inhibition time even when the transmission inhibition time is forcedly set.

According to a seventeenth aspect of the invention, in the first to eighth aspects of the invention, if a received wireless packet has set transmission inhibition time, the receive-side STA sets the transmission inhibition time to a receiving wireless channel; if a wireless packet directed to the own STA has been successfully received, the receive-side STA transmits an acknowledgment packet (hereinafter, ACK packet) including the set transmission inhibition time in the paired wireless channel to the transmit-side STA. When the transmit-side STA receives a corresponding ACK packet within a predetermined period of time after having transmitted the wireless packet, the transmit-side STA updates the set transmission inhibition time for the paired wireless channel to transmission inhibition time of a paired wireless channel included in the ACK packet.

Accordingly, if a paired wireless channel having set transmission inhibition time is provided with the set transmission inhibition time at the receive-side STA, the receive-side STA appends the transmission inhibition time to the ACK packet for transmission to the transmit-side STA. Accordingly, it is possible for the transmit-side STA updates the transmission inhibition time set at the time of transmission to the transmission inhibition time appended to the ACK packet. It is thus possible to avoid unnecessary setting of transmission inhibition time to provide improved efficiency.

According to a eighteenth aspect of the invention, sub-channels are provided to be multiplexed into one wireless channel between a transmit-side STA and one or more receive-side STAs. The transmit-side STA assigns a plurality of wireless packets to a plurality of sub-channels respectively for simultaneous transmission, in which each of the sub-channels has been determined to be idle by both a physical carrier sense for determining based on received power whether the sub-channel is busy or idle and a virtual carrier sense for determining the sub-channel to be busy during set transmission inhibition time. At this time, the transmit-side STA sets time (Tmax+Ts) obtained by adding the predetermined time Ts to the Tmax as transmission inhibition time used for the virtual carrier sense to sub-channels other than a sub-channel which requires the longest transmission time Tmax among sub-channels used for simultaneous transmission.

According to a nineteenth aspect of the invention, in the transmit-side STA according to a eighteenth aspect of the invention, if an existing set transmission inhibition time for the virtual carrier sense is smaller than (Tmax+Ts), then the transmit-side STA sets (Tmax+Ts) to the sub-channel as a new transmission inhibition time.

According to an eighteenth and nineteenth aspect of the invention, even when a sub-channel not in transmission or reception cannot receive, it is possible to provide set transmission inhibition time corresponding to the longest transmission/reception time to the sub-channel, thereby allowing the virtual carrier sense to be properly performed.

According to a twentieth aspect of the invention, a transmit-side STA transmits a wireless packet using a wireless channel which has been determined to be idle by both a physical carrier sense unit which determines based on received power whether the wireless channel is busy or idle and a virtual carrier sense unit which determines the wireless channel to be busy during set transmission inhibition time. At this time, the virtual carrier sense unit sets transmission inhibition time to a paired wireless channel which is affected by leakage from a transmitting wireless channel.

Accordingly, even when a paired wireless channel cannot successfully receive due to the effect of leakage from the transmitting wireless channel, the transmit-side STA can provide set transmission inhibition time corresponding to the transmission time of the wireless packet to the paired wireless channel. This in turn allows the virtual carrier sense by both a physical carrier sense unit which determines based on received power whether the wireless channels are busy or idle and a virtual carrier sense unit which makes the wireless channels busy during set transmission inhibition time. At this time, the virtual carrier sense unit sets time (Tmax+Ts) obtained by adding the predetermined time Ts to to be properly performed.

According to a twenty-first aspect of the invention, a transmit-side STA transmits a plurality of wireless packets simultaneously using multiple wireless channels which have been determined to be idle by both a physical carrier sense unit which determines based on received power whether the wireless channels busy during or idle and a virtual carrier sense unit which makes the wireless channels busy during set transmission inhibition time. At this time, the virtual carrier sense unit sets time (Tmax+Ts) obtained by adding the predetermined time Ts to the Tmax as the transmission inhisition time to a paired wireless channel other than a wireless channel which requires the longest transmission time Tmax among wireless channels used for simultaneous transmission.

According to a twenty-second aspect of the invention, if an existing set transmission inhibition time is smaller than (Tmax+Ts), then the virtual carrier sense unit of the transmit-side STA according to the invention of claim 21 sets (Tmax+Ts) to the paired wireless channel as a new transmission inhibition time.

According to a twenty-first and twenty-second aspect of the invention, even when due to the effect of leakage from a wireless channel having the longest transmission time among wireless channels transmitting simultaneously, another wireless channel cannot successfully receive, it is possible to provide set transmission inhibition time corresponding to the longest transmission time to the another wireless channel. This in turn allows the virtual carrier sense to be properly performed.

According to a twenty-third aspect of the invention, a virtual carrier sense unit of a transmit-side STA predetermines a combination of wireless channels which have an effect of leakage of transmitted power on each other among multiple wireless channels, and sets time (Ti+Ts) obtained by adding the predetermined time Ts to the Ti as the transmission inhibition time used for the virtual carrier sense to a paired wireless channel other than a wireless channel which requires the longest transmission time Ti among each combination of wireless channels.

According to a twenty-forth aspect of the invention, if an existing set transmission inhibition time is smaller than (Ti+Ts), then the virtual carrier sense unit of the transmit-side STA according to the invention of claim 23 sets (Ti+Ts) to the paired wireless channel as a new transmission inhibition time.

According to a twenty-third and twenty-forth aspect of the invention, a combination of wireless channels is predetermined which have an effect of leakage of transmitted power on each other among multiple wireless channels. Even when due to the effect of leakage from a wireless channel having the longest transmission time in each combination of wireless channels, another wireless channel cannot successfully receive, it is possible to provide set transmission inhibition time corresponding to the longest transmission time to the another wireless channel. This in turn allows the virtual carrier sense to be properly performed.

According to a twenty-fifth aspect of the invention, in the transmit-side STA according to the twentieth to twenty-forth aspect of the invention, the transmit-side STA includes a unit which detects received power caused by leakage from a transmitting wireless channel in the paired wireless channel, and the virtual carrier sense unit provides the set transmission inhibition time to a paired wireless channel having the received power greater than or equal to a predetermined threshold value.

This allows for determining that a wireless channel having the predetermined received power not detected is not affected by leakage, thereby making it possible not to set transmission inhibition time to the wireless channel. Accordingly, while allowing the virtual carrier sense to be properly performed, it is possible to avoid unnecessary setting of transmission inhibition time and thereby provide improved efficiency.

According to a twenty-sixth aspect of the invention, the transmit-side STA according to the twentieth to twenty-fifth aspect of the invention includes a unit which detects an error in a received signal in the paired wireless channel, and the virtual carrier sense unit sets the transmission inhibition time to a paired wireless channel having an error detected.

This allows for determining that a wireless channel having no (less) error in a received signal is not affected by leakage, thereby making it possible not to set the transmission inhibition time to the wireless channel. Accordingly, while allowing the virtual carrier sense to be properly performed, it is possible to avoid unnecessary setting of transmission inhibition time and thereby provide improved efficiency.

According to a twenty-seventh aspect of the invention, the transmit-side STA according to the twentieth to twenty-sixth aspect of the invention, includes a unit which detects an error in a received wireless packet when having received the wireless packet over the paired wireless channel. If a wireless channel having successfully received a wireless packet directed to the own STA has the set transmission inhibition time, the virtual carrier sense unit cancels the transmission inhibition time. Additionally, if a header of the received wireless packet has a setting of occupied time, the virtual carrier sense unit sets correspondingly new set transmission inhibition time.

When a wireless packet is successfully received during set transmission inhibition time, it is thus possible to cancel the current transmission inhibition time as well as to update the transmission inhibition time according to the occupied time described in the header. Accordingly, while allowing the virtual carrier sense to be properly performed, it is possible to avoid unnecessarily setting transmission inhibition time and thereby provide improved efficiency.

According to a twenty-eighth aspect of the invention, in the transmit-side STA according to the twentieth to twenty-seventh aspect of the invention, if there is a wireless channel having the set transmission inhibition time when transmission data is generated, the virtual carrier sense unit waits until the transmission inhibition time elapses and then transmits a wireless packet using the wireless channel determined to be idle.

Thus, if any one of multiple wireless channels has set transmission inhibition time, the virtual carrier sense unit waits until the transmission inhibition time elapses, and then transmits a plurality of wireless packets simultaneously using idle wireless channels with all wireless channels having no set transmission inhibition time. Accordingly, even when the transmission inhibition time is forcedly set in consideration of the effect of leakage from another wireless channel, there will be no successive setting of transmission inhibition time. It is thus possible to prevent a specific wireless channel from being continually busy.

According to a twenty-ninth aspect of the invention, in the transmit-side STA according to the twentieth to twenty-seventh aspect of the invention, when transmission data is generated, if the longest transmission inhibition time of wireless channels having set transmission inhibition time is smaller than a predetermined threshold value, the virtual carrier sense unit waits until the transmission inhibition time elapses and then transmits a wireless packet using the wireless channel determined to be idle. Alternatively, if the longest transmission inhibition time is greater than or equal to the predetermined threshold value, the virtual carrier sense unit transmits a wireless packet, without waiting until the transmission inhibition time elapses, using the wireless channel determined to be idle.

Thus, if the longest transmission inhibition time of wireless channels having set transmission inhibition time is greater than or equal to a predetermined threshold value, the virtual carrier sense unit transmits a plurality of wireless packets simultaneously using idle wireless channels without waiting until the transmission inhibition time elapses. On the other hand, if the longest transmission inhibition time of wireless channels a having set transmission inhibition time is smaller than the predetermined threshold value, the virtual carrier sense unit waits until the transmission inhibition time elapses, and then transmits a plurality of wireless packets simultaneously using the idle wireless channels with all wireless channels having no set transmission inhibition time. Accordingly, it is possible to set an upper wait time limit as well as to properly avoid successive settings of transmission inhibition time even when the transmission inhibition time is forcedly set.

According to a thirtieth aspect of the invention, in the transmit-side STA according to the twentieth to twenty-seventh aspect of the invention, if there is a wireless channel having the set transmission inhibition time when transmission data is generated, the virtual carrier sense unit transmits a wireless packet, without waiting with a predetermined probability until the transmission inhibition time elapses, using the wireless channel determined to be idle.

Accordingly, if there is a wireless channel having set transmission inhibition time, the virtual carrier sense unit transmits a plurality of wireless packets simultaneously, without waiting with a predetermined probability until the transmission inhibition time elapses, using idle wireless channels. On the other hand, the virtual carrier sense unit waits with a predetermined probability until the transmission inhibition time elapses, and then transmits a plurality of wireless packets simultaneously using idle wireless channels with all wireless channels having no set transmission inhibition time. It is thus possible to set an upper wait time limit as well as to properly avoid successive settings of transmission inhibition time even when the transmission inhibition time is forcedly set.

According to a thirty-first aspect of the invention, in the transmit-side STA according to the twentieth to twenty-seventh aspect of the invention, when transmission data is generated, the physical carrier sense unit and the virtual carrier sense unit wait until all wireless channels are determined to be idle, and then transmit a wireless packet using the wireless channel determined to be idle.

Thus, if there is any one of multiple wireless channels being busy, the physical carrier sense unit and the virtual carrier sense unit wait until the wireless channel becomes idle, and when all wireless channels become idle, transmit a plurality of wireless packets simultaneously using the wireless channels. Accordingly, it is possible to set a number of wireless channels to be used for simultaneous transmission. Even when the transmission inhibition time is forcedly set, there will be no successive settings of transmission inhibition time. It is thus possible to prevent a specific wireless channel from being continually busy.

According to a thirty-second aspect of the invention, in the transmit-side STA according to the twentieth to twenty-seventh aspect of the invention, when transmission data is generated, the physical carrier sense unit and the virtual carrier sense unit wait until all wireless channels are determined to be idle, and then transmit a wireless packet using the wireless channel determined to be idle. Alternatively, if the longest transmission inhibition time of wireless channels having set transmission inhibition time is greater than or equal to a predetermined threshold value, the physical carrier sense unit and the virtual carrier sense unit transmit a wireless packet, without waiting until the transmission inhibition time elapses, using the wireless channel determined to be idle.

Thus, if the longest transmission inhibition time of wireless channels having set transmission inhibition time is greater than or equal to a predetermined threshold value, the physical carrier sense unit and the virtual carrier sense unit transmit a plurality of wireless packets simultaneously using idle wireless channels without waiting until the transmission inhibition time elapses. On the other hand, if the longest transmission inhibition time of wireless channels having set transmission inhibition time is smaller than the predetermined threshold value, the physical carrier sense unit and the virtual carrier sense unit wait until all wireless channels become idle, and then transmit a plurality of wireless packets simultaneously using the idle wireless channels. Accordingly, it is possible to set an upper wait time limit as well as to properly avoid successive settings of transmission inhibition time even when the transmission inhibition time is forcedly set as described above.

According to a thirty-third aspect of the invention, in the transmit-side STA according to the twenty-ninth or thirty-second aspect of the invention, when there is a wireless channel having the set transmission inhibition time: if the wireless channel has set transmission inhibition time smaller than a predetermined threshold value, the virtual carrier sense unit waits until the transmission inhibition time elapses and then transmits a wireless packet using the wireless channel determined to be idle. Alternatively, if no wireless channel has set transmission inhibition time smaller than the predetermined threshold value, the virtual carrier sense unit transmits a wireless packet, without waiting until the transmission inhibition time elapses, using the wireless channel determined to be idle.

According to a thirty-forth aspect of the invention, in the transmit-side STA according to a thirty-third aspect of the invention, if there is a wireless channel having the set transmission inhibition time and the wireless channel has set transmission inhibition time smaller than a predetermined threshold value, the virtual carrier sense unit waits until the transmission inhibition time elapses and then returns to determine whether there is a wireless channel having the set transmission inhibition time or whether all wireless channels are idle.

According to a thirty-third and thirty-forth aspect of the invention, if none of wireless channels having set transmission inhibition time has set transmission inhibition time smaller than a predetermined threshold value, the virtual carrier sense unit transmits a plurality of wireless packets simultaneously, without waiting until the transmission inhibition time elapses, using idle wireless channels. On the other hand, if there is a wireless channel having set transmission inhibition time smaller than the predetermined threshold value, the virtual carrier sense unit waits until the transmission inhibition time elapses and then transmits a plurality of wireless packets using idle wireless channels. It is thus possible to set an upper wait time limit as well as to efficiently transmit a wireless packet while making effective use of the wait time.

According to a thirty-fifth aspect of the invention, in the transmit-side STA according to the twentieth to twenty-seventy aspect of the invention, the physical carrier sense unit and the virtual carrier sense unit wait or do not wait with a predetermined probability until all wireless channels are determined to be idle, and then transmit a wireless packet using the wireless channel determined to be idle.

Accordingly, if there is a wireless channel having set transmission inhibition time, the physical carrier sense unit and the virtual carrier sense unit transmit a plurality of wireless packets simultaneously, without waiting with a predetermined probability until the transmission inhibition time elapses, using idle wireless channels. On the other hand, the physical carrier sense unit and the virtual carrier sense unit wait with a predetermined probability until all wireless channels become idle, and then transmit a plurality of wireless packets simultaneously using the idle wireless channels. It is thus possible to set an upper wait time limit as well as to properly avoid successive settings of transmission inhibition time even when the transmission inhibition time is forcedly set.

According to a thirty-sixth aspect of the invention, in the twentieth to twenty-seventh aspect of the invention, the receive-side STA includes a unit which sets transmission inhibition time to a receiving wireless channel if a received wireless packet has the set transmission inhibition time, and which transmits to the transmit-side STA an ACK packet including the set transmission inhibition time provided to the paired wireless channel if a wireless packet directed to the own STA has been successfully received.

The transmit-side STA includes a unit which updates the set transmission inhibition time for the paired wireless channel to transmission inhibition time of a paired wireless channel included in a corresponding ACK packet when having received the ACK packet within a predetermined period of time after having transmitted the wireless packet.

Accordingly, if a paired wireless channel having set transmission inhibition time is provided with the set transmission inhibition time at the receive-side STA, the receive-side STA appends the transmission inhibition time to the ACK packet for transmission to the transmit-side STA. Accordingly, it is possible for the transmit-side STA to update the transmission inhibition time set at the time of transmission to the transmission inhibition time appended to the ACK packet. It is thus possible to avoid an unnecessary setting of transmission inhibition time to provide improved efficiency.

According to a thirty-seventy aspect of the invention, included are one transceiver which multiplexes a plurality of sub-channels into one wireless channel for transmission and reception; a physical carrier sense unit which determines based on received power whether each of the sub-channels is busy or idle; and a virtual carrier sense unit which determines each of the sub-channels to be busy during set transmission inhibition time. The transceiver assigns a plurality of wireless packets to a plurality of sub-channels respectively for simultaneous transmission and reception, the sub-channels having been determined to be idle by both the physical carrier sense and the virtual carrier sense. At this time, the virtual carrier sense unit sets time (Tmax+Ts) obtained by adding the predetermined time Ts to the Tmax as transmission inhibition time to sub-channels other than a sub-channel which requires the longest transmission time Tmax among sub-channels used for simultaneous transmission and reception.

According to a thirty-eighth aspect of the invention, if an existing set transmission inhibition time for a virtual carrier sense is smaller than (Tmax+Ts), then the virtual carrier sense unit of the transmit-side STA according to the thirty-seventh aspect of the invention, sets (Tmax+Ts) to the sub-channel as a new transmission inhibition time.

According to a thirty-seventy and thirty-eighth aspect of the invention, even when a sub-channel not in transmission or reception cannot receive, it is possible to set transmission inhibition time corresponding to the longest transmission/reception time to the sub-channel, thereby allowing the virtual carrier sense to be properly performed.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 32 is a time chart showing an example of operation according to the 20th embodiment of the present invention;

FIG. 37 is a flowchart showing a processing procedure according to a 24th embodiment of the present invention;

FIG. 38 is a time chart showing a processing procedure on a transmit side according to a 25th embodiment of the present invention;

FIG. 40 is a time chart showing an example of operation according to the 25th embodiment of the present invention;

FIG. 43 is a time chart showing an example of operation according to the 26th embodiment of the present invention;

BEST MODE FOR CARRYING OUT THE INVENTION

First Embodiment

Figure 1:
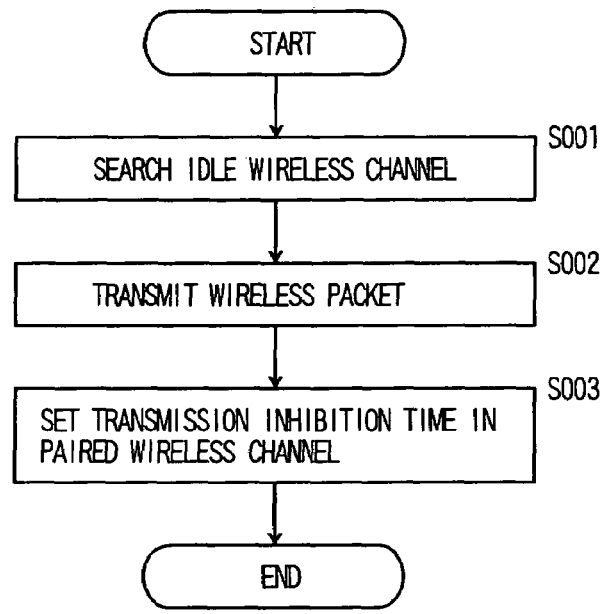
FIG. 1 is a flowchart showing a processing procedure according to a first embodiment of the present invention.

FIG. 1 shows a flowchart according to a first embodiment of the present invention.

Figure 2:
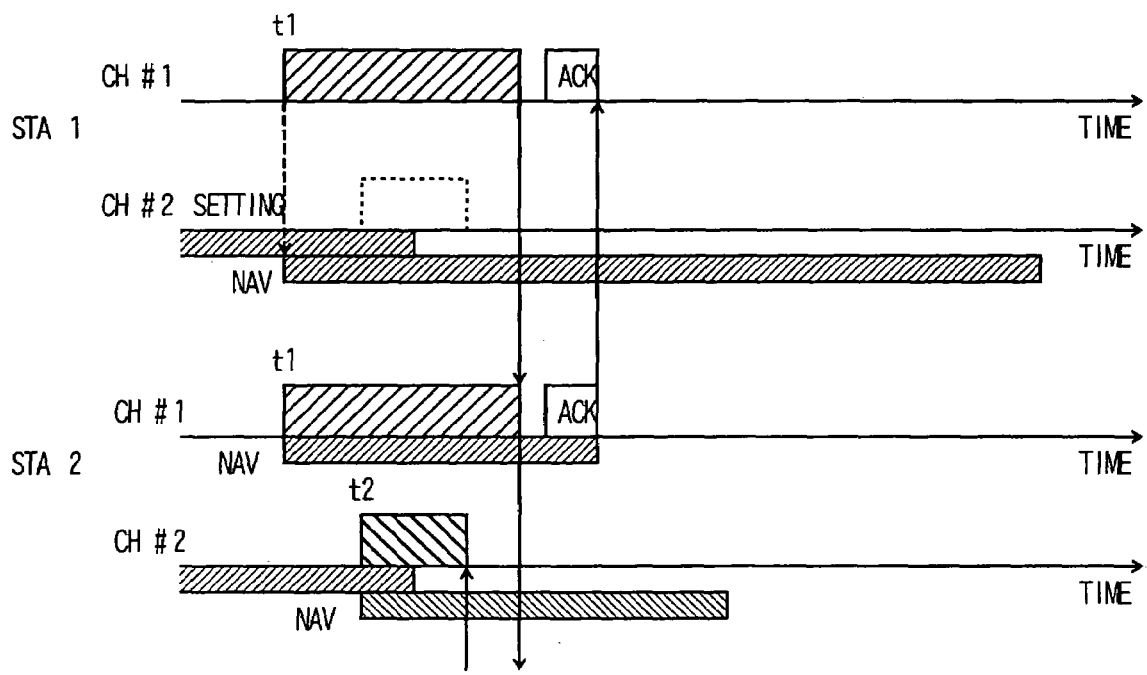
FIG. 2 is a time chart showing an example of operation according to the first embodiment of the present invention.

FIG. 2 shows an example of operation according to the first embodiment of the present invention. Here, wireless channels #1 and #2 are prepared between STAs 1 and 2. It is assumed that at timing t1, the wireless channel #2 is busy due to a virtual carrier sense by the NAV defined by a wireless packet received before then. It is also assumed that the wireless channels #1 and #2 are related to each other in that leakage can occur therebetween and would not be able to receive wireless packets if there is any leakage.

In FIG. 1, a transmit-side STA searches for an idle wireless channel (S001). Here, a physical carrier sense by RSSI and a virtual carrier sense by NAV are performed to determine that a wireless channel is idle if no carriers are detected in both the detections. Then, the process uses the idle wireless channel to transmit a wireless packet (S002). Then, the process sets the NAV of a "paired wireless channel" which would be affected by leakage from the transmitting wireless channel to a transmission inhibition time obtained by adding a predetermined time to the transmission time of the transmitted wireless packet, and then terminates the transmission processing (S003).

More specifically, an explanation is given to an example of operation of the transmit-side STA with reference to FIG. 2.

In FIG. 1, the paired wireless channel designates the wireless channel #2 paired with the wireless channel #1 over which the STA 1 transmits a wireless packet to the STA 2. It is also possible to detect the received power caused by leakage from the wireless channel #1 to the wireless channel #2 for recognition.

In FIG. 2, at timing t1, the wireless channel #1 is idle, while the wireless channel #2 is busy due to NAV (in a transmission inhibited state). The STA 1 detects the wireless channel #1 which is idle at timing t1, and then transmits a wireless packet directed to the STA 2. At this time, since the NAV of the paired wireless channel #2 is less than the transmission time of the wireless packet, the process sets the NAV of the wireless channel #2 to a transmission inhibition time obtained by adding a predetermined time (which corresponds to the transmission inhibition time that is defined by a received packet during the transmission of a wireless packet) to the transmission time of the wireless packet. This allows the STA 1 to define a NAV equal to that of the wireless channel #2 of the STA 2 even when the wireless packet of the wireless channel #2 cannot be received at timing t2.

Second Embodiment

Figure 3:
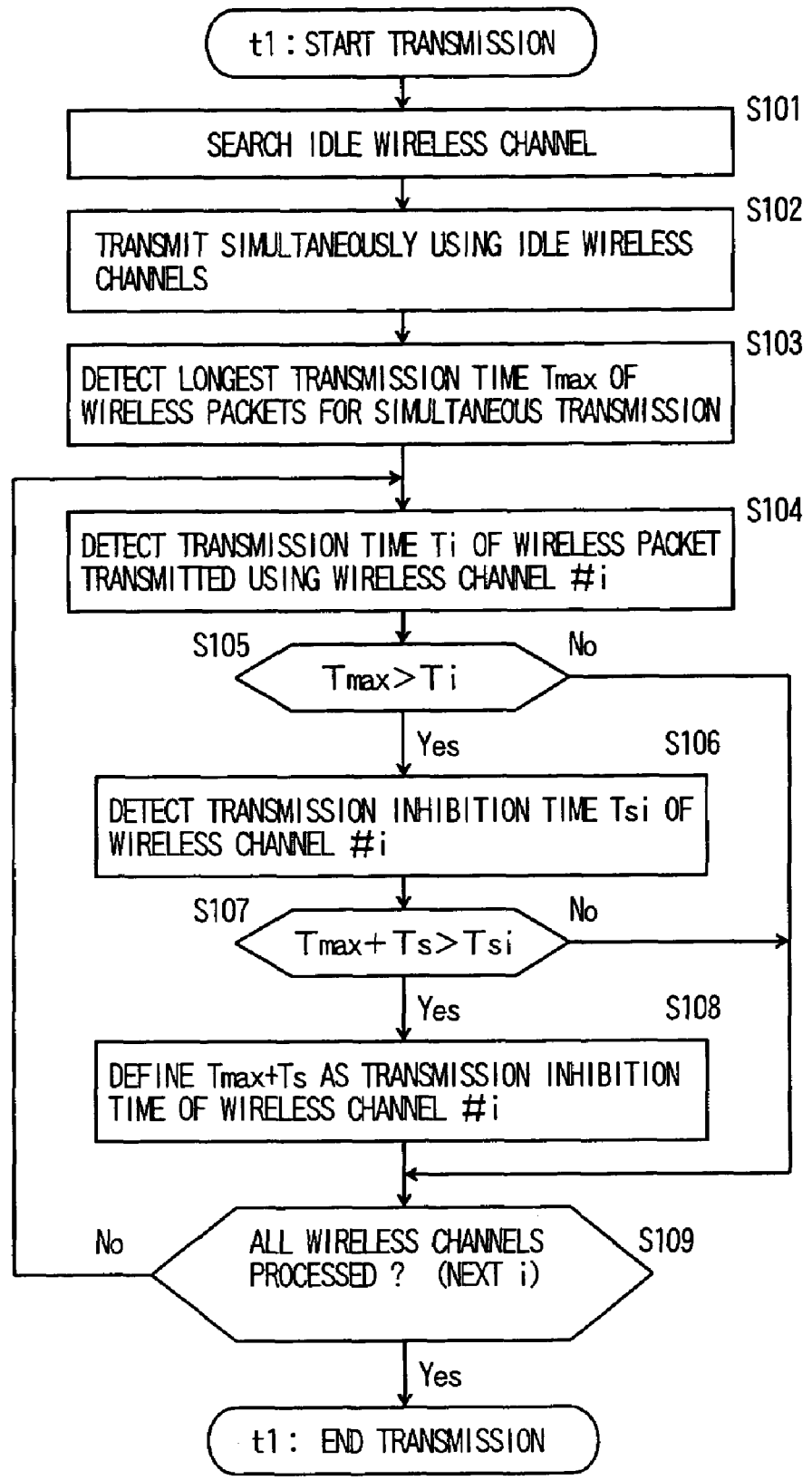
FIG. 3 is a flowchart showing a processing procedure according to a second embodiment of the present invention.
Figure 4:
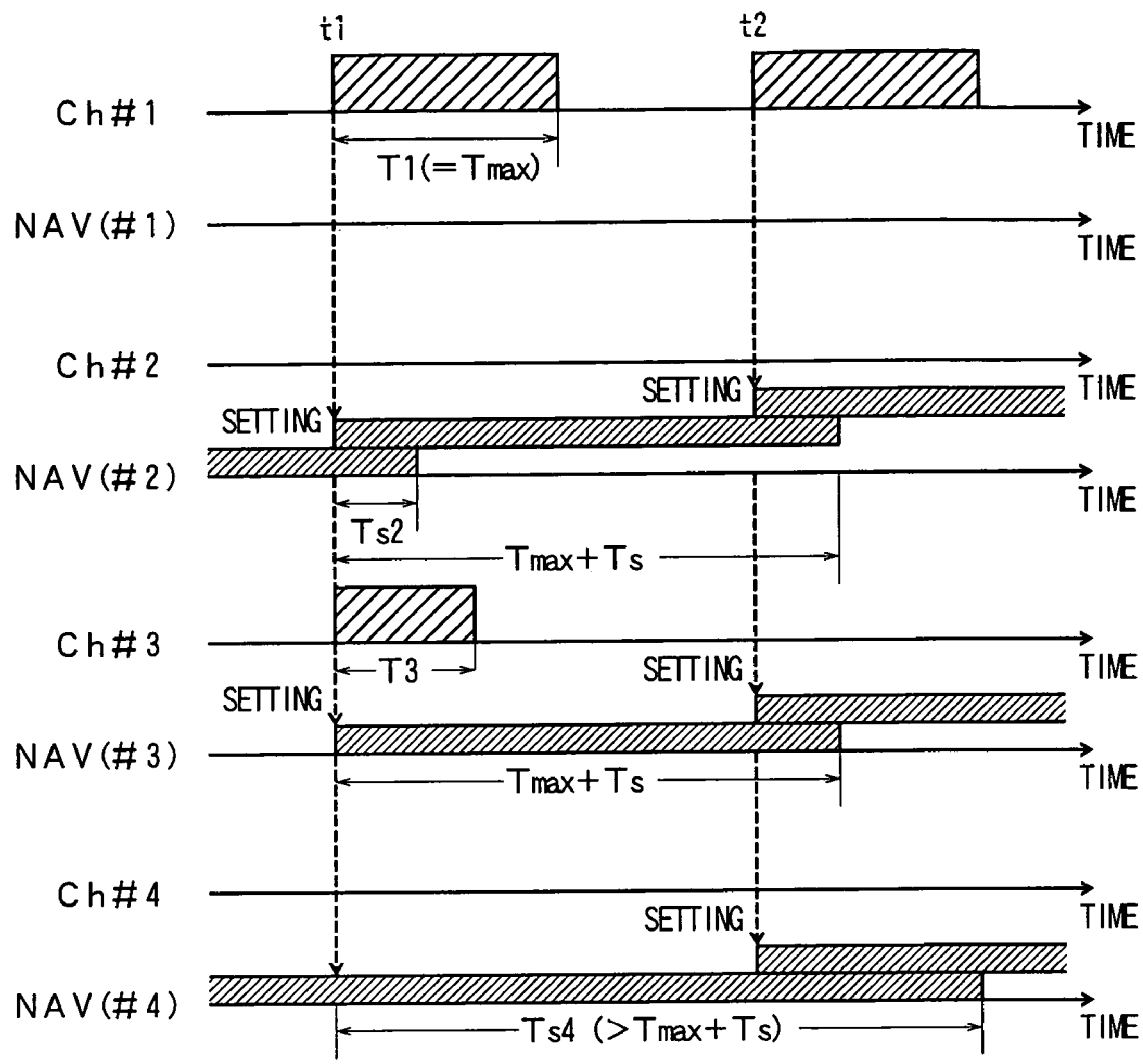
FIG. 4 is a time chart showing an example of operation according to the second embodiment of the present invention.

FIG. 3 shows a flowchart according to a second embodiment of the present invention. FIG. 4 shows an example of operation according to the second embodiment of the present invention. Here, wireless channels #1, #2, #3, and #4 are prepared. It is assumed that at timing t1, the wireless channels #2 and #4 are busy due to a virtual carrier sense by the NAV defined by a wireless packet received before then. It is also assumed that the wireless channels #1, #2, #3, and #4 are related to each other in that leakage can occur therebetween and would not be able to receive wireless packets if there is any leakage.

The embodiments described below can also be applied to a system which combines simultaneous transmission using multiple wireless channels and a known Multiple Input Multiple Output (hereinafter, MIMO) technique (Kurosaki et al., "100 Mbit/s SDM-COFDM over MIMO Channel for Broadband Mobile Communications", Technical Reports of the Institute of Electronics, Information and Communication Engineers, A•P 2001-96, RCS2001-135(2001-10)).

First, the process searches for an idle wireless channel at timing t1 (S101). Here, a physical carrier sense by RSSI and a virtual carrier sense by NAV (a detection of the transmission inhibition time) are performed to determine that the wireless channel is idle if no carriers are detected in both the detections. Then, the process uses the idle wireless channels to transmit a plurality of wireless packets simultaneously which are generated from data packets in a transmission queue (S102). Then, the process detects the longest transmission time Tmax of the transmission times of the wireless packets to be transmitted simultaneously (S103). Here, the wireless channels #1 and #3 are idle, and two (or the sum total of counts of MIMO in each wireless channel) wireless packets are transmitted simultaneously using the wireless channels #1 and #3, in which the process detects the longest transmission time Tmax of them (here, the transmission time T1 of the wireless channel #1).

Then, processing is performed from S104 to S109 on each of the wireless channels #1, #2, #3, and #4. First, the process detects the transmission time Ti of the wireless packet to be transmitted from the wireless channel #i (i=1, 2, 3, and 4) (S104). Here, Ti=0 if no wireless packet is transmitted because the wireless channel #i is busy (here, T2=T4=0).

Then, the process compares the longest transmission time Tmax with the transmission time Ti of the wireless packet to be transmitted from the wireless channel #i (S105). Here, since the transmission time Ti of the wireless channel #1 is the longest (Tmax=T1), and Tmax>Ti in other than the wireless channel #1, the following processing is directed to other than the wireless channel #1.

In this embodiment and the following embodiments, a plurality of wireless packets generated for simultaneous transmission are described as different in packet time length. However, to generate a plurality of wireless packets to be transmitted simultaneously which have the same packet time length, the following processing is directed to other than the wireless channels #1 and #3 (i.e., the wireless channels #2 and #4 that transmit no wireless packets). This also holds true in the other embodiments shown below.

The process detects a transmission inhibition time Ts1 at which each NAV is set in the wireless channel #i with Tmax>Ti (S106). Here, the process detects Ts2 and Ts4 for the wireless channels #2 and #4, and Ts3=0 for the wireless channel #3. Then, the process compares the time (Tmax+Ts) obtained by adding a predetermined time Ts to Tmax with the existing set transmission inhibition time Tsi. If Tmax+Ts>Tsi, then the process sets the NAV to Tmax+Ts as a new transmission inhibition time to perform processing on the next wireless channel (S107, S108, and S109). On the other hand, the process performs no processing on the wireless channel #i (here, #1) for which Tmax>Ti is not true or on the wireless channel #i (here, #4) for which Tmax+Ts>Tsi is not true, but performs processing on the next wireless channel (S105, S107, and S109).

As a result, the process provides no setting to the NAV of the wireless channel #1 having the longest transmission time Tmax, whereas the process sets the NAV of the wireless channels #2 and #3 to the transmission inhibition time (Tmax+Ts), and allows the NAV of the wireless channel #4 to be held at the current transmission inhibition time (Ts4). Accordingly, at the next timing t2, the process determines that the wireless channels #2, #3, and #4 are busy due to a virtual carrier sense by NAV, and thus allows only the wireless channel #1 to be used for transmission of wireless packets. At the same time, the transmission inhibition time will be also defined in the same manner.

Third Embodiment

Figure 5:
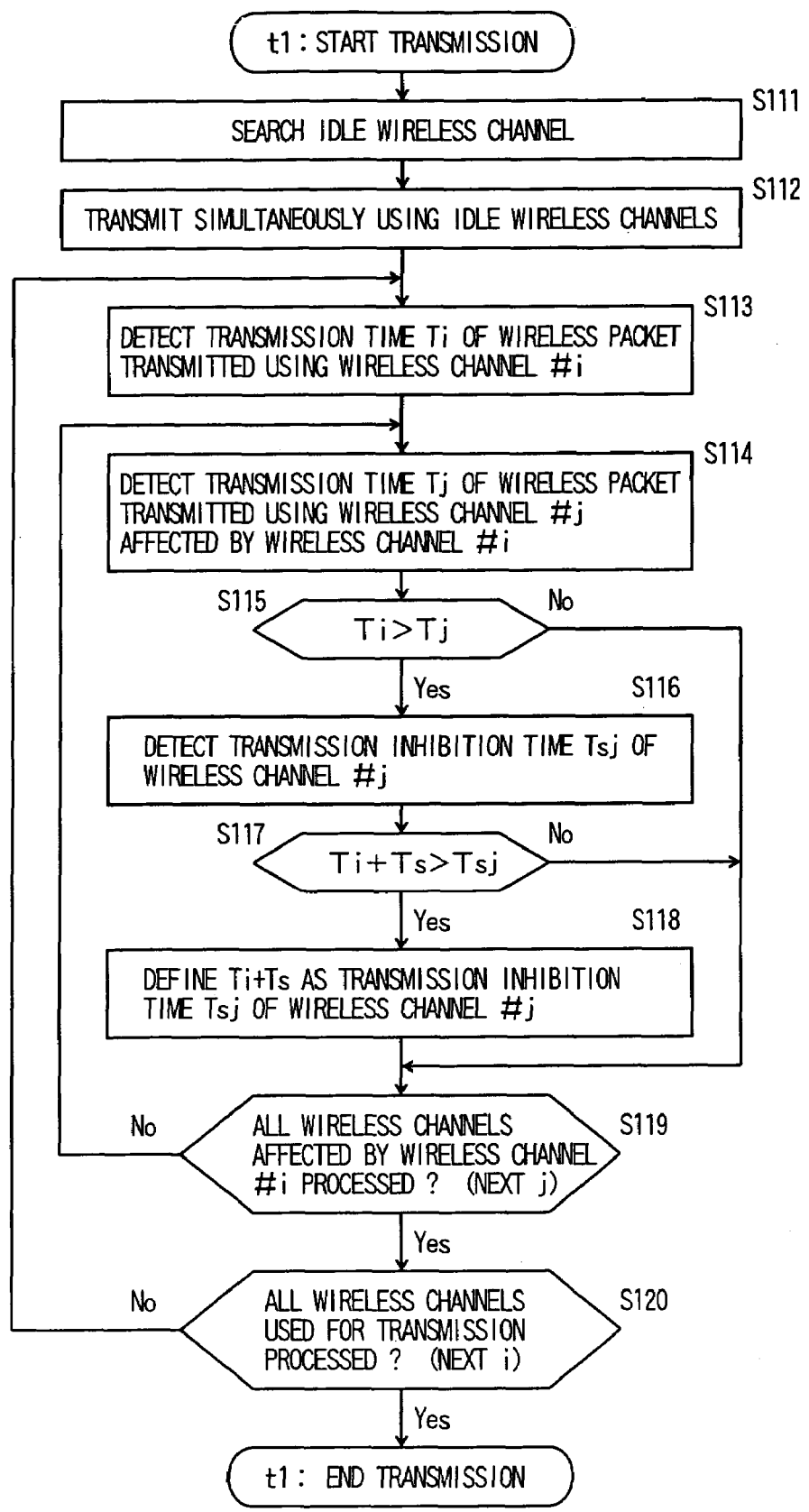
FIG. 5 is a flowchart showing a processing procedure according to a third embodiment of the present invention.
Figure 6:
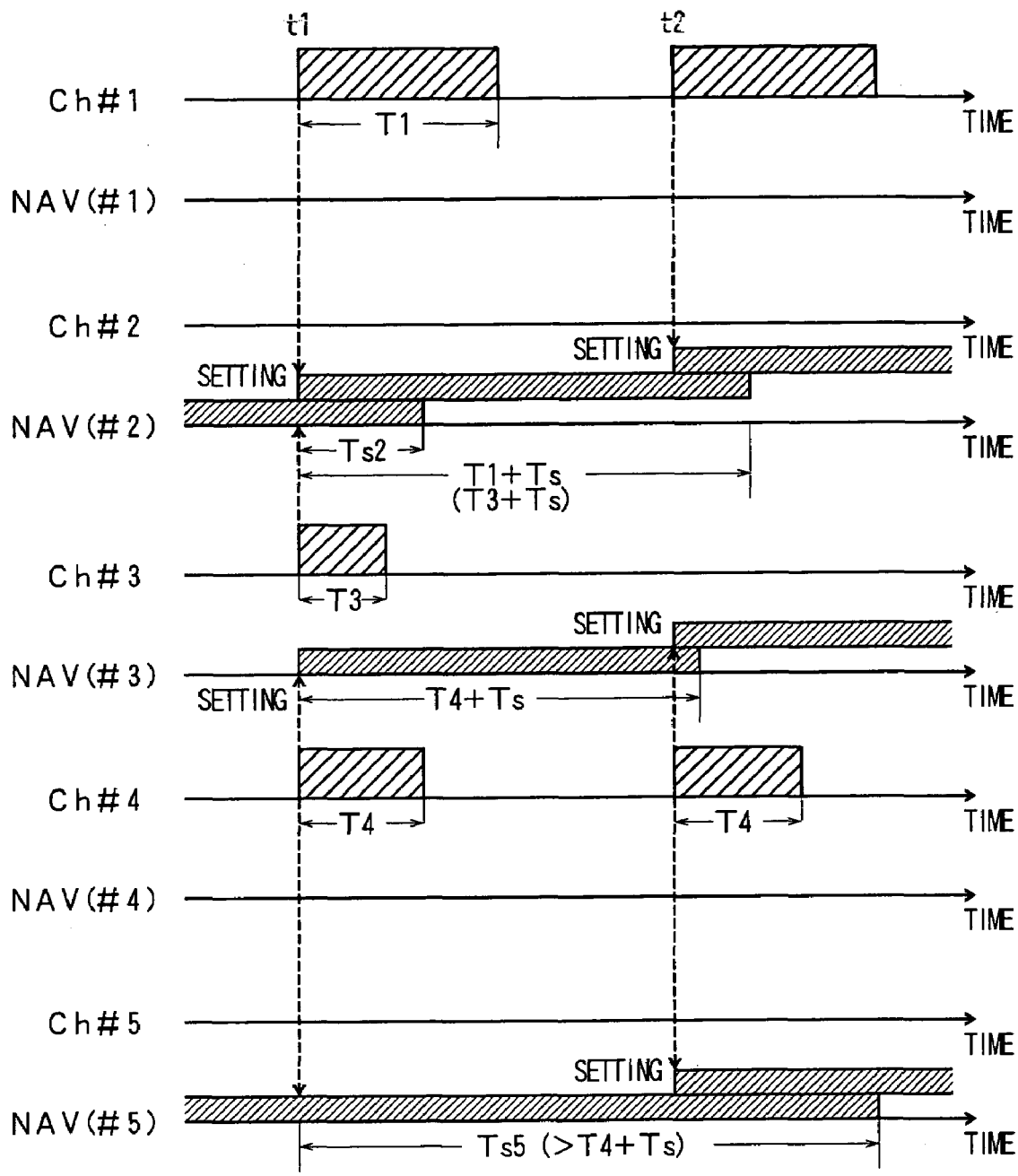
FIG. 6 is a time chart showing an example of operation according to the third embodiment of the present invention.

FIG. 5 shows a flowchart according to a third embodiment of the present invention. FIG. 6 shows an example of operation according to the third embodiment of the present invention. Here, wireless channels #1, #2, #3, #4, and #5 are prepared. It is assumed that at timing t1, the wireless channel #2 and #5 are busy due to a virtual carrier sense by the NAV defined by a wireless packet received before then. It is also assumed that the wireless channels #1 to #5 may be suffered from leakage only between the adjacent channels and would not be able to receive wireless packets if there is any leakage.

First, the process searches for a wireless channel that is idle at timing t1 (S111). Here, a physical carrier sense by RSSI and a virtual carrier sense by NAV (a detection of the transmission inhibition time) are performed to determine that the wireless channel is idle if no carriers are detected in both the detections. Then, the process uses the idle wireless channels to transmit a plurality of wireless packets simultaneously which are generated from data packets in a transmission queue (S112). Here, the wireless channels #1, #3 and #4 are idle, and three (or the sum total of counts of MIMO in each wireless channel) wireless packets are transmitted using the wireless channels #1, #3 and #4.

Then, processing is performed from SI13 to S120 on each of the wireless channels #i used for transmission (here, #1, #3, and #4). First, the process detects the transmission time Ti of the wireless packet to be transmitted from the wireless channel #i (i=1, 3, and 4) (S113). Then, processing is performed from S114 to S119 on each of the wireless channels #j (here, the adjacent channels) which are affected by the wireless channel #i. First, the process detects a transmission time Tj of the wireless packet to be transmitted from the wireless channel #j (S114). Then, the process compares the transmission time Ti of the wireless channel #i with each transmission time Tj of the adjacent wireless channels #j (S115). Since a wireless channel #j with Ti>Tj terminates transmission during transmission over the wireless channel #i, the process sets the NAV to a transmission inhibition time according to the following procedures (S116 to S118). Here, this is directed to the wireless channel #2 for the wireless channels #1 and #3 and to the wireless channels #3 and #5 for the wireless channel #4.

Then, the process detects a transmission inhibition time Tsj at which set is the NAV of the wireless channel #j with Ti>Tj (here, #2, #3, #4, and #5) (S116). Then, the process compares the time (Ti+Ts) obtained by adding a predetermined time Ts to Ti with the existing set transmission inhibition time Tsj. If Ti+Ts>Tsj, then the process sets the NAV to Ti+Ts as a new transmission inhibition time Tsj to perform processing on the next wireless channel (S117, S118, and S119). On the other hand, the process performs no processing on the wireless channel #j (here, #4) for which Ti>Tj is not true or the wireless channel #j (here, #5) for which Ti+Ts>Tsj is not true, but performs processing on the next wireless channel (S115, S117, and S119).

The foregoing processing is performed on all the wireless channels #i used for transmission (S113 to S120).

As a result, the process provides no setting to the NAV of the wireless channels #1, #4, and #5. The NAV of the wireless channel #2 is set to the greater one (T1+Ts) of the transmission inhibition time (T1+Ts) by the wireless channel #1 and the transmission inhibition time (T3+Ts) by the wireless channel #3. The NAV of the wireless channel #3 is set to the transmission inhibition time (T4+Ts) by the wireless channel #4. Accordingly, at the next timing t2, the process determines that the wireless channels #2, #3, and #5 are busy due to a virtual carrier sense by NAV, and thus allows the wireless channels #1 and #4 to be used for transmission of wireless packets. At the same time, the transmission inhibition time will be also defined in the same manner.

Fourth Embodiment

In the second embodiment, with respect to the wireless channel requiring the longest transmission time Tmax of the wireless packets to be transmitted simultaneously, all the other wireless channels are provided with the setting of the transmission inhibition time (Tmax+Ts). However, the existing set transmission inhibition time Tsi would remain unchanged if greater than Tmax+Ts. Assuming a case where leakage from a wireless channel having the longest transmission time disables reception so that a new transmission inhibition time cannot be defined, this method provides the same set transmission inhibition time to the other wireless channels.

The fourth embodiment is characterized by detecting received power to select a wireless channel actually affected by leakage, instead of the method according to the second embodiment which is directed to all the wireless channels other than the wireless channel having the longest transmission time.

Figure 7:
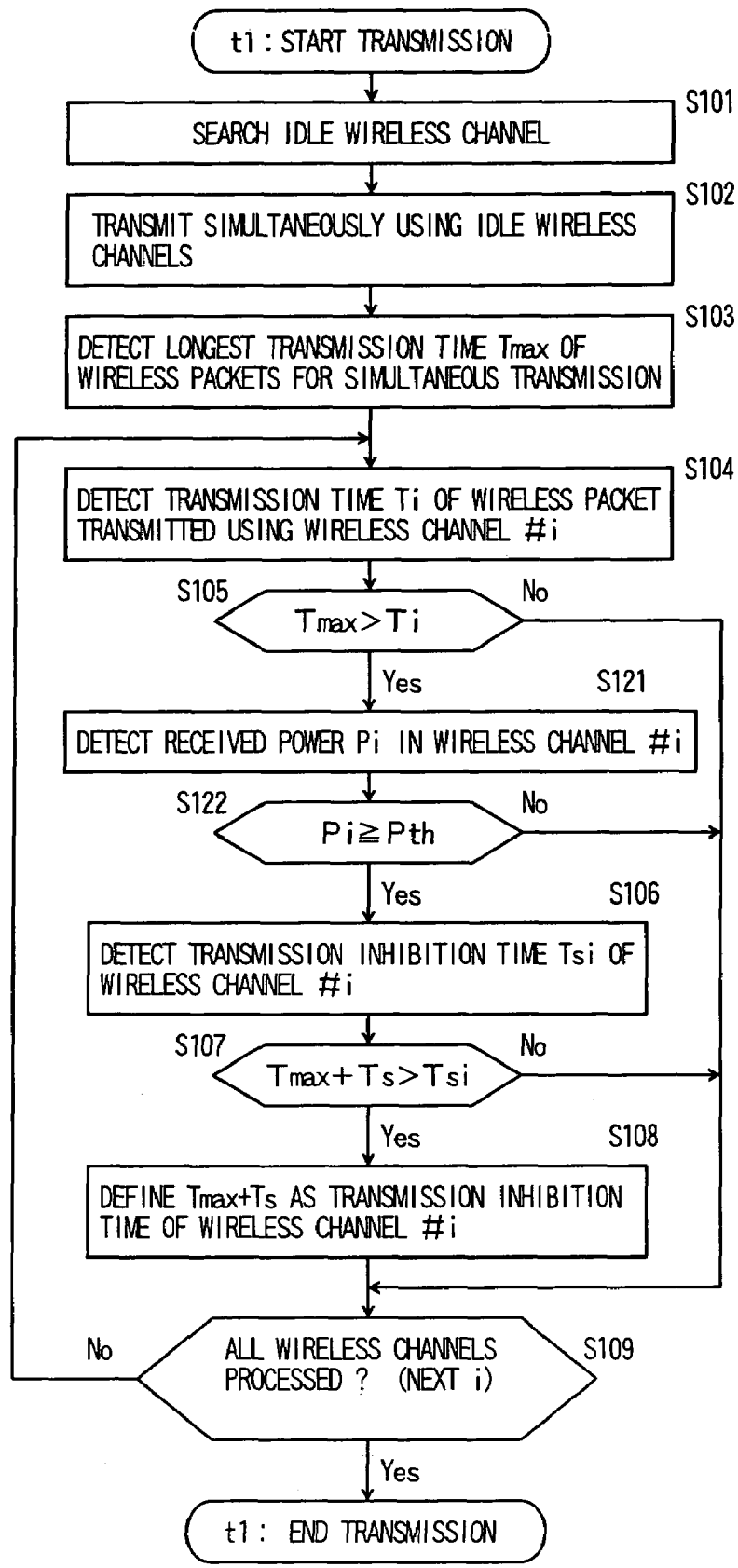
FIG. 7 is a flowchart showing a processing procedure according to a fourth embodiment of the present invention.
Figure 8:
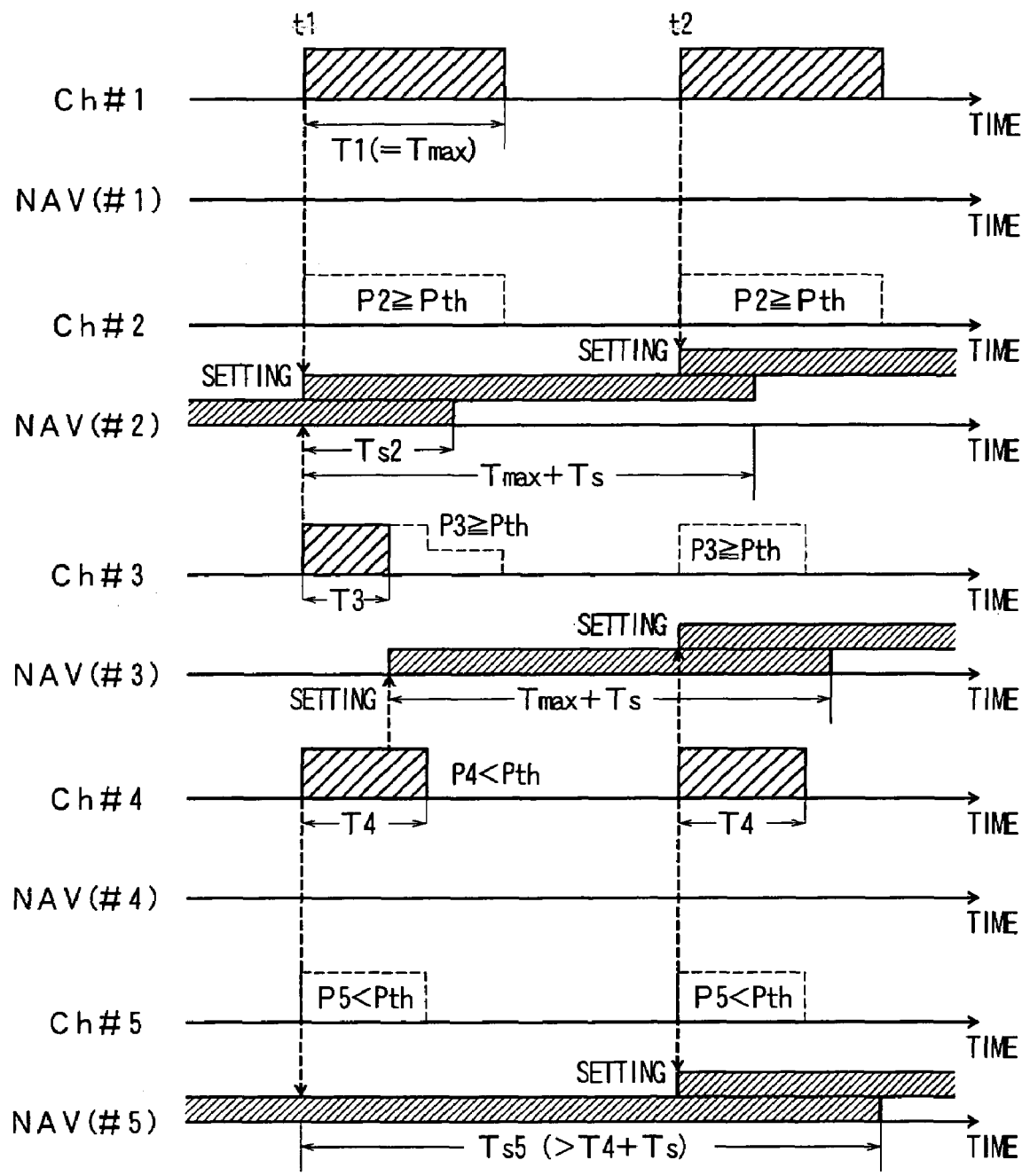
FIG. 8 is a time chart showing an example of operation according to the fourth embodiment of the present invention.

FIG. 7 shows a flowchart according to a fourth embodiment of the present invention. FIG. 8 shows an example of operation according to the fourth embodiment of the present invention. Here, wireless channels #1, #2, #3, #4, and #5 are prepared. It is assumed that at timing t1, the wireless channel #2 and #5 are busy due to a virtual carrier sense by the NAV defined by a wireless packet received before then.

First, the process searches for a wireless channel that is idle at timing t1 (S101). Here, a physical carrier sense by RSSI and a virtual carrier sense by NAV (a detection of the transmission inhibition time) are performed to determine that the wireless channel is idle if no carriers are detected in both the detections. Then, the process uses the idle wireless channels to transmit a plurality of wireless packets simultaneously which are generated from data packets in a transmission queue (S102). Then, the process detects the longest transmission time Tmax of the transmission times for the wireless packets to be transmitted simultaneously (S103). Here, the wireless channel #1 is idle, and three (or the sum total of counts of MIMO in each wireless channel) wireless packets are transmitted using the wireless channels #1, #3, and #4, in which the process detects the longest transmission time Tmax of them (here, the transmission time Ti of the wireless channel #1).

Then, processing is performed from S104 to S109 on each of the wireless channels #1 to #5. First, the process detects the transmission time Ti of the wireless packet to be transmitted from the wireless channel #i (i=1 to 5) (S104). Then, the process compares the longest transmission time Tmax with the transmission time Ti of the wireless packet to be transmitted from the wireless channel #i (S105). Here, since the transmission time T1 of the wireless channel #1 is the longest (Tmax=T1), and Tmax>Ti in other than the wireless channel #1, the following processing is directed to other than the wireless channel #1.

In the wireless channel #i with Tmax>Ti, the process detects received power Pi, while no transmission is being made, which is in turn compared with a predetermined threshold value Pth (S121 and S122). If the received power Pi is greater than or equal to Pth, then the process determines that the wireless channel #i is affected by leakage, and then sets the NAV to a transmission inhibition time according to the procedures (S106 to S108) shown below. Here, the received power P2 of the wireless channel #2 becomes greater than or equal to Pth due to leakage from the wireless channels #1 and #3, and the received powers P3 and P5 of the wireless channels #3 and #5 become greater than or equal to Pth due to leakage from the wireless channel #4, whereas the received power of the wireless channels #1 and #4 becomes not greater than or equal to Pth. Accordingly, the process provides a set transmission inhibition time to the wireless channels #2, #3, and #5.

The process detects the transmission inhibition time Tsi at which set is the NAV of the wireless channel #i (i=2, 3, and 5) (S106). Here, Ts2 and Ts5 are detected for the wireless channels #2 and #5. Then, the process compares the time (Tmax+Ts) obtained by adding a predetermined time Ts to Tmax with the existing set transmission inhibition time Tsi. If Tmax+Ts>Tsi, then the process sets the NAV to Tmax+Ts as a new transmission inhibition time, and performs processing on the next wireless channel (S107, S108, and S109). On the other hand, the process performs no processing on the wireless channel #i (here, #1) for which Tmax>Ti is not true, the channel #i (here, #4) for which the received power Pi is less than Pth, or the wireless channel #i (here, #5) for which Tmax+Ts>Tsi is not true, but performs processing on the next wireless channel (S106, S122, S107, and S109).

Accordingly, the process provides no setting to the NAV of the wireless channel #1 having the longest transmission time Tmax as well as to the NAV of the wireless channel #4 not being affected by leakage. The process allows the NAV of the wireless channels #2 and #3 to be set to the transmission inhibition time (Tmax+Ts), while allowing the NAV of the wireless channel #5 to be held at the current transmission inhibition time (Ts5). Accordingly, at the next timing t2, the process determines that the wireless channels #2, #3, and #5 are busy due to a virtual carrier sense by NAV, thus allows the wireless channels #1 and #4 to be used for transmission of wireless packets. At the same time, the transmission inhibition time will be also defined in the same manner.

Fifth Embodiment

In the third embodiment, the wireless channel #j that will be affected by leakage from the wireless channel #i used for transmission is predetermined (e.g., an adjacent channel) to provide a set transmission inhibition time (Ti+Ts) to the wireless channel #j. However, the wireless channel #j that is affected by multiple wireless channels is provided with the longest setting of the respective transmission inhibition times thereof, whereas the existing set transmission inhibition time Tsj greater than Ti+Ts would remain unchanged. This method allows the wireless channel affected by leakage to be predetermined, thereby making it possible to prevent the same setting of transmission inhibition time from being also provided to a wireless channel that is not affected by leakage.

The fifth embodiment is characterized by detecting the received power of a predetermined wireless channel to select a wireless channel that is actually affected by leakage, instead of the method according to the third embodiment which is directed to all the wireless channels which have been predetermined to be affected by leakage.

Figure 9:
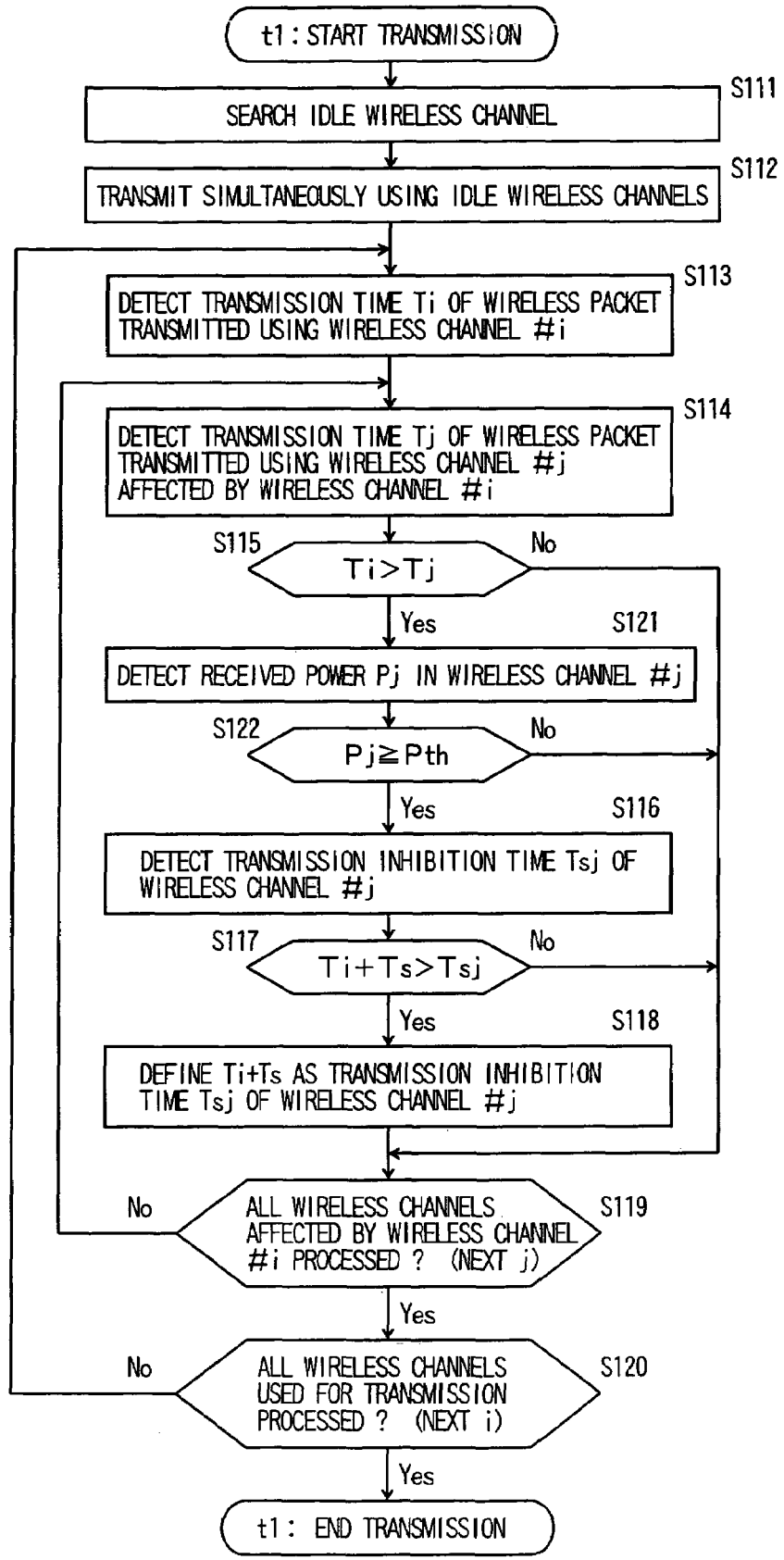
FIG. 9 is a flowchart showing a processing procedure according to a fifth embodiment of the present invention.
Figure 10:
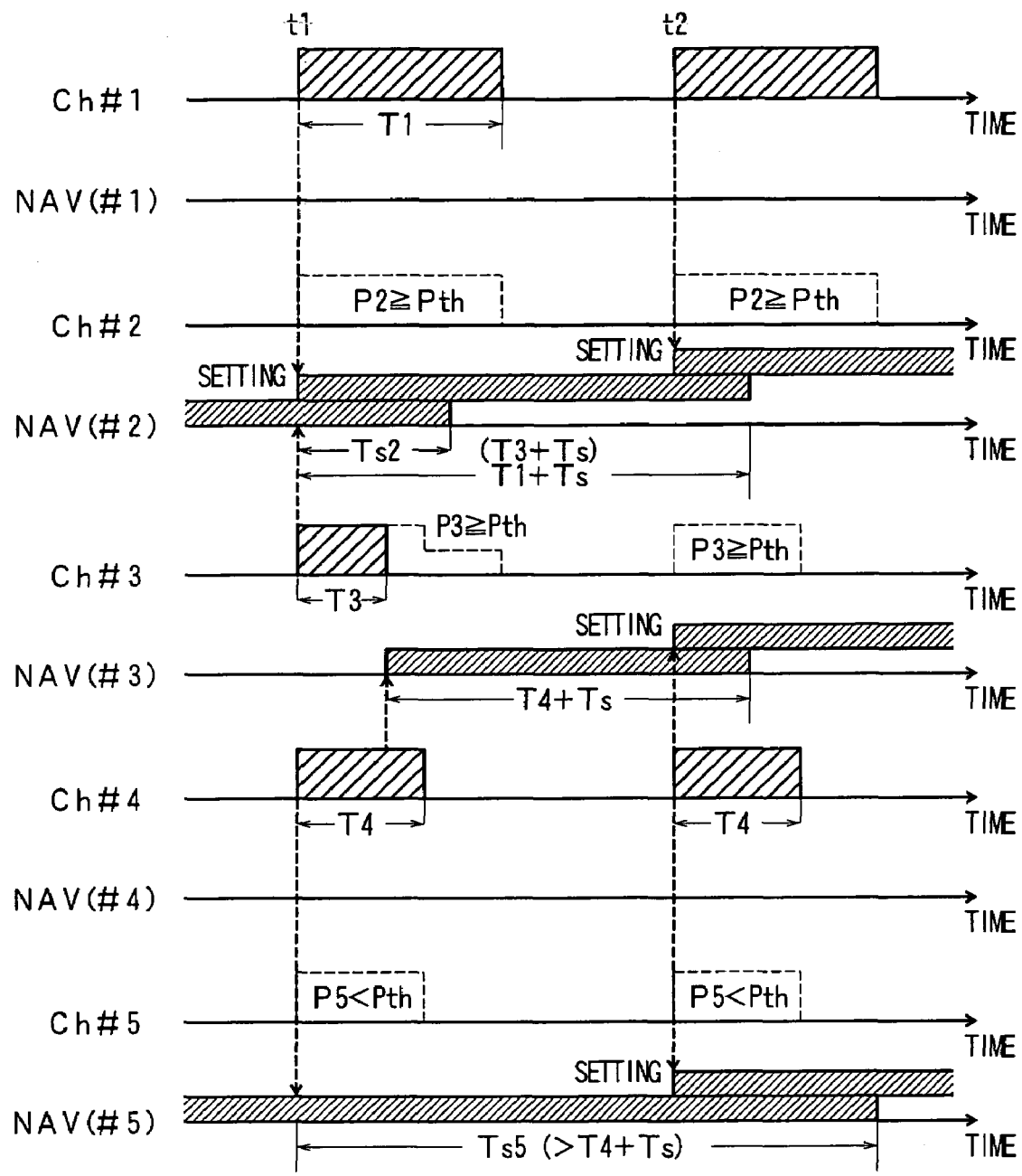
FIG. 10 is a time chart showing an example of operation according to the fifth embodiment of the present invention.

FIG. 9 shows a flowchart according to the fifth embodiment of the present invention. FIG. 10 shows an example of operation according to the fifth embodiment of the present invention. Here, wireless channels #1, #2, #3, #4, and #5 are prepared. It is assumed that at timing t1, the wireless channel #2 and #5 are busy due to a virtual carrier sense by the NAV defined by a wireless packet received before then. It is also assumed that the wireless channels #1 to #5 may be suffered from leakage only between the adjacent channels.

First, the process searches for a wireless channel that is idle at timing t1 (S111). Here, a physical carrier sense by RSSI and a virtual carrier sense by NAV (a detection of the transmission inhibition time) are performed to determine that the wireless channel is idle if no carriers are detected in both the detections. Then, the process uses the idle wireless channels to transmit a plurality of wireless packets simultaneously which are generated from data packets in a transmission queue (S112). Here, the wireless channels #1, #3 and #4 are idle, and three (or the sum total of counts of MIMO in each wireless channel) wireless packets are transmitted using the wireless channels #1, #3 and #4.

Then, processing is performed from S113 to S120 on each of the wireless channels #i used for transmission (here, #1, #3, and #4). First, the process detects the transmission time Ti of the wireless packet to be transmitted from the wireless channel #i (i=1, 3, and 4) (S113). Then, processing is performed from S114 to S119 on each of the wireless channels #j (here, the adjacent channels) which are affected by the wireless channel #i. First, the process detects a transmission time Tj of the wireless packet to be transmitted from the wireless channel #j (S114). Then, the process compares the transmission time Ti of the wireless channel #i with each transmission time Tj of the adjacent wireless channels #j (S15). Since the wireless channel #j with Ti>Tj terminates transmission during transmission over the wireless channel #i, the process sets the NAV to a transmission inhibition time according to the following procedures (S121 to S118). Here, this is directed to the wireless channel #2 for the wireless channels #1 and #3 and to the wireless channels #3 and #5 for the wireless channel #4.

Then, in the wireless channel #j with Ti>Tj (here, #2, #3, and #5), the process detects the received power Pi, while no transmission is being made, which is in turn compared with a predetermined threshold value Pth (S121 and S122). If the received power Pi is greater than or equal to Pth, then the process determines that the wireless channel #j is affected by leakage, and then sets the NAV to a transmission inhibition time according to the procedures (S116 to S118) shown below. Here, the received power P2 of the wireless channel #2 becomes greater than or equal to Pth due to leakage from the wireless channels #1 and #3, and the received powers P3 and P5 of the wireless channels #3 and #5 become greater than or equal to Pth due to leakage from the wireless channel #4, whereas the received power of the wireless channels #1 and #4 becomes not greater than or equal to Pth. Accordingly, the process provides a set transmission inhibition time to the wireless channels #2, #3, and #5.

The process detects the transmission inhibition time Tsj at which set is the NAV of the wireless channel #i (i=2, 3, and 5) (S116). Then, the process compares the time (Ti+Ts) obtained by adding a predetermined time Ts to Ti with the existing set transmission inhibition time Tsj. If Ti+Ts>Tsj, then the process sets the NAV to Ti+Ts as a new transmission inhibition time Tsj to perform processing on the next wireless channel (S117, S118, and S119). On the other hand, the process performs no processing on the wireless channel #j (here, #4) for which Ti>Tj is not true, the wireless channel #i for which the received power Pi is less than Pth, or the wireless channel #j (here, #5) for which Ti+Ts >Tsj is not true, but performs processing on the next wireless channel (S115, S122, S117, and S119).

The foregoing processing is performed on all the wireless channels #i used for transmission (S113 to S120).

As a result, the process provides no setting to the NAV of the wireless channels #1, #4, and #5. The NAV of the wireless channel #2 is set to the greater one (T1+Ts) of the transmission inhibition time (T1+Ts) for the wireless channel #1 and the transmission inhibition time (T3+Ts) for the wireless channel #3. After having transmitted, the NAV of the wireless channel #3 is set to the transmission inhibition time (T4+Ts) by the wireless channel #4. Accordingly, at the next timing t2, the process determines that the wireless channels #2, #3, and #5 are busy due to a virtual carrier sense by NAV, and thus allows the wireless channels #1 and #4 to be used for transmission of wireless packets. At the same time, the transmission inhibition time will be also defined in the same manner.

Sixth Embodiment

The sixth to ninth embodiments shown below include a procedure, in addition to those of the second to fifth embodiments, for detecting an error in a received wireless packet to check for an effect of leakage (S131).

Figure 11:
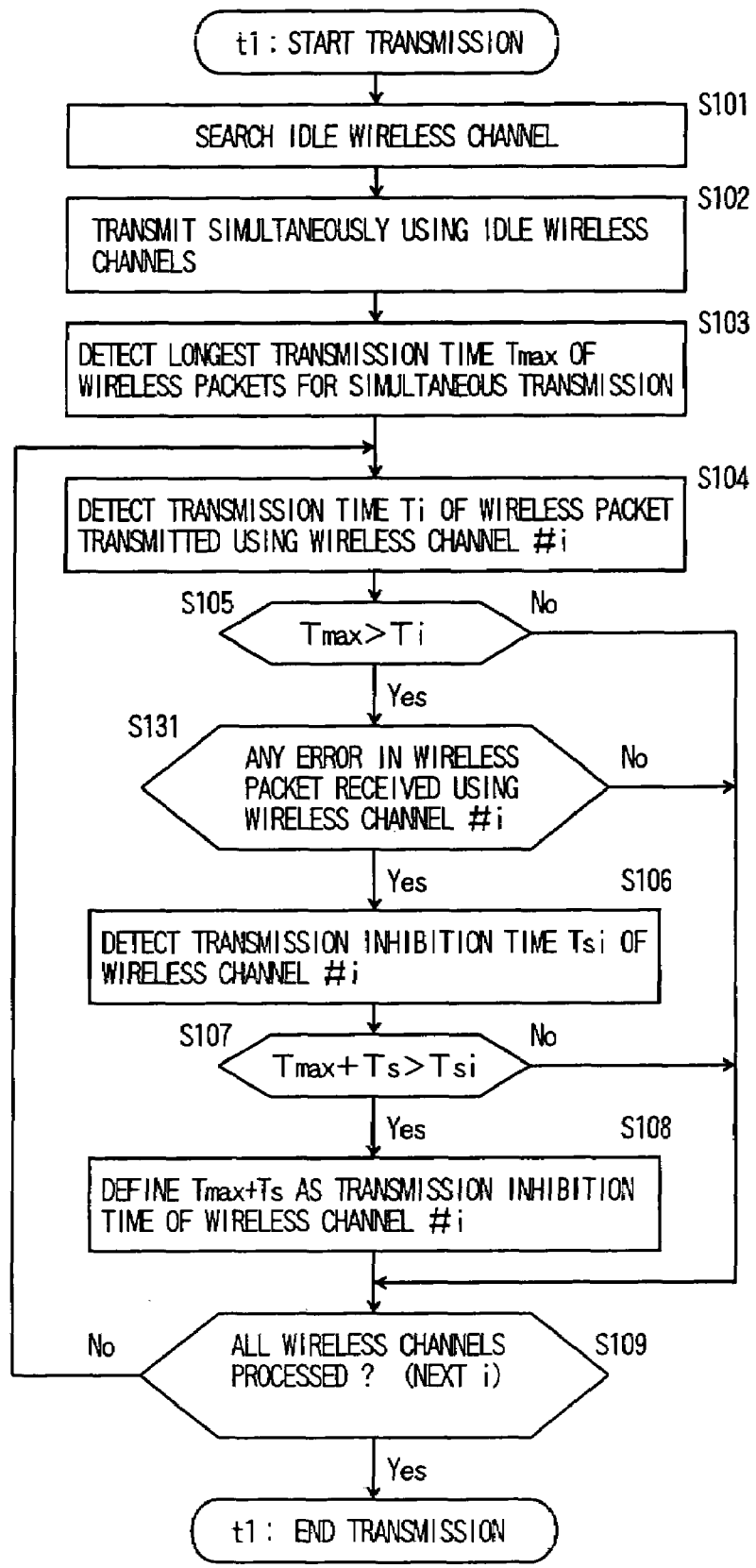
FIG. 11 is a flowchart showing a processing procedure according to a sixth embodiment of the present invention.

FIG. 11 shows a flowchart according to the sixth embodiment of the present invention. This embodiment is characterized in that a check is made for an error in a received wireless packet (S131) in the wireless channel #i with Tmax>Ti (S105) in the second embodiment, and if there is an error, the process determines that the wireless channel #i is affected by leakage to set the NAV to a transmission inhibition time according to the procedures (S106 to S108) shown below. In the example of FIG. 4, the process will not immediately start providing a setting of transmission inhibition time to the wireless channel #2, #3, and #4 but proceeds to detecting the transmission inhibition time Tsi at which set is the NAV of the wireless channel with a received wireless packet including an error (S106). The other procedures are the same as those of the second embodiment.

Seventh Embodiment

Figure 12:
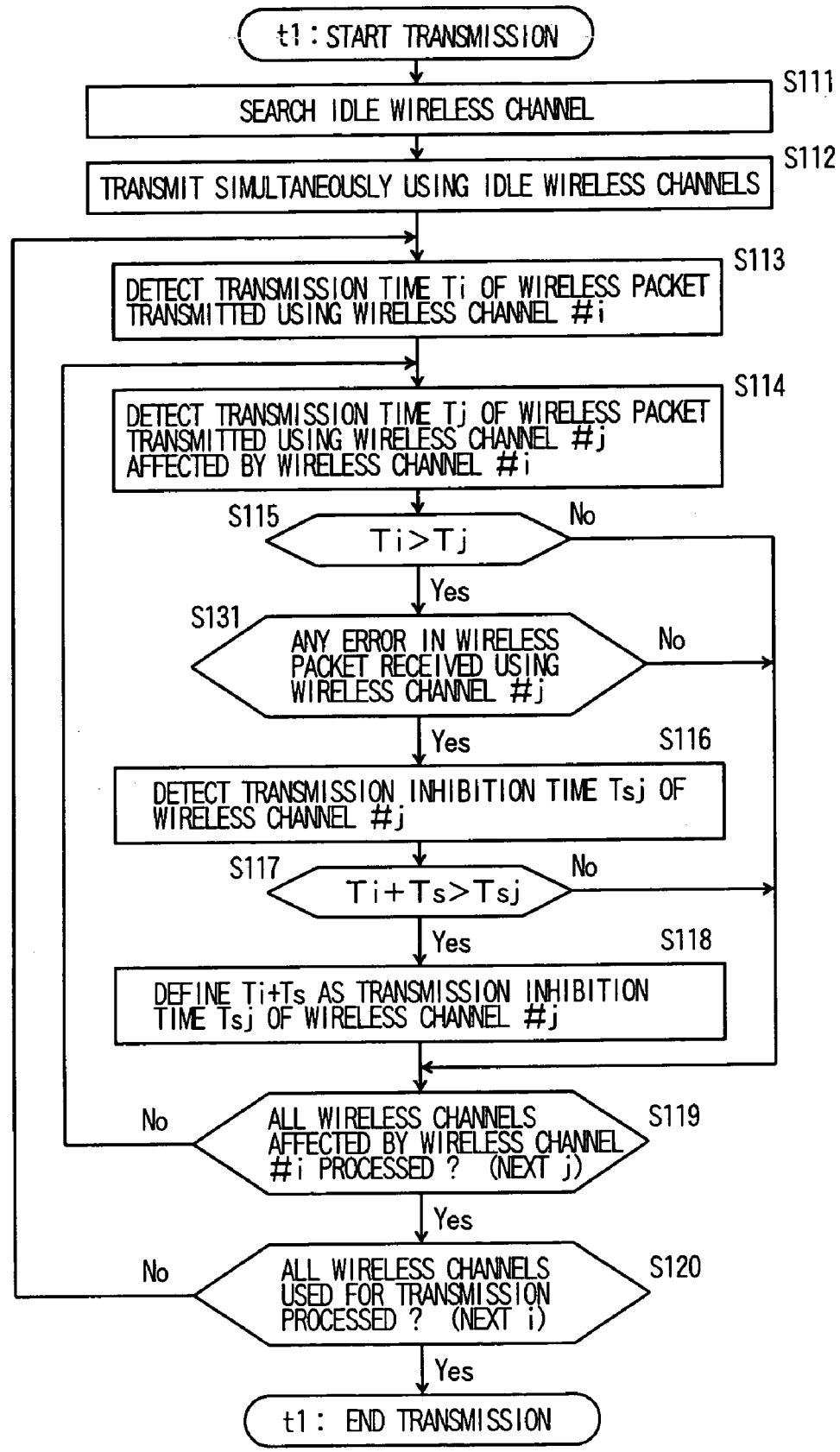
FIG. 12 is a flowchart showing a processing procedure according to a seventh embodiment of the present invention.

FIG. 12 shows a flowchart according to a seventh embodiment of the present invention. This embodiment is characterized in that a check is made for an error in a received wireless packet (S131) in the wireless channel #j with Ti>Tj (S115) in the third embodiment, and if there is an error, the process determines that the wireless channel #j is affected by leakage to set the NAV to a transmission inhibition time according to the procedures (S116 to S118) shown below. In the example of FIG. 6, the process will not immediately start providing a setting of transmission inhibition time to the wireless channels #2, #3, and #5 but proceeds to detecting the transmission inhibition time Tsi at which set is the NAV of the wireless channel with a received wireless packet including an error (S116). The other procedures are the same as those of the third embodiment.

Eighth Embodiment

Figure 13:
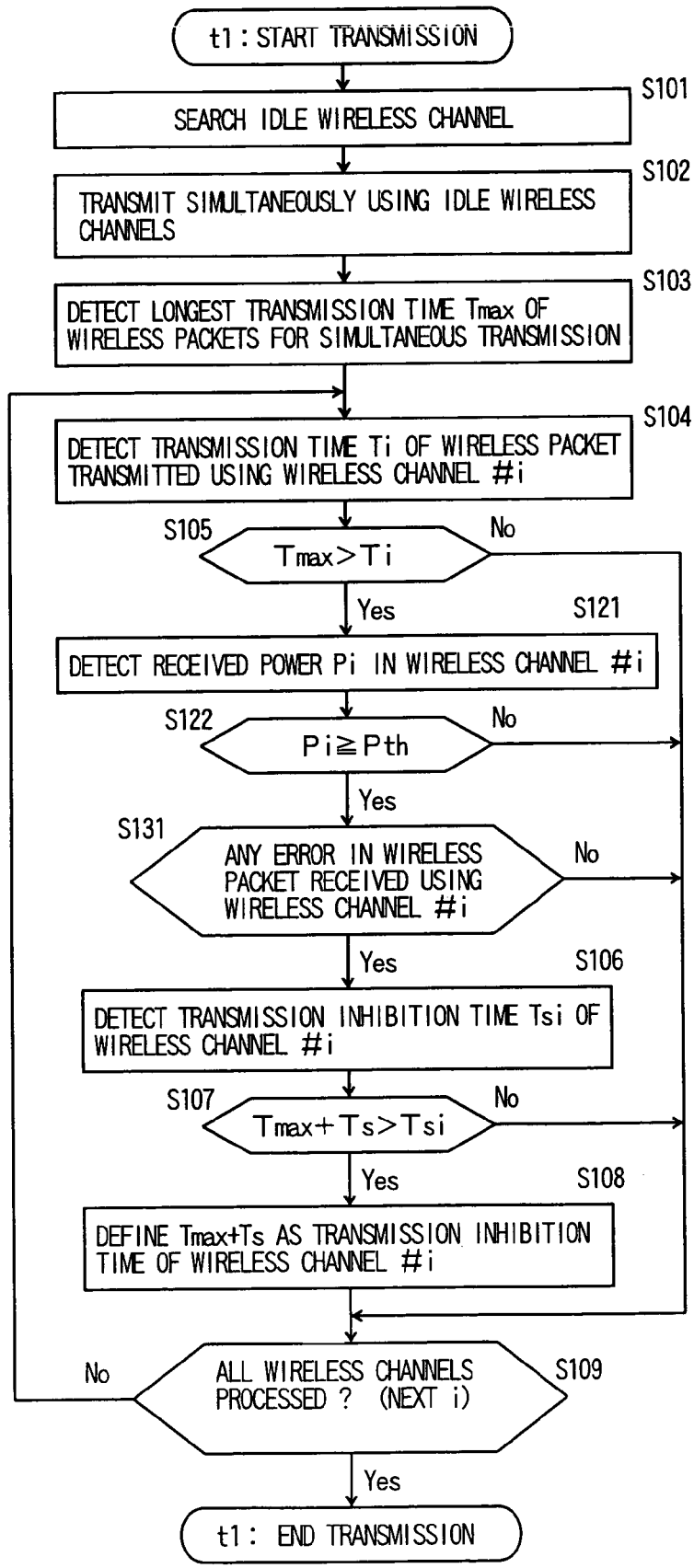
FIG. 13 is a flowchart showing a processing procedure according to an eighth embodiment of the present invention.

FIG. 13 shows a flowchart according to an eighth embodiment of the present invention. This embodiment is characterized in that a check is made for an error in a received wireless packet (S131) in the wireless channel #i with Tmax>Ti and Pi>Pth (S105, S121, and S122) in the fourth embodiment, and if there is an error, the process determines that the wireless channel #i is affected by leakage to set the NAV to a transmission inhibition time according to the procedures (S106 to S108) shown below. In the example of FIG. 8, the process will not immediately start providing a setting of transmission inhibition time to the wireless channels #2, #3, and #5 but proceeds to detecting the transmission inhibition time Tsi at which set is the NAV of the wireless channel with a received wireless packet including an error (S106). The other procedures are the same as those of the third embodiment.

In this embodiment, a wireless channel #i is taken into account which has the transmission time Ti less than Tmax (including Ti=0), the received power Pi greater than or equal to Pth, the received wireless packet including an error, and the transmission inhibition time Tsi less than Tmax+Ts (including Tsi=0). The process determines that the wireless channel #i is affected by leakage from the wireless channel with the transmission time Tmax, and thus provides a set transmission inhibition time Tmax+Ts thereto.

Ninth Embodiment

Figure 14:
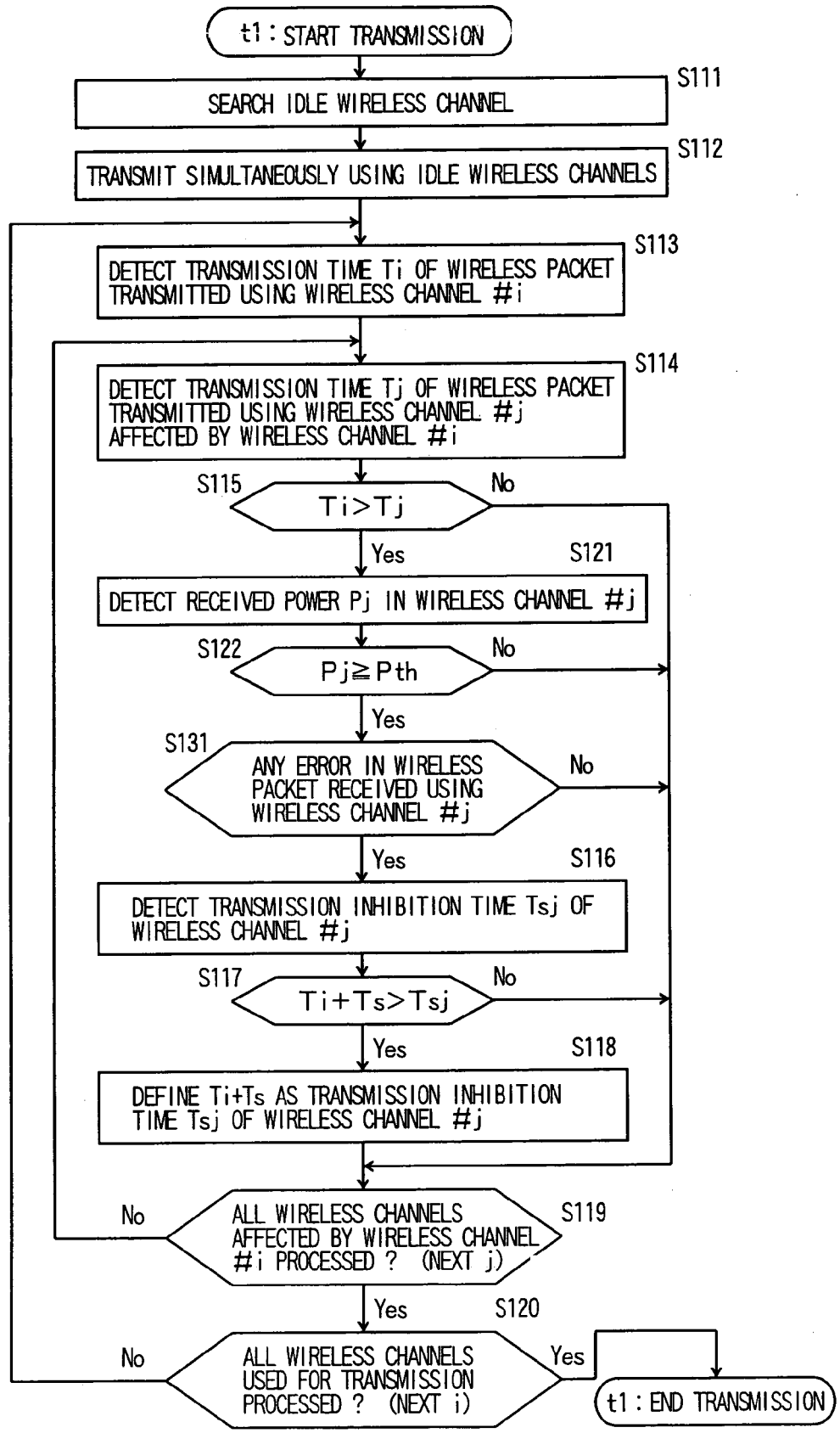
FIG. 14 is a flowchart showing a processing procedure according to a ninth embodiment of the present invention.

FIG. 14 shows a flowchart according to a ninth embodiment of the present invention. This embodiment is characterized in that a check is made for an error in a received wireless packet (S131) in the wireless channel #j with Ti>Tj and Pi>Pth (S115, S121, and S122) in the fifth embodiment, and if there is an error, the process determines that the wireless channel #j is affected by leakage to set the NAV to a transmission inhibition time according to the procedures (S116 to S118) shown below. In the example of FIG. 10, the process will not immediately start providing a setting of transmission inhibition time to the wireless channels #2, #3, and #5 but proceeds to detecting the transmission inhibition time Tsi at which set is the NAV of the wireless channel with a received wireless packet including an error (S116). The other procedures are the same as those of the fifth embodiment.

In this embodiment, a wireless channel #j affected by the wireless channel #i is taken into account which has the transmission time Tj less than Ti (including Tj=0), the received power Pi greater than or equal to Pth, the received wireless packet including an error, and the transmission inhibition time Tsi less than Ti+Ts (including Tsj=0). The process determines that the wireless channel #j is affected by leakage from the wireless channel #i, thus provides a set transmission inhibition time Ti+Ts thereto.

Tenth Embodiment

Figure 50:
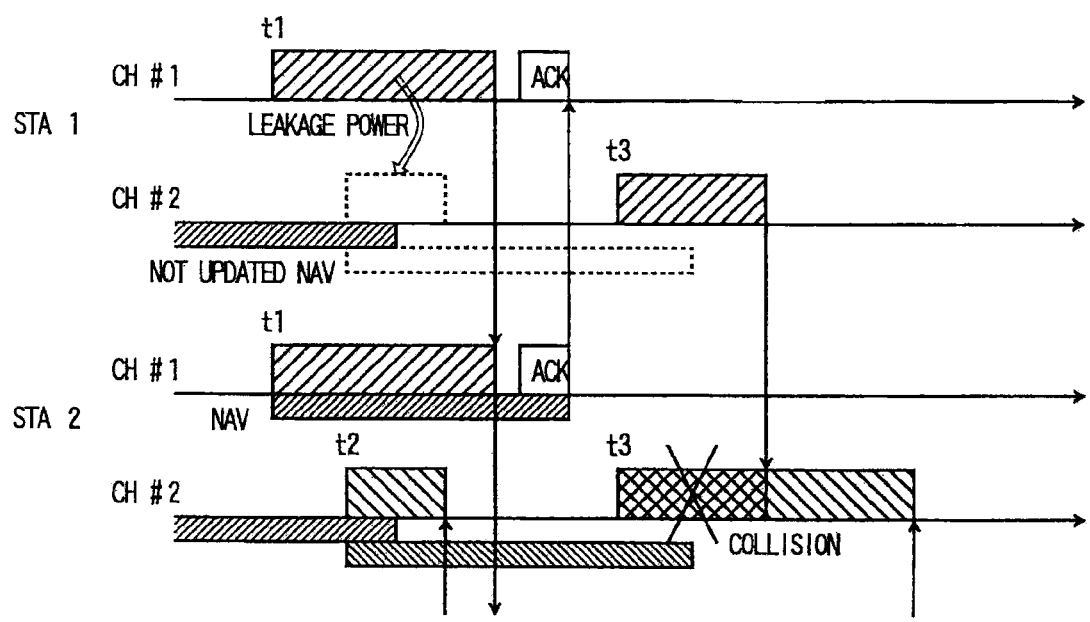
FIG. 50 is an explanatory view illustrating a problem with the method for wireless packet communication using two wireless channels.

In the second embodiment, the setting of transmission inhibition time (Tmax+Ts) is provided to the NAV of the wireless channels #2 and #3 assuming the presence of leakage from the wireless channel #1, thereby making it possible to prevent the situation where a wireless packet cannot be received and no setting can be provided to the NAV, as shown in FIG. 50. However, it is not always true that a wireless packet cannot be received over the wireless channels #2 and #3 having a setting of NAV and over the wireless channel #4 having an existing set NAV. If a wireless packet is successfully received while the transmission inhibition time is being defined, the current transmission inhibition time may be canceled to update the transmission inhibition time according to the occupied time described in the header. This embodiment is characterized by canceling and updating the transmission inhibition time in a wireless channel over which a wireless packet has been successfully received.

Figure 15:
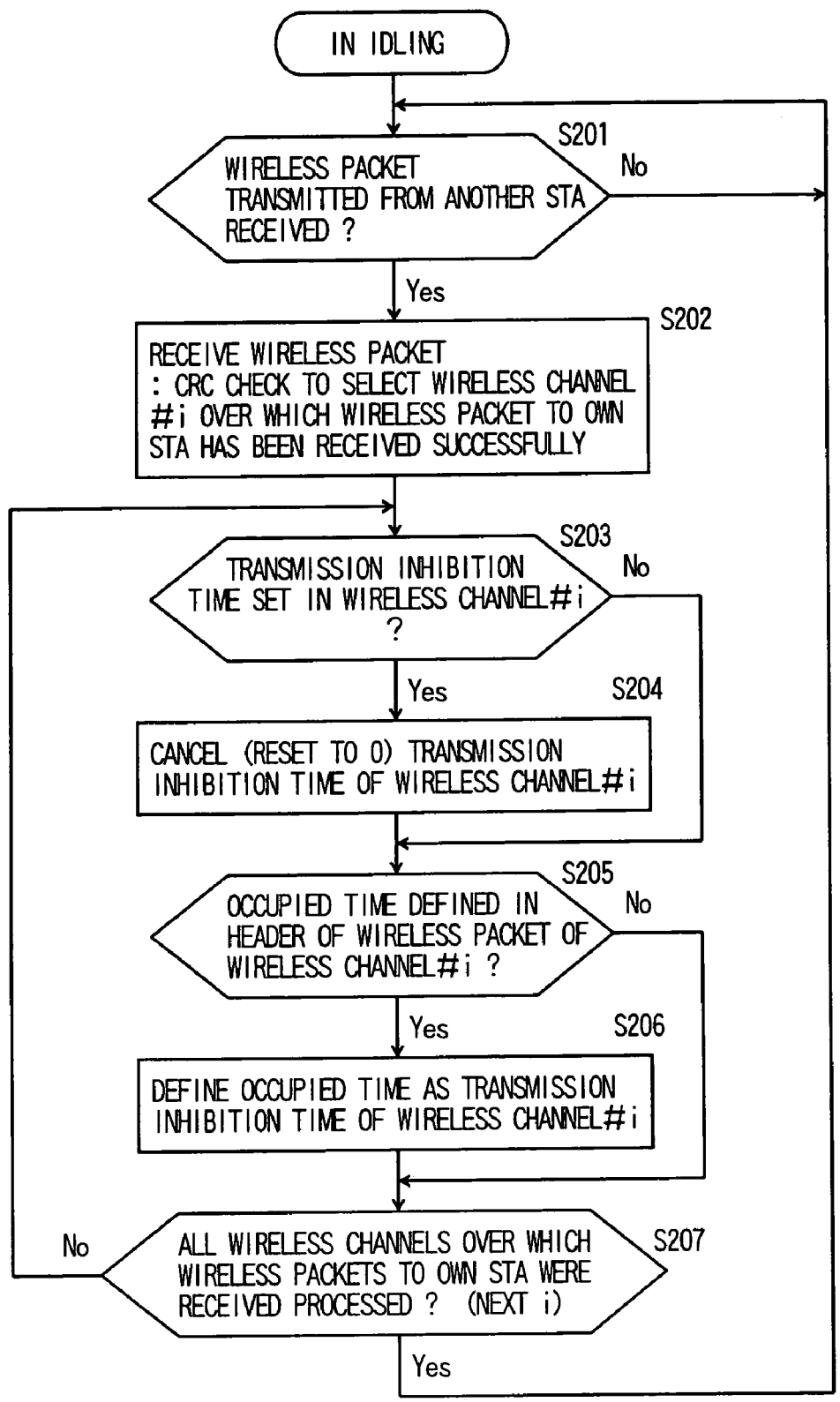
FIG. 15 is a flowchart showing a processing procedure according to a tenth embodiment of the present invention.
Figure 16:
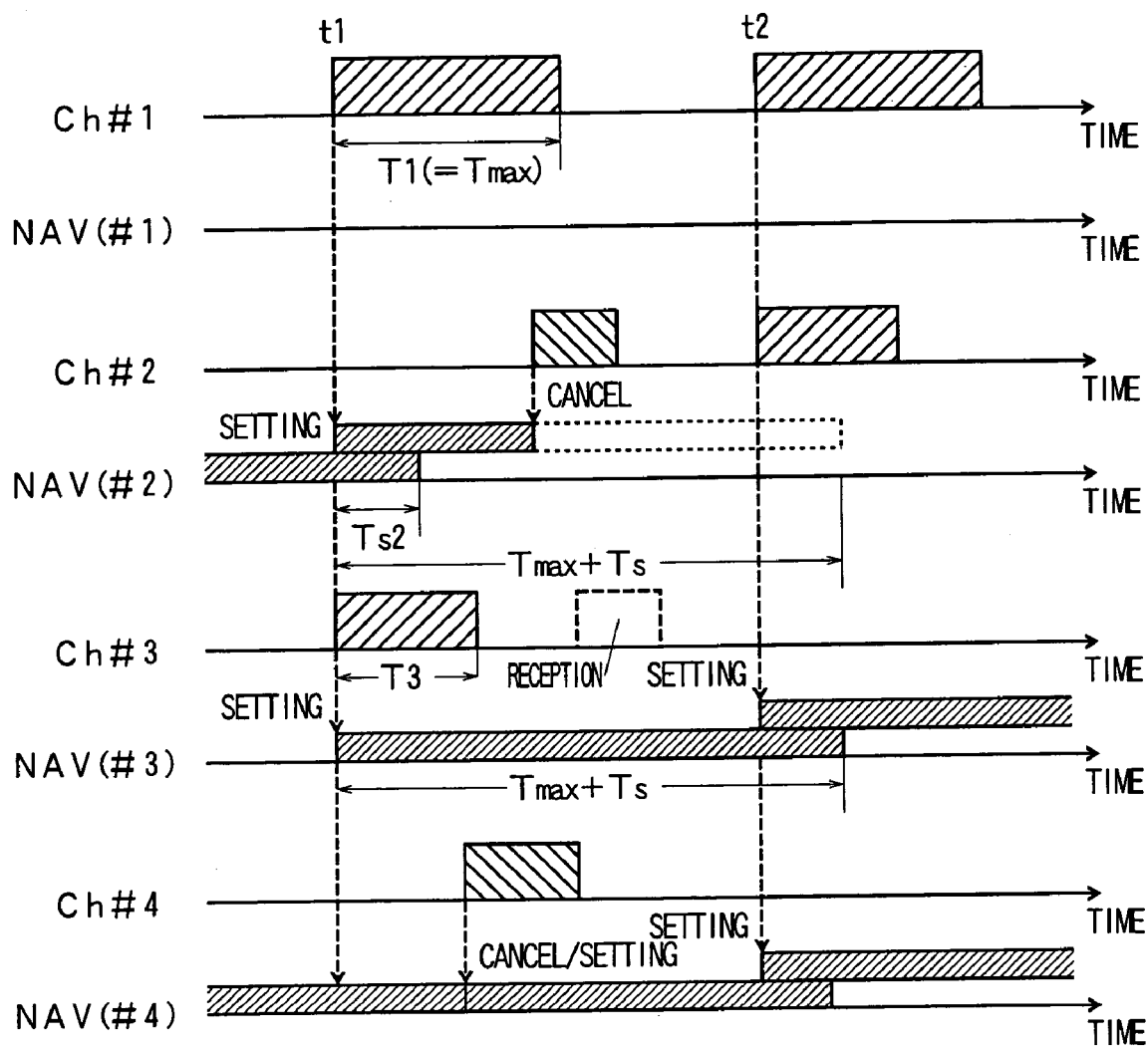
FIG. 16 is a time chart showing an example of operation according to the tenth embodiment of the present invention.

FIG. 15 shows a flowchart according to a tenth embodiment of the present invention. FIG. 16 shows an example of operation according to the tenth embodiment of the present invention. Here, it is assumed that the processing according to the second embodiment shown in FIG. 3 provides a setting of NAV to the wireless channels #2, #3, and #4 at timet1 as shown in FIG. 4.

While a search is being made for idling or idle wireless channels over which no wireless packets are being transmitted, each wireless channel would perform reception processing on a received wireless packet that has been transmitted from another STA (S201 and S202). In the reception processing, a CRC check is made for an error to select the wireless packets which are directed to the own STA that have been received successfully. Here, it is assumed that wireless packets are received over the wireless channels #2 to #4, so that the wireless packets directed to the own STA are successfully received over the wireless channels #2 and #4.

The process detects if the wireless channel #i (here, "2 and #4) has a set transmission inhibition time (S203). If so, the process cancels the transmission inhibition time (or resets it to zero) (S204).

Subsequently, the process detects if there is a field representing an occupied time in the header of the wireless packet (S205). If the occupied time is defined therein, the process sets the NAV to the value as a transmission inhibition time (S206), and then performs processing on the next wireless channel (S207).

Here, although the wireless channels #2 and #4 over which the wireless packets directed to the own STA have been received have their respective settings of transmission inhibition time, the header of the wireless packet in the wireless channel #2 has no setting of occupied time. Accordingly, the process only cancels the transmission inhibition time for the wireless channel #2, while updating the transmission inhibition time for the wireless channel #4.

As described above, wireless packets may be successfully received over the wireless channels #2 and #3 having a setting of NAV and over the wireless channel #4 having an existing set NAV. In this case, it is possible to cancel the current transmission inhibition time as well as to update the transmission inhibition time according to the occupied time described in the header. Accordingly, at the next timing t2 shown in FIG. 16, the process determines that the wireless channels #3 and #4 are busy due to a virtual carrier sense by NAV, and then allows the wireless channels #1 and #2 to be used for simultaneous transmission of wireless packets. At the same time, the transmission inhibition time will be also defined in the same manner.

11th Embodiment

In the third embodiment shown in FIGS. 5 and 6, wireless packets may also be successfully received over the wireless channels #2 and #3 having a setting of NAV and over the wireless channel #5 having an existing set NAV. In this case, it is also possible to cancel the current transmission inhibition time as well as to update the transmission inhibition time according to the occupied time described in the header.

Figure 17:
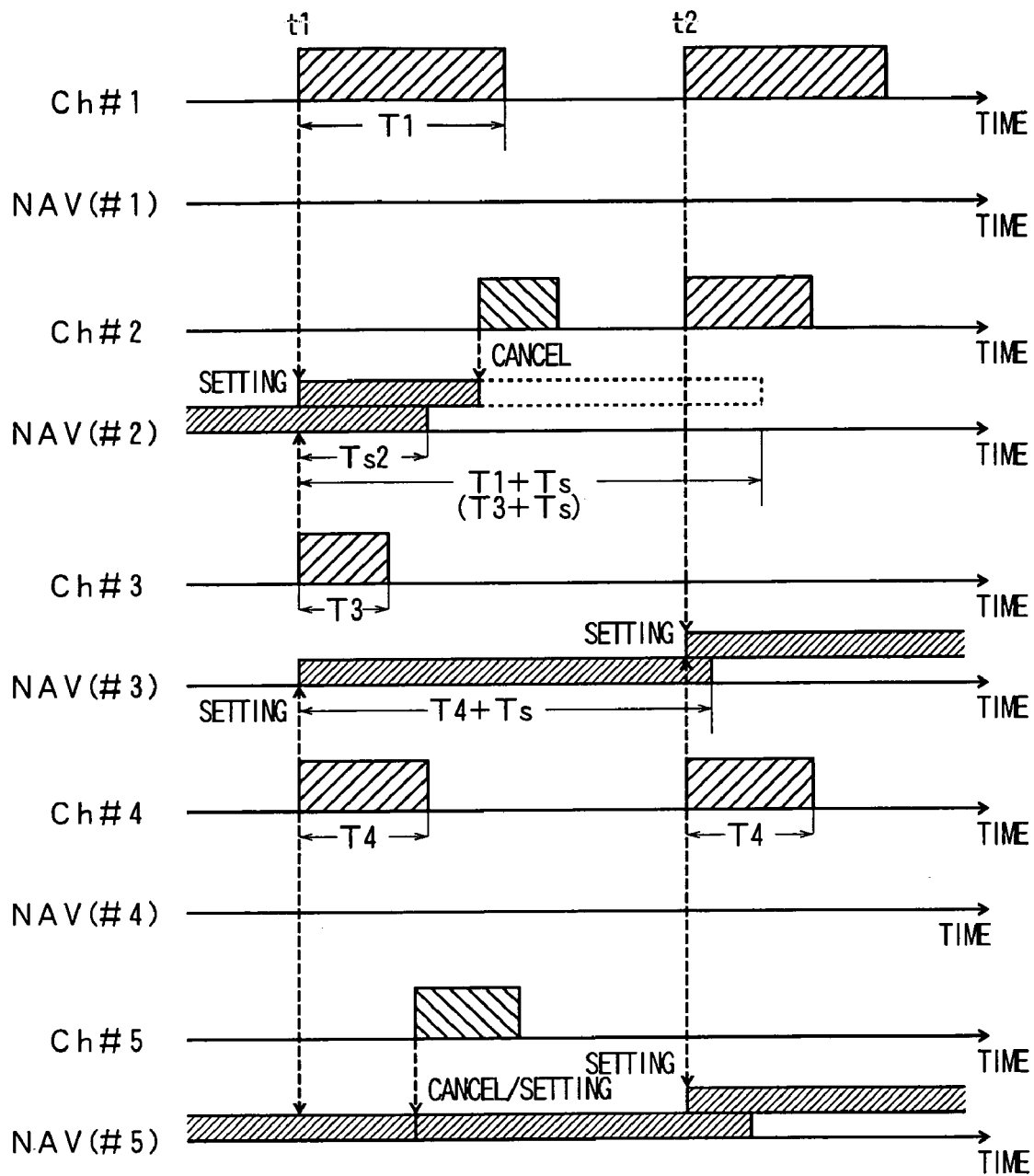
FIG. 17 is a time chart showing an example of operation according to an 11th embodiment of the present invention.

FIG. 17 shows an example of operation based on the procedure for canceling and updating the transmission inhibition time when wireless packets are successfully received in the third embodiment (FIGS. 5 and 6). Here, although the wireless channels #2 and #5 over which the wireless packets directed to the own STA have been received have their respective settings of transmission inhibition time, the header of the wireless packet in the wireless channel #2 has no setting of occupied time. Accordingly, the process only cancels the transmission inhibition time for the wireless channel #2, while updating the transmission inhibition time for the wireless channel #5. Accordingly, at the next timing t2, the process determines that the wireless channels #3 and #5 are busy due to a virtual carrier sense by NAV, and then allows the wireless channels #1, #2, and #4 to be used for simultaneous transmission of wireless packets.

12th Embodiment

In the fourth embodiment shown in FIGS. 7 and 8, wireless packets may also be successfully received over the wireless channels #2 and #3 having a setting of NAV and over the wireless channel #5 having an existing set NAV. In this case, it is also possible to cancel the current transmission inhibition time as well as to update the transmission inhibition time according to the occupied time described in the header.

Figure 18:
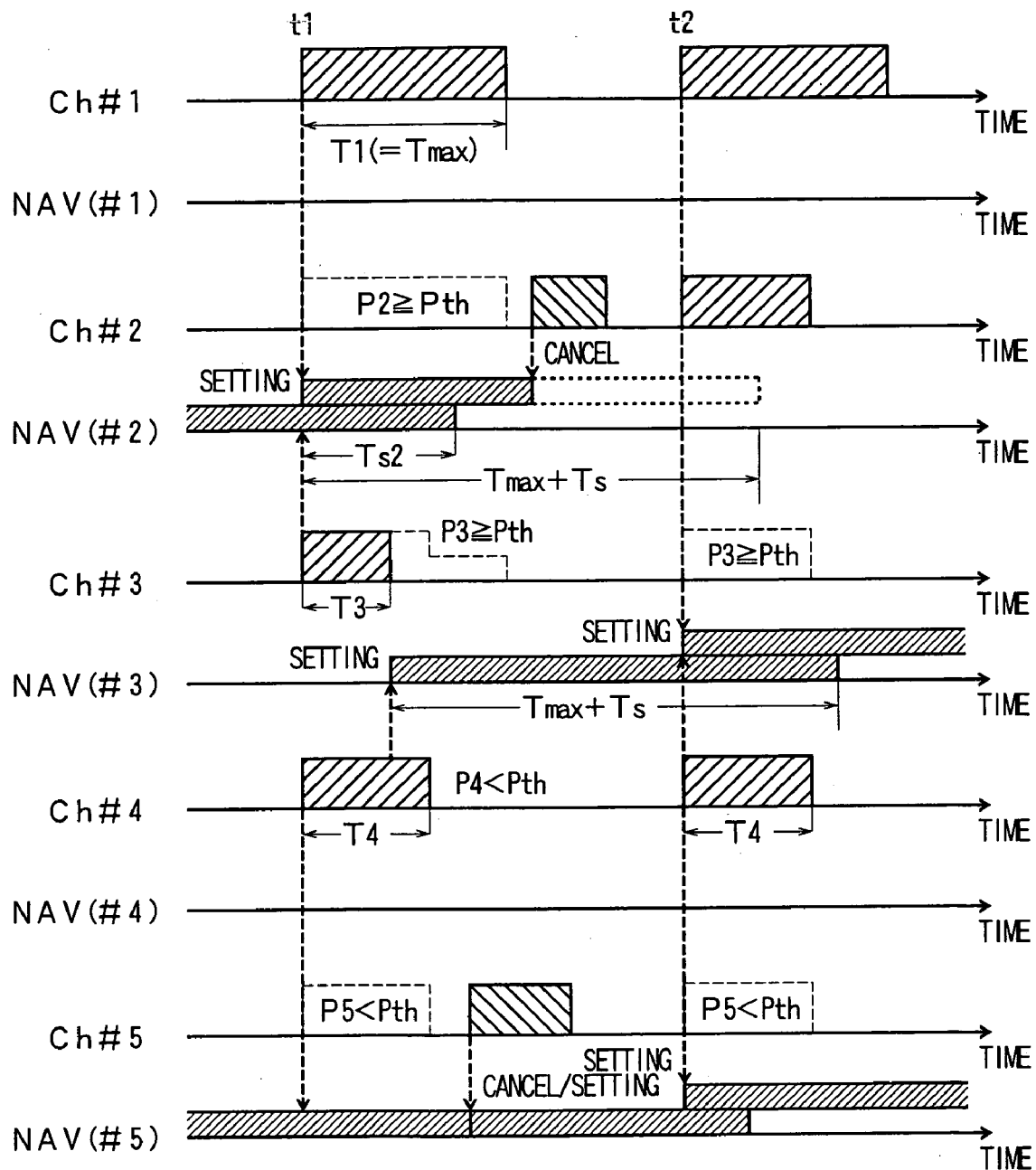
FIG. 18 is a time chart showing an example of operation according to a 12th embodiment of the present invention.

FIG. 18 shows an example of operation based on the procedure for canceling and updating the transmission inhibition time when wireless packets are successfully received in the fourth embodiment (FIGS. 7 and 8). Here, although the wireless channels #2 and #5 over which the wireless packets directed to the own STA have been received have their respective settings of transmission inhibition time, the header of the wireless packet in the wireless channel #2 has no setting of occupied time. Accordingly, the process only cancels the transmission inhibition time for the wireless channel #2, while updating the transmission inhibition time for the wireless channel #5. Accordingly, at the next timing t2, the process determines that the wireless channels #3 and #5 are busy due to a virtual carrier sense by NAV, and then allows the wireless channels #1, #2, and #4 to be used for simultaneous transmission of wireless packets.

13th Embodiment

In the fifth embodiment shown in FIGS. 9 and 10, wireless packets may also be successfully received over the wireless channels #2 and #3 having a setting of NAV and over the wireless channel #5 having an existing set NAV. In this case, it is also possible to cancel the current transmission inhibition time as well as to update the transmission inhibition time according to the occupied time described in the header.

Figure 19:
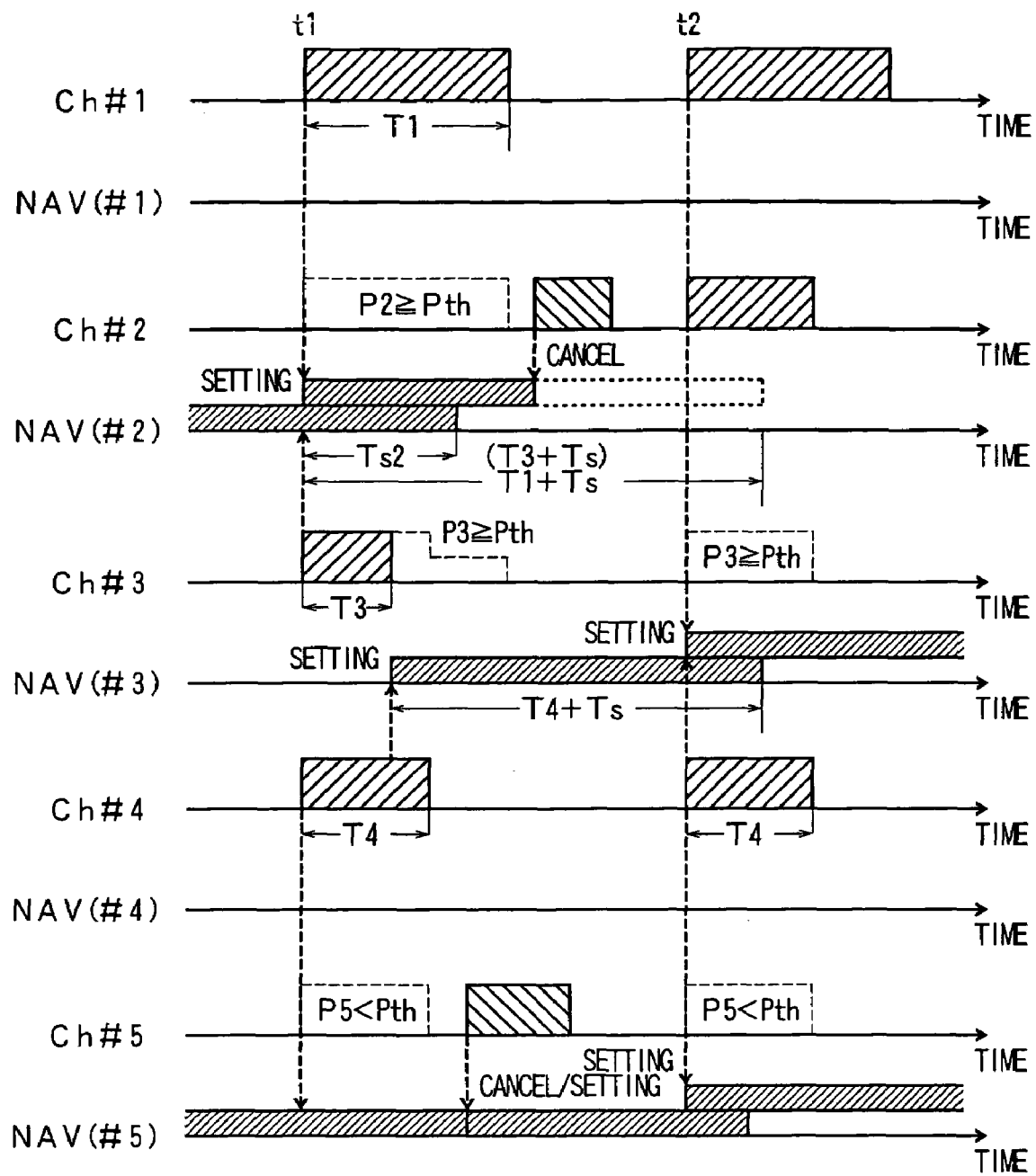
FIG. 19 is a time chart showing an example of operation according to a 13th embodiment of the present invention.

FIG. 19 shows an example of operation based on the procedure for canceling and updating the transmission inhibition time when wireless packets are successfully received in the fifth embodiment (FIGS. 9 and 10). Here, although the wireless channels #2 and #5 over which the wireless packets directed to the own STA have been received have their respective settings of transmission inhibition time, the header of the wireless packet in the wireless channel #2 has no setting of occupied time. Accordingly, the process only cancels the transmission inhibition time for the wireless channel #2, while updating the transmission inhibition time for the wireless channel #5. Accordingly, at the next timing t2, the process determines that the wireless channels #3 and #5 are busy due to a virtual carrier sense by NAV, and then allows the wireless channels #1, #2, and #4 to be used for simultaneous transmission of wireless packets.

14th Embodiment

Figure 20:
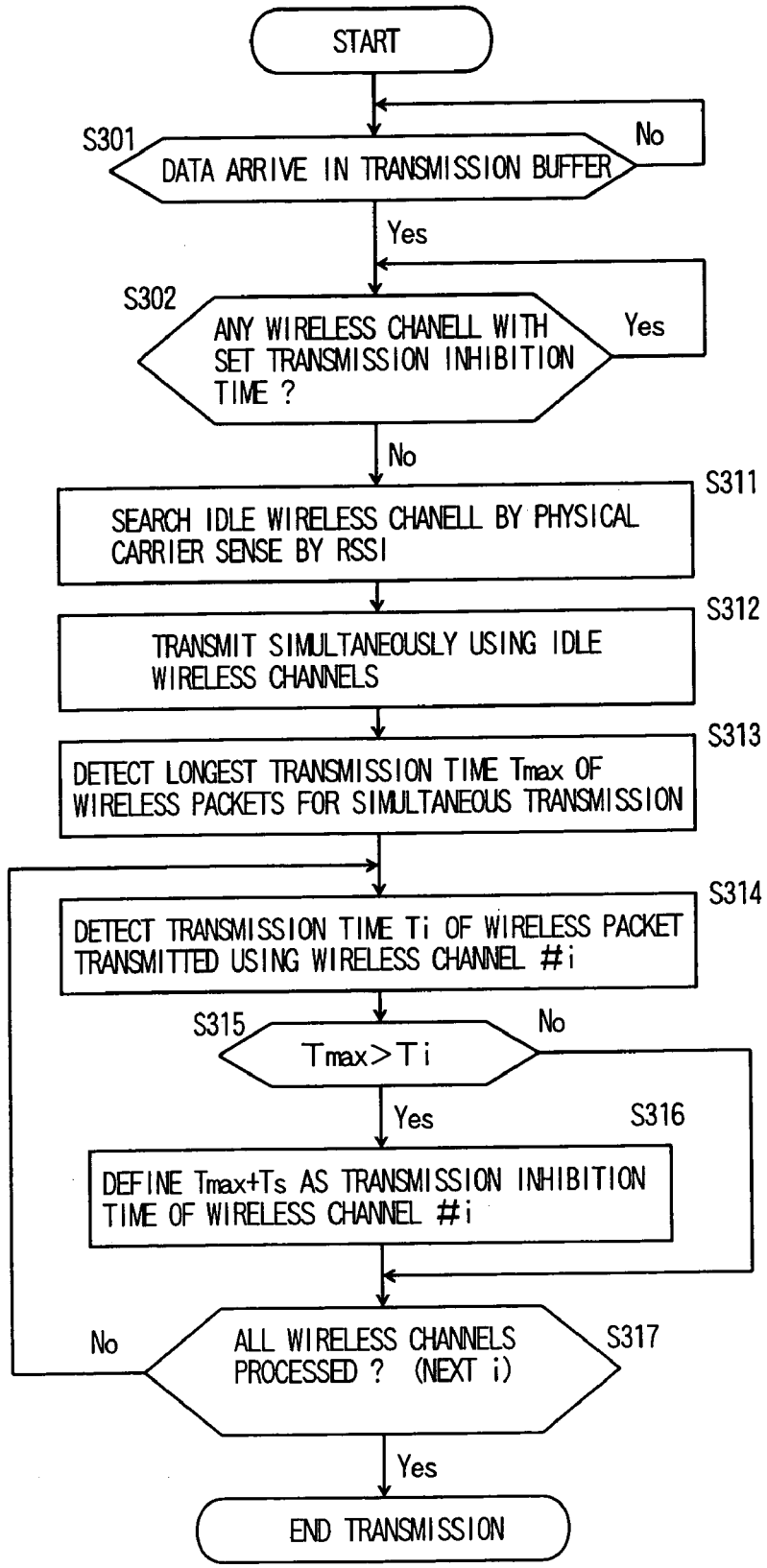
FIG. 20 is a flowchart showing a processing procedure according to a 14th embodiment of the present invention.

FIG. 20 shows a flowchart according to a 14th embodiment of the present invention.

Figure 21:
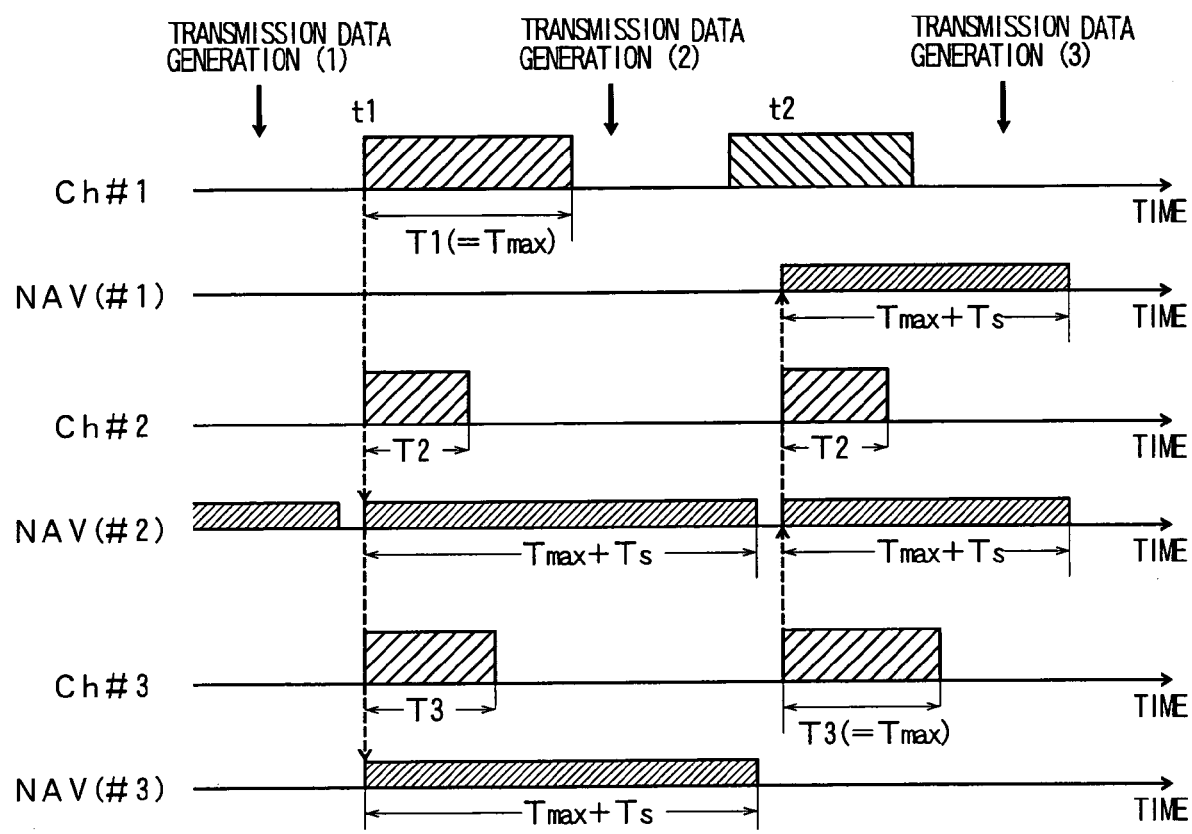
FIG. 21 is a time chart showing an example of operation according to the 14th embodiment of the present invention.

FIG. 21 shows an example of operation according to the 14th embodiment of the present invention. Here, wireless channels #1, #2, and #3 are prepared. It is assumed that at timing of transmission data generation (1), the wireless channel #2 is busy due to a virtual carrier sense by the NAV defined by a wireless packet received before then. It is also assumed that the wireless channels #1, #2, and #3 are related to each other in that leakage can occur therebetween and would not be able to receive wireless packets if there is any leakage.

First, upon arrival of data at a transmission buffer, the process determines whether there is a wireless channel which has a set transmission inhibition time. If there is a wireless channel which has a set transmission inhibition time, the process waits until the transmission inhibition time elapses (S301 and S302). Here, the NAV of the wireless channel #2 has a set transmission inhibition time at the timing of transmission data generation (1), and thus the process waits by timing t1 at which the transmission inhibition time elapses. Then, at timing t1, the process performs a physical carrier sense by RSSI to search for an idle wireless channel (S311). Then, the process uses the idle wireless channels to transmit a plurality of wireless packets simultaneously which are generated from data packets in a transmission queue (S312). Then, the process detects the longest transmission time Tmax of the transmission times of the wireless packets to be transmitted simultaneously (S313). Here, the wireless channels #1 to #3 are idle, and three (or the sum total of counts of MIMO in each wireless channel) wireless packets are transmitted using the wireless channels #1 to #3, in which the process detects the longest transmission time Tmax of them (here, the transmission time Ti of the wireless channel #1).

Then, processing is performed from S314 to S317 on each of the wireless channels #1, #2, and #3. First, the process detects the transmission time Ti of the wireless packet to be transmitted from the wireless channel #i (i=1, 2, and 3) (S314). Here, Ti=0 if no wireless packet is transmitted because the wireless channel #i is busy. Then, the process compares the longest transmission time Tmax with the transmission time Ti of the wireless packet to be transmitted from the wireless channel #i (S315). Here, since the transmission time T1 of the wireless channel #1 is the longest (Tmax=T1), and Tmax >Ti in other than the wireless channel #1, the following processing is directed to other than the wireless channel #1.

The process sets the NAV of the wireless channel #i with Tmax>Ti to the time (Tmax+Ts) obtained by adding a predetermined time Ts to Tmax, and then performs processing on the next wireless channel (S316 and S317). On the other hand, the process performs no processing on the wireless channel #i (here, #1) for which Tmax>Ti is not true, but performs processing on the next wireless channel (S315 and S317). As a result, the process provides no setting to the NAV of the wireless channel #1 having the longest transmission time Tmax, whereas the process sets the NAV of the wireless channels #2 and #3 to the transmission inhibition time (Tmax+Ts). In this manner, the process sets the NAV of the wireless channels #2 and #3 to the transmission inhibition time (Tmax+Ts) assuming the presence of leakage from the wireless channel #1, thereby making it possible to prevent the situation where a wireless packet cannot be received and no setting can be provided to the NAV, as shown in FIG. 50.

Then, the wireless channels #2 and #3 have the transmission inhibition time defined in S316 at timing of transmission data generation (2), and thus the process waits by timing t2 at which it elapses. At timing t2, the process determines that there is a received signal in the wireless channel #1, and the wireless channels #2 and #3 are idle. Subsequently in the same manner, the process transmits simultaneously using the wireless channels #2 and #3, in which the NAV of the wireless channels #1 and #2 is set to a new transmission inhibition time (Tmax+Ts). Meanwhile, the process thus waits for transmission data generation (3).

15th Embodiment

Figure 22:
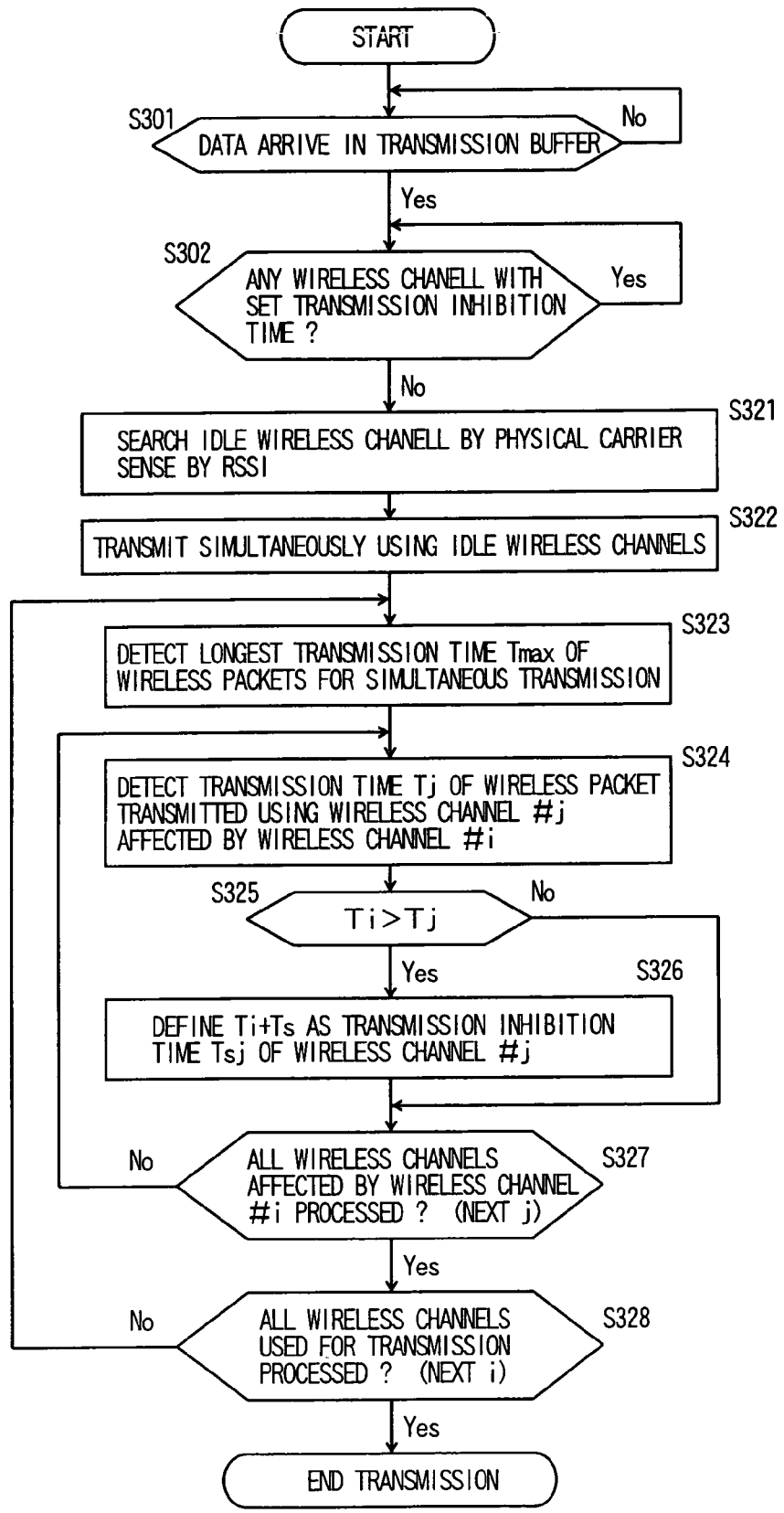
FIG. 22 is a flowchart showing a processing procedure according to a 15th embodiment of the present invention.
Figure 23:
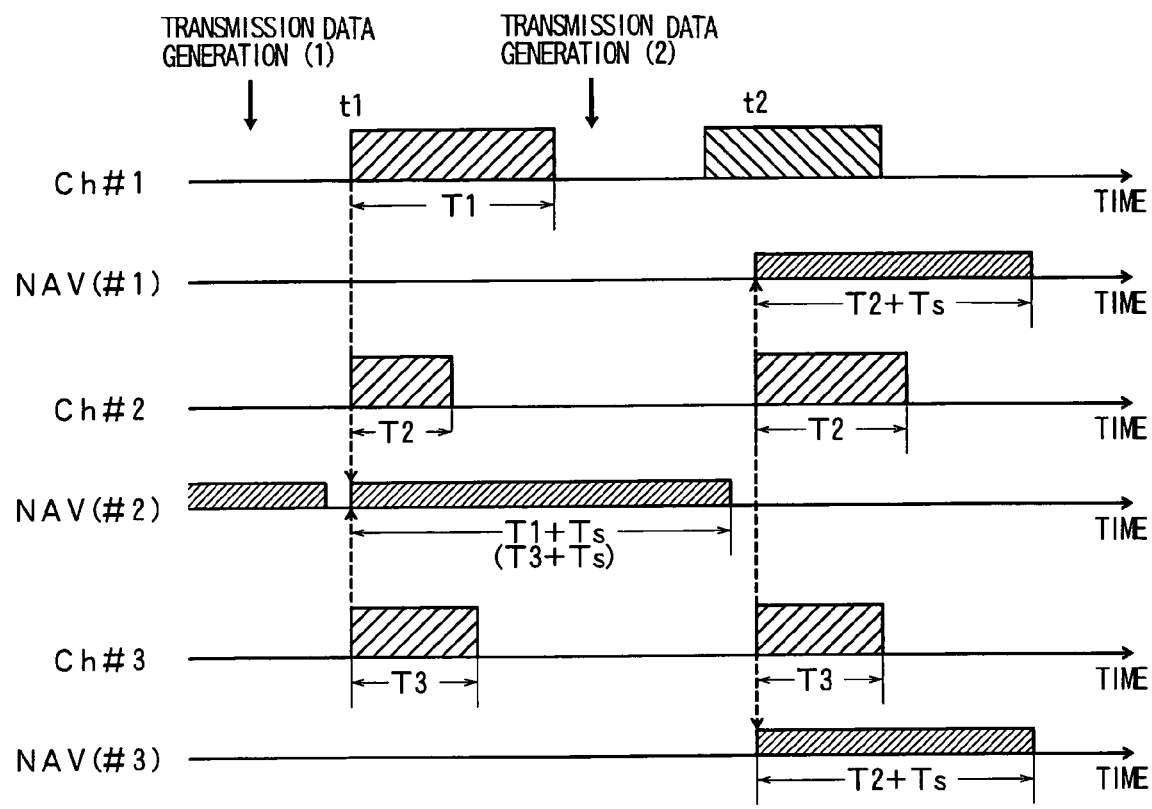
FIG. 23 is a time chart showing an example of operation according to the 15th embodiment of the present invention.

FIG. 22 shows a flowchart according to a 15th embodiment of the present invention. FIG. 23 shows an example of operation according to the 15th embodiment of the present invention. Here, wireless channels #1, #2, and #3 are prepared. It is assumed that at timing of transmission data generation (1), the wireless channel #2 is busy due to a virtual carrier sense by the NAV defined by a wireless packet received before then. It is also assumed that the wireless channels #1 to #3 are related to each other in that leakage can occur only between predefined wireless channels (e.g., between adjacent channels) (, which is different from the 14th embodiment in this point), and would not be able to receive wireless packets if there is any leakage.

First, upon arrival of data at a transmission buffer, the process determines whether there is a wireless channel which has a set transmission inhibition time. If there is a wireless channel which has a set transmission inhibition time, the process waits until the transmission inhibition time elapses (S301 and S302). Here, the NAV of the wireless channel #2 has a set transmission inhibition time at the timing of transmission data generation (1), and thus the process waits by timing t1 at which the transmission inhibition time elapses. Then, at timing t1, the process performs a physical carrier sense by RSSI to search for an idle wireless channel (S321).

Then, the process uses the idle wireless channels to transmit a plurality of wireless packets simultaneously which are generated from data packets in a transmission queue (S322). Here, the wireless channels #1 to #3 are idle, and three (or the sum total of counts of MIMO in each wireless channel) wireless packets are transmitted using the wireless channels #1 to #3.

Then, processing is performed from S323 to S328 on each of the wireless channels #i used for transmission (here, #1, #2, and #3). First, the process detects the transmission time Ti of the wireless packet to be transmitted from the wireless channel #i (i=1, 2, and 3) (S323). Then, the processing of S324 to S327 is performed on each of the wireless channels #j (here, adjacent channels) that is affected by the wireless channel #i. First, the process detects the transmission time Tj of the wireless packet to be transmitted from the wireless channel #j (S324). Then, the process compares the transmission time Ti of the wireless channel #i with each transmission time Tj of the adjacent wireless channels #j (S325). Since the wireless channel #j with Ti>Tj completes transmission during the transmission over the wireless channel #i, the process sets the NAV to a transmission inhibition time (S326). At timing t1, this is directed to the wireless channel #2 for the wireless channels #1 and #3. That is, the process sets the NAV of the wireless channel #j (here, #2) with Ti>Tj to the transmission inhibition time Ti+Ts, and then performs processing on the next wireless channel (S326 and S327). On the other hand, the process performs no processing on the wireless channel #j for which Ti>Tj is not true, but performs processing on the next wireless channel (S325 and S327).

The foregoing processing is performed on all the wireless channels #i that have been used for transmission (S323 to S328). As a result, the process provides no setting to the NAV of the wireless channels #1 and #3. The NAV of the wireless channel #2 is set to the greater one (T1+Ts) of the transmission inhibition time (T1+Ts) by the wireless channel #1 and the transmission inhibition time (T3+Ts) by the wireless channel #3. Accordingly, the wireless channel #2 has the transmission inhibition time defined in S326 at the next timing of transmission data generation (2), and thus the process waits by timing t2 at which it elapses. At timing t2, the process determines that there is a received signal in the wireless channel #1, and the wireless channels #2 and #3 are idle. Subsequently in the same manner, the process transmits simultaneously using the wireless channels #2 and #3, in which the NAV of the wireless channels #1 and #3 is set to a new transmission inhibition time (T2+Ts).

16th Embodiment

In the 14th embodiment, with respect to the wireless channel requiring the longest transmission time. Tmax of the wireless packets to be transmitted simultaneously, all the other wireless channels are provided with the setting of the transmission inhibition time (Tmax+Ts). Assuming a case where leakage from a wireless channel having the longest transmission time disables reception so that a new transmission inhibition time cannot be defined, this method provides the same set transmission inhibition time to all the other wireless channels.

Instead of this, received power may be detected to select a wireless channel that is actually affected by leakage, so that a set transmission inhibition time is provided to the wireless channel. That is, in the wireless channel #i with Tmax>Ti in S315 of FIG. 20, the process detects the received power Pi, while no transmission is being made, which is in turn compared with a predetermined threshold value Pth. If the received power Pi is greater than or equal to Pth, then the process determines that the wireless channel #i is affected by leakage, and then sets the NAV of the wireless channel #i to the transmission inhibition time (Tmax+Ts). This makes it possible to provide no setting to the NAV of the wireless channel that is not affected by leakage.

In the 15th embodiment, a wireless channel #j that will be affected by leakage from the wireless channel #i used for transmission is predetermined (e.g., adjacent channels), and then the wireless channel #j is provided with a set transmission inhibition time (Ti+Ts). This method allows the wireless channel affected by leakage to be predetermined, thereby making it possible to prevent the same set transmission inhibition time from being also provided to a wireless channel that is not affected by leakage.

Instead of this, the received power may be detected in the predetermined wireless channel to select a wireless channel that is actually affected by leakage, so that a set transmission inhibition time is provided to the wireless channel. That is, in the wireless channel #j with Ti>Tj in S325 of FIG. 22, the process detects the received power Pj, while no transmission is being made, which is in turn compared with a predetermined threshold value Pth. If the received power Pj is greater than or equal to Pth, then the process determines that the wireless channel #j is affected by leakage, and then sets the NAV of the wireless channel #j to the transmission inhibition time (Ti+Ts). This makes it possible to provide no setting to the NAV of the wireless channel that is not affected by leakage.

On the other hand, in the 14th and 15th embodiments, a detection may be made for an error in the received wireless packet, and if an error is detected, the process may determine that the wireless channel is affected by leakage to set the NAV to a transmission inhibition time according to the procedure shown in each embodiment.

17th EMBODIMENT

Figure 24:
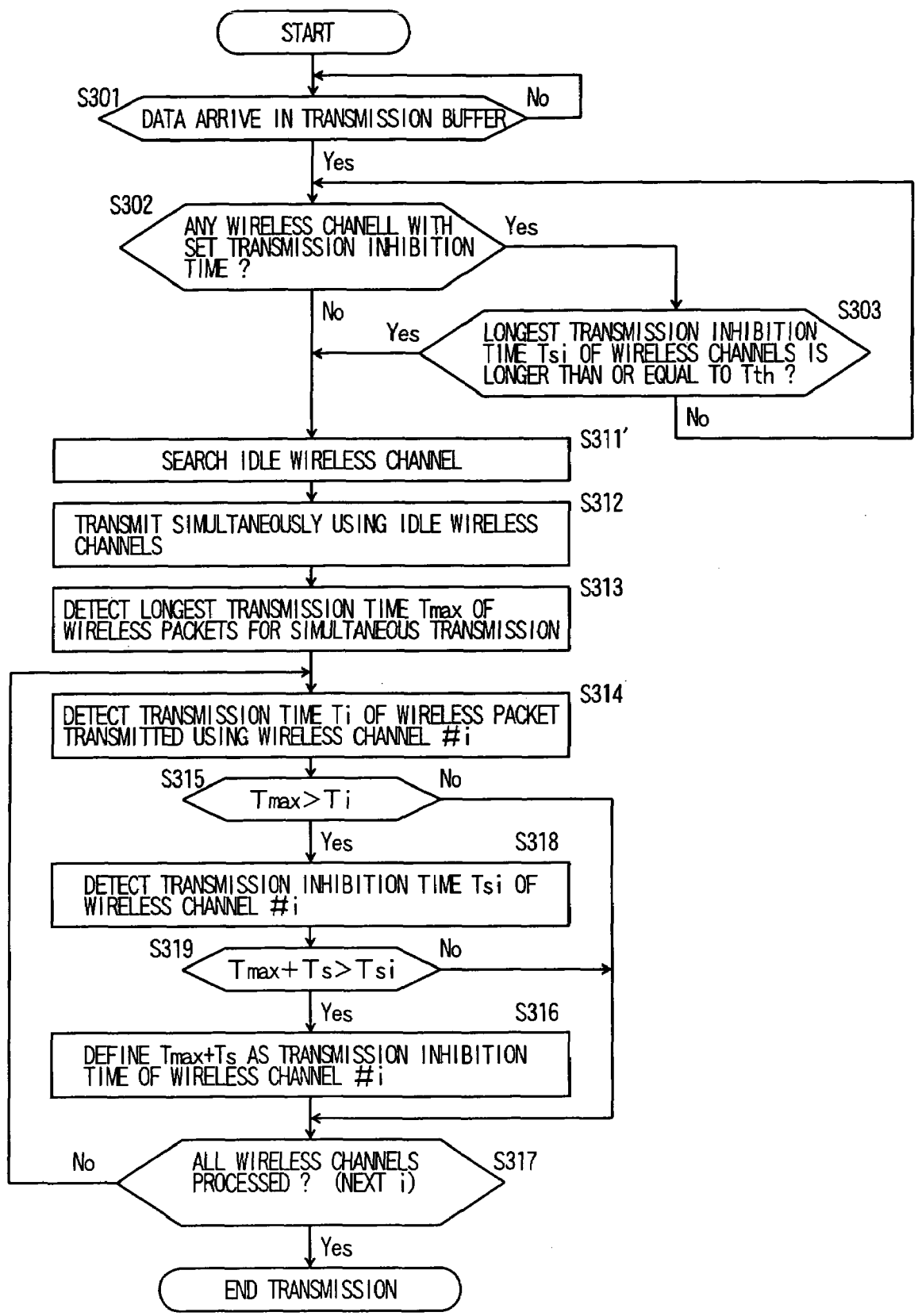
FIG. 24 is a flowchart showing a processing procedure according to a 17th embodiment of the present invention.
Figure 25:
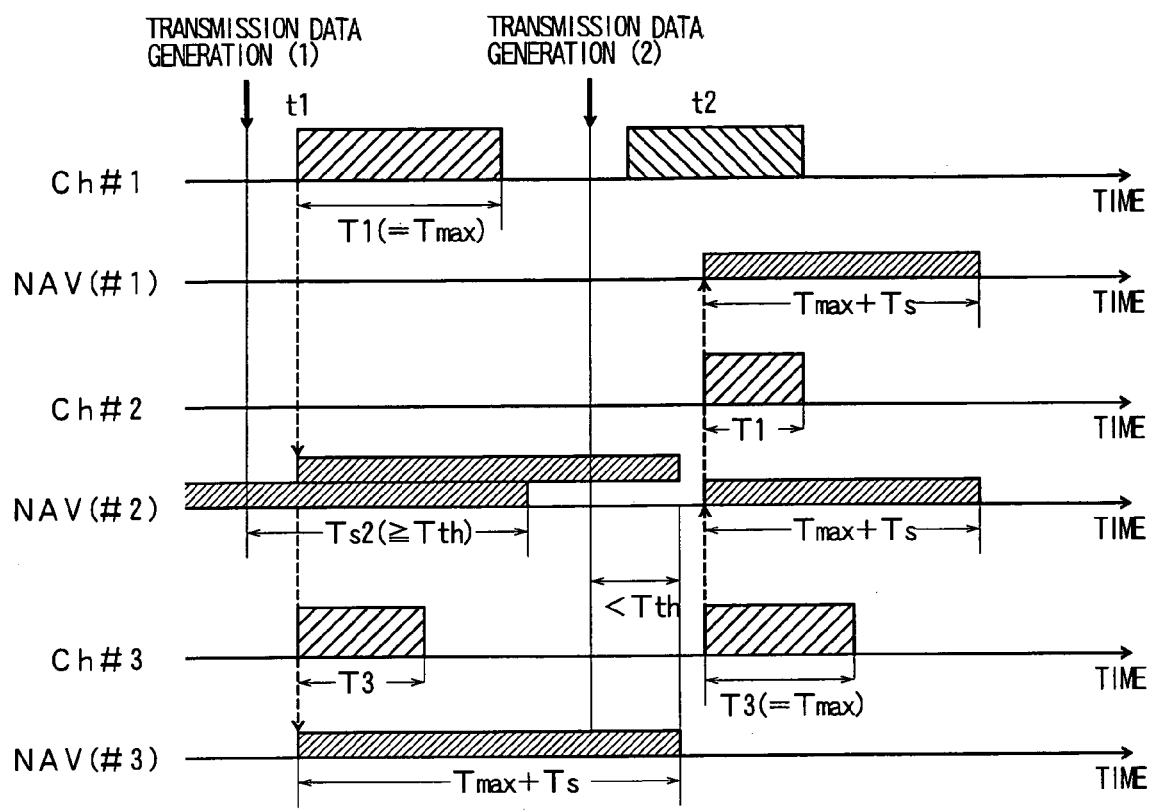
FIG. 25 is a time chart showing an example of operation according to the 17th embodiment of the present invention.

FIG. 24 shows a flowchart according to a 17th embodiment of the present invention. FIG. 25 shows an example of operation according to the 17th embodiment of the present invention. Here, wireless channels #1, #2, and #3 are prepared. It is assumed that at timing of transmission data generation (1), the wireless channel #2 is busy due to a virtual carrier sense by the NAV defined by a wireless packet received before then. It is also assumed that the wireless channels #1, #2, and #3 are related to each other in that leakage can occur therebetween (, which is the same as the 14th embodiment in this point), and would not be able to receive wireless packets if there is any leakage.

First, upon arrival of data at a transmission buffer, the process determines whether there is a wireless channel which has a set transmission inhibition time. If there are wireless channels which have a set transmission inhibition time, the process determines whether the longest transmission inhibition time thereof is greater than or equal to the threshold value Tth. If it is less than the threshold value, then the process waits until the transmission inhibition time of the wireless channel having a set transmission inhibition time elapses (S301, S302, and S303). On the other hand, if the longest transmission inhibition time is greater than or equal to the threshold value Tth among the wireless channels having a set transmission inhibition time, then the process does not wait but proceeds to the next processing (S303).

Here, at the timing of transmission data generation (1), the NAV of the wireless channel #2 has a set transmission inhibition time and the transmission inhibition time Ts2 thereof is greater than or equal to the threshold value Tth. Thus, the process does not wait but proceeds to the next processing. At the timing t1, the process performs a physical carrier sense by RSSI and a virtual carrier sense by NAV to search for a wireless channel that is idle in both the detections (S311'). Then, the process uses the idle wireless channels to transmit a plurality of wireless packets simultaneously which are generated from data packets in a transmission queue (S312). Then, the process detects the longest transmission time Tmax of the transmission times of the wireless packets to be transmitted simultaneously (S313). Here, the wireless channels #1 and #3 are idle, and two (or the sum total of counts of MIMO in each wireless channel) wireless packets are transmitted using the wireless channels #1 and #3, in which the process detects the longest transmission time Tmax of them (here, the transmission time T1 of the wireless channel #1).

Then, processing is performed from S314 to S317 on each of the wireless channels #1, #2, and #3. First, the process detects the transmission time Ti of the wireless packet to be transmitted from the wireless channel #i (i=1, 2, and 3) (S314). Here, Ti=0 (here, T2=0) if no wireless packet is transmitted because the wireless channel #i is busy. Then, the process compares the longest transmission time Tmax with the transmission time Ti of the wireless packet to be transmitted from the wireless channel #i (S315). Here, since the transmission time Ti of the wireless channel #1 is the longest (Tmax=T1), and Tmax>Ti in other than the wireless channel #1, the following processing is directed to other than the wireless channel #1.

The process detects the transmission inhibition time Tsi to which set is the NAV of each of the wireless channels #i with Tmax>Ti (S3 18). Here, the process detects the Ts2 of the wireless channel #2. Then, the process compares the time (Tmax+Ts) obtained by adding a predetermined time Ts to Tmax with the existing set transmission inhibition time Tsi. If Tmax+Ts>Tsi, then the NAV is set to Tmax+Ts as a new transmission inhibition time to perform processing on the next wireless channel (S319, S316, and S317). On the other hand, the process performs no processing on the wireless channel #i (here, #1) for which Tmax>Ti is not true or the wireless channel #i for which Tmax+Ts>Tsi is not true, but performs processing on the next wireless channel (S315, S319, and S317).

As a result, the process provides no setting to the NAV of the wireless channel #1 having the longest transmission time Tmax, whereas the process sets the NAV of the wireless channels #2 and #3 to the transmission inhibition time (Tmax+Ts). In this manner, the NAV of the wireless channels #2 and #3 is set to the transmission inhibition time (Tmax+Ts) assuming the presence of leakage from the wireless channel #1, thereby making it possible to prevent the situation where a wireless packet cannot be received and no setting can be provided to the NAV, as shown in FIG. 50.

Then, since at timing of transmission data generation (2), the wireless channels #2 and #3 have the transmission inhibition time defined in S31 6 and the transmission inhibition time is less than the threshold value Tth, the process waits by timing t2 at which it elapses. At timing t2, the process determines that there is a received signal in the wireless channel #1, and the wireless channels #2 and #3 are idle. Subsequently in the same manner, the process transmits simultaneously using the wireless channels #2 and #3, in which the NAV of the wireless channels #1 and #2 is set to a new transmission inhibition time (Tmax+Ts).

The 17th embodiment has S303, S318, and S139 added to the 14th embodiment shown in FIG. 20. Likewise, it is also possible to add the S303, S318, and S139 to the 15th embodiment shown in FIG. 22. This can also be applied to modified examples of the 14th and 15th embodiments, in which received power is detected to select a wireless channel that is actually affected by leakage or in which a check is made for an error in a received wireless packet, so that if an error is detected, the wireless channel is selected as being affected by leakage.

18th Embodiment

In the S303 of the 17th embodiment, if the longest transmission inhibition time is greater than or equal to the threshold value Tth among the wireless channels having a set transmission inhibition time, the process does not wait but transmits using the currently idle channel. If it is less than the threshold value Tth, the process waits until the transmission inhibition time of the wireless channel having a set transmission inhibition time elapses. That is, the process will not wait when at least one set transmission inhibition time is greater than or equal to the threshold value Tth among the wireless channels having a set transmission inhibition time. The 18th embodiment is characterized in that in the presence of wireless channels having a set transmission inhibition time which is greater than or equal to the threshold value Tth or which is less than the threshold value Tth, the process will wait until the transmission inhibition time of a wireless channel being less than the threshold value Tth elapses.

Figure 26:
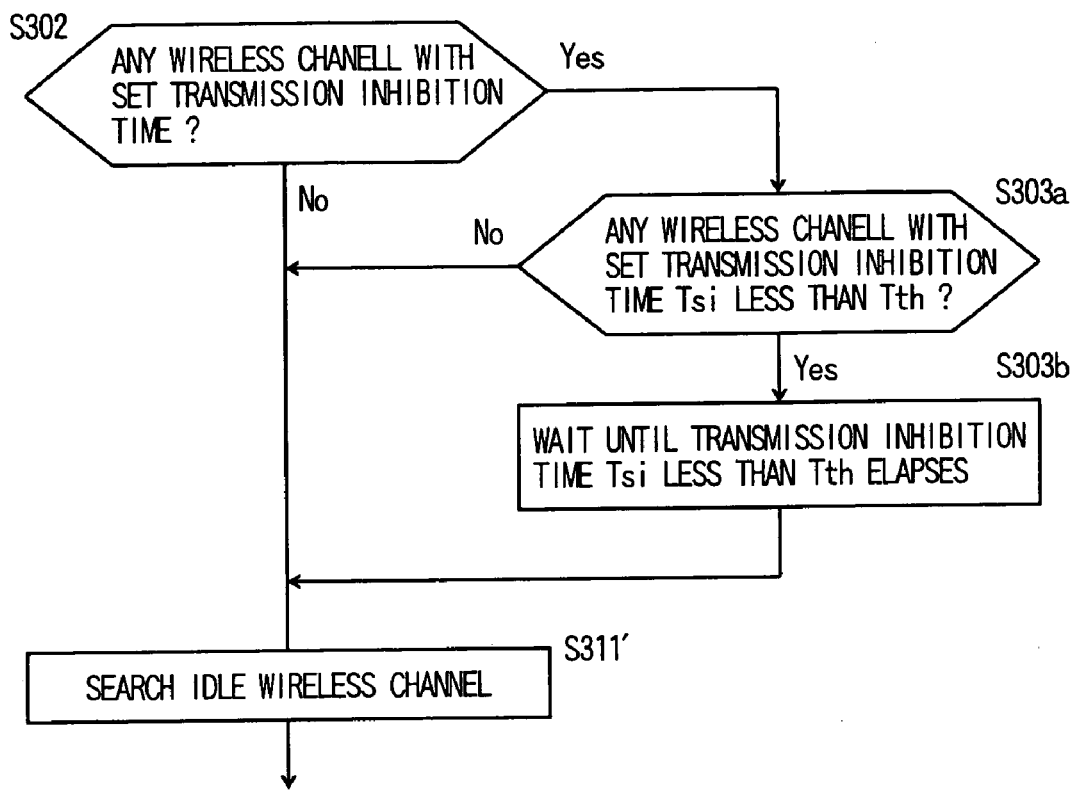
FIG. 26 is a flowchart showing a processing procedure according to an 18th embodiment of the present invention.
Figure 27:
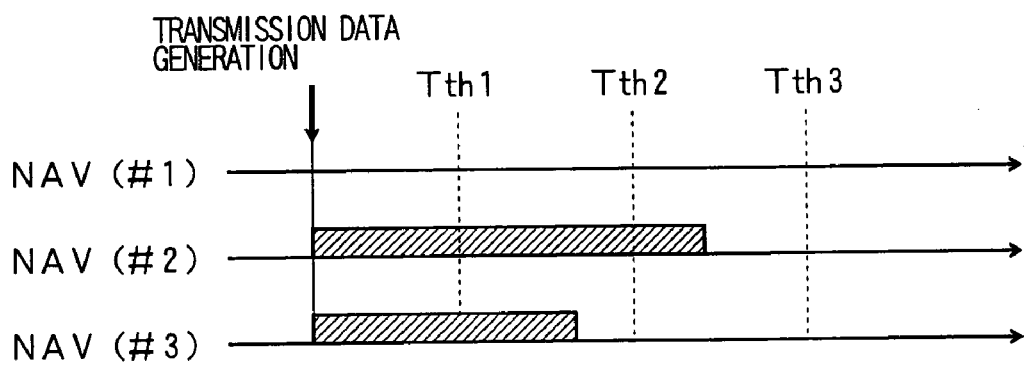
FIG. 27 is a time chart showing the principle of operation according to the 18th embodiment of the present invention.
Figure 28:
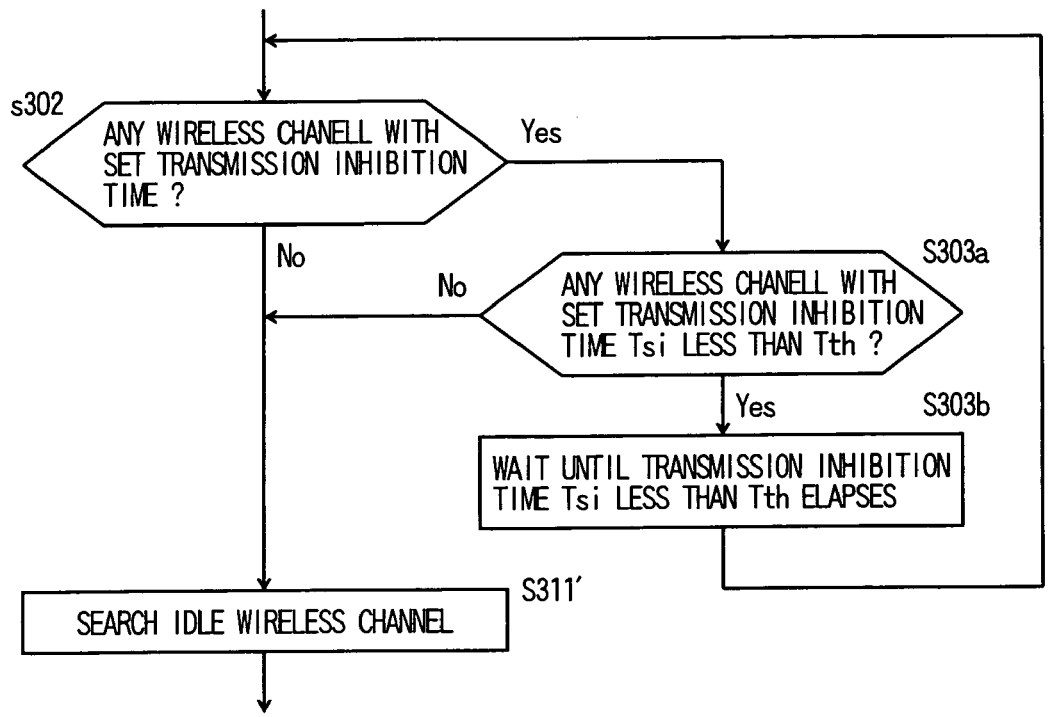
FIG. 28 is a flowchart showing a processing procedure according to a modified example of the 18th embodiment of the present invention.
Figure 29:
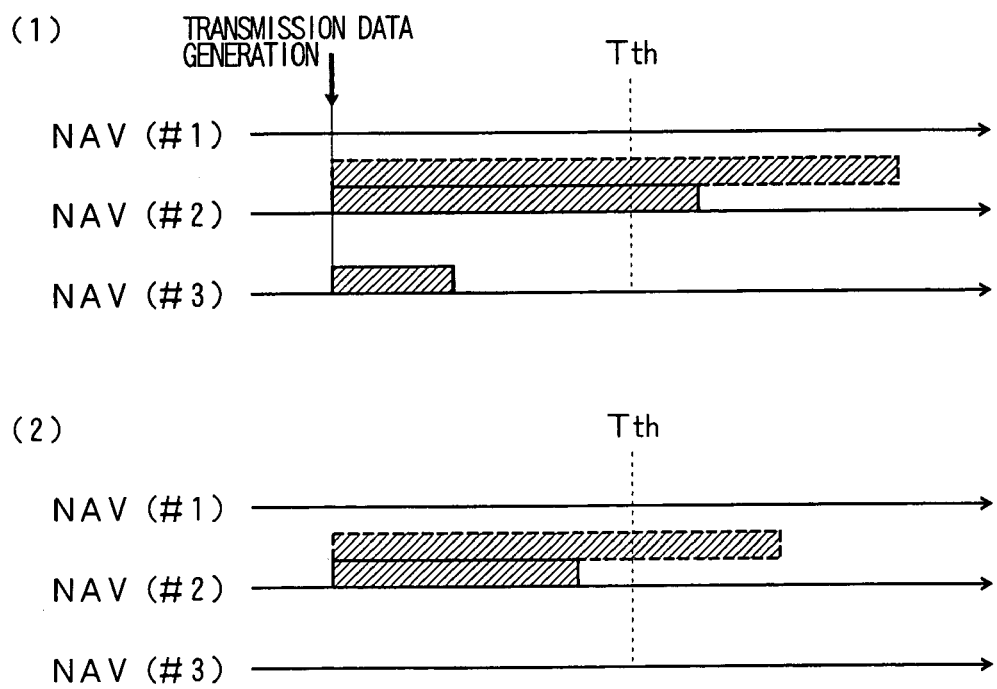
FIG. 29 is a time chart showing the principle of operation according to a modified example of the 18th embodiment of the present invention.

FIG. 26 shows a flowchart according to the 18th embodiment of the present invention. FIG. 27 shows the principle of operation according to the 18th embodiment of the present invention. FIG. 28 shows a flowchart of a modified example according to the 18th embodiment of the present invention. FIG. 29 shows the principle of operation of the modified example according to the 18th embodiment of the present invention. Here, only the portion that replaces S303 of FIG. 24 is shown.

In FIG. 26, the process determines whether there is a wireless channel having a set transmission inhibition time. If there is a wireless channel having a set transmission inhibition time, the process determines whether the wireless channel has a set transmission inhibition time less than the threshold value Tth (S302 and S303a). For a threshold value Tth1 shown in FIG. 27, both the wireless channels #2 and #3 have a transmission inhibition time greater than or equal to the threshold value Tth1. For a threshold value Tth2, only the wireless channel #2 of the wireless channels #2 and #3 has a set transmission inhibition time greater than or equal to the threshold value Tth2. For a threshold value Tth3, both the wireless channels #2 and #3 have a transmission inhibition time less than the threshold value Tth3.

In S303a, if the process determines that no wireless channel has a set transmission inhibition time less than the threshold value Tth (or in the case of the threshold value Tth1 of FIG. 27), the process searches for an idle wireless channel (S311'). In the example of FIG. 27, the process transmits using the wireless channel #1. On the other hand, if the process determines that a wireless channel has a set transmission inhibition time less than the threshold value Tth (or in the case of the threshold values Tth2 and Tth3 of FIG. 27), the process waits until the transmission inhibition time less than the threshold value Tth elapses (S303b). In the example of the threshold value Tth2 of FIG. 27, the process waits until the transmission inhibition time of the wireless channel #3 elapses, whereas in the example of the threshold value Tth3, the process waits until the transmission inhibition time of the wireless channels #2 and #3 elapses.

The 17th embodiment and this embodiment are different from each other in than for the threshold value Tth2 in the example of FIG. 27, the former does not allow the process to wait, whereas the latter allows the process to wait until the transmission inhibition time of the wireless channel #3 elapses. For the threshold values Tth1 and Tth3, there is no difference therebetween.

In the processing of S303b, the process can wait until the transmission inhibition time of the wireless channel #3 elapses in the case of the threshold value Tth2 in order to transmit simultaneously using the wireless channels #1 and #3. However, in some cases, the process may further wait depending on the transmission inhibition time of the wireless channel #2 to increase the number of wireless channels to be used for simultaneous transmission. In this case, as shown in FIG. 28, the process returns to S302 after having waited in S303b to make the determination of S303a again.

The example of FIG. 29 corresponds to the threshold value Tth2 of FIG. 27, in which the transmission inhibition time of the wireless channel #2 is greater than or equal to the threshold value Tth, whereas the transmission inhibition time of the wireless channel #3 is less than the threshold value Tth. At this time, the process waits until the transmission inhibition time of the wireless channel #3 elapses, at the point in time of which as shown in FIG. 29(2), the process determines whether the transmission inhibition time of the wireless channel #2 is greater than or equal to the threshold value Tth or less than the threshold value Tth (S303a). Here, if the transmission inhibition time is greater than or equal to the threshold value Tth, the process will not wait but use the wireless channels #1 and #3 for transmission. If the transmission inhibition time is less than the threshold value Tth, the process waits until all the wireless channels #1, #2, and #3 become idle.

19th Embodiment

Figure 30:
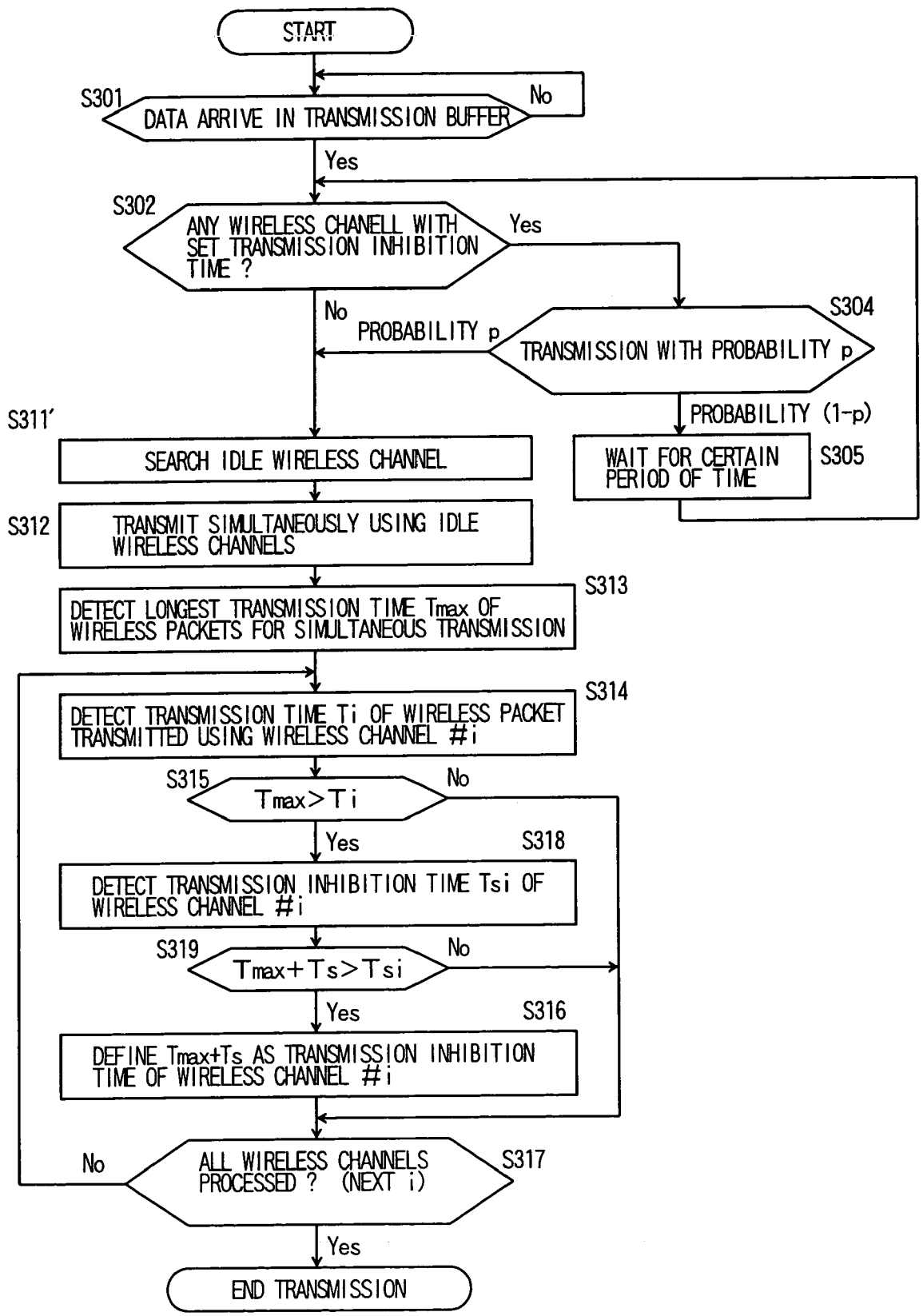
FIG. 30 is a flowchart showing a processing procedure according to a 19th embodiment of the present invention.

FIG. 30 shows a flowchart according to a 19th embodiment of the present invention.

The 17th embodiment is adapted such that when there are wireless channels having a set transmission inhibition time and the longest transmission inhibition time thereof is greater than or equal to the threshold value Tth, the process proceeds to the processing of searching for an idle wireless channel for transmission without waiting until the transmission inhibition time elapses. This embodiment is characterized in that instead of the comparison processing (S303) of the longest transmission inhibition time with the threshold value Tth, the process proceeds to the processing of searching for an idle wireless channel with a probability p for transmission (S304), and then returns to determine whether there is a wireless channel which has a set transmission inhibition time (S302) after having waited for a certain period of time with a probability (1-p) (S305). This makes it possible to perform the transmission processing with a probability p regardless of the length of transmission inhibition time.

The probability p may be constant or alternatively variable depending on the set transmission inhibition time (e.g., a function monotonously decreasing with the transmission inhibition time).

20th Embodiment

Figure 31:
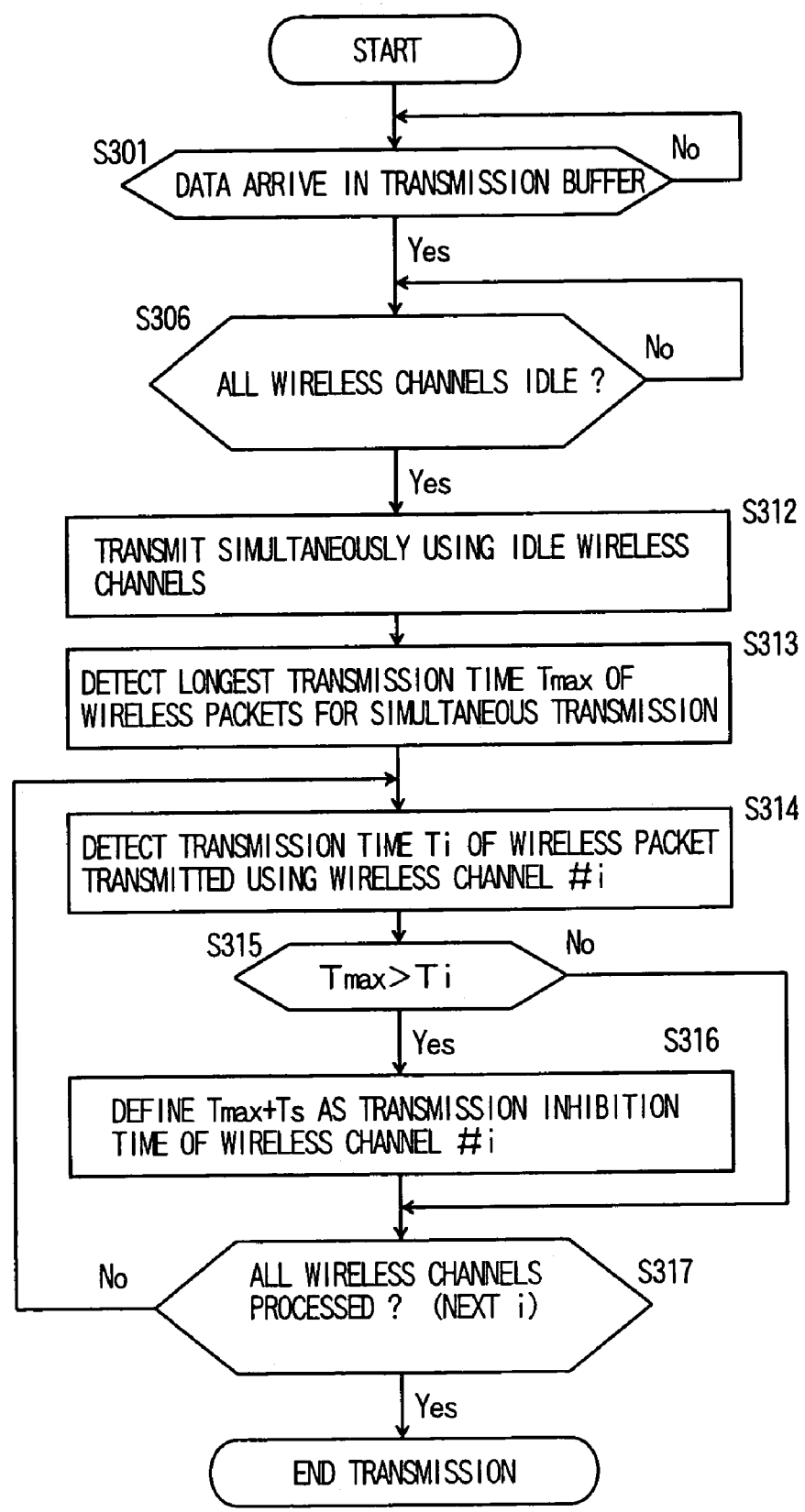
FIG. 31 is a flowchart showing a processing procedure according to a 20th embodiment of the present invention.
Figure 3:
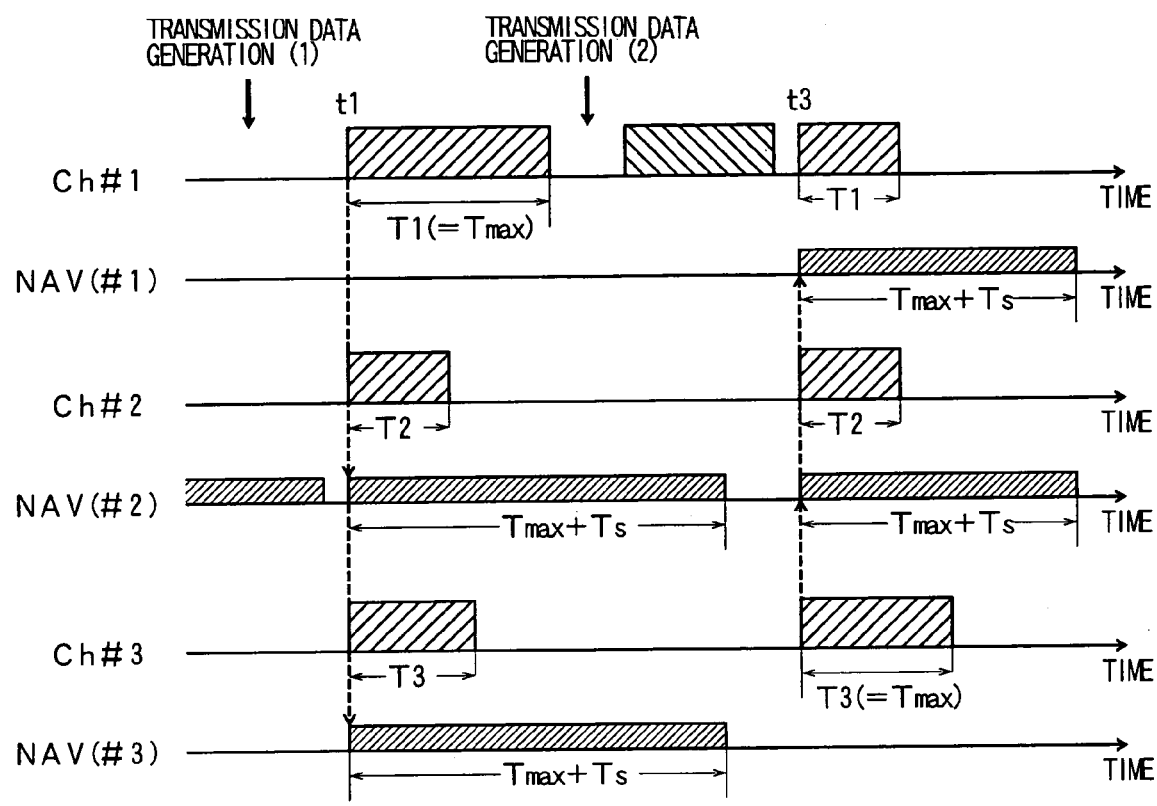

FIG. 31 shows a flowchart according to a 20th embodiment of the present invention. FIG. 32 shows an example of operation according to the 20th embodiment of the present invention. Here, wireless channels #1, #2, and #3 are prepared. It is assumed that at timing of transmission data generation (1), the wireless channel #2 is busy due to a virtual carrier sense by the NAV defined by a wireless packet received before then. It is also assumed that the wireless channels #1, #2, and #3 are related to each other in that leakage can occur therebetween, and would not be able to receive wireless packets if there is any leakage.

First, upon arrival of data at a transmission buffer, the process performs a physical carrier sense by RSSI and a virtual carrier sense by NAV (a detection of transmission inhibition time) to determine whether all the wireless channels are idle (S301 and S306). Here, at timing of transmission data generation (1), the NAV of the wireless channel #2 has a set transmission inhibition time. Thus, the process waits by the timing t1 at which the transmission inhibition time elapses and all the wireless channels become idle. Then, at the timing t1, the process uses idle wireless channels to transmit a plurality of wireless packets simultaneously which are generated from data packets in a transmission queue (S312). Then, the process detects the longest transmission time Tmax of the transmission times of the wireless packets to be transmitted simultaneously (S313). Here, the wireless channels #1 to #3 are idle, and three (or the sum total of counts of MIMO in each wireless channel) wireless packets are transmitted using the wireless channels #1 to #3, in which the process detects the longest transmission time Tmax of them (here, the transmission time T1 of the wireless channel #1).

Then, processing is performed from S314 to S317 on each of the wireless channels #1, #2, and #3, as in the 14th embodiment. In this manner, the NAV of the wireless channels #2 and #3 is set to the transmission inhibition time (Tmax+Ts) assuming the presence of leakage from the wireless channel #1, thereby making it possible to prevent the situation where a wireless packet cannot be received and no setting can be provided to the NAV, as shown in FIG. 50.

Then, at timing of transmission data generation (2), the wireless channels #2 and #3 have the transmission inhibition time defined in S316 and the wireless channel #1 is busy due to a received signal. Thus, the process waits by timing t3 at which all the wireless channels become idle. At the timing t3, the process transmits simultaneously using the wireless channels #1 to #3 in the same manner, in which the process sets the NAV of the wireless channels #1 and #2, excluding the wireless channel #3 having the longest transmission time, to a new transmission inhibition time (Tmax+Ts).

21st Embodiment

Figure 33:
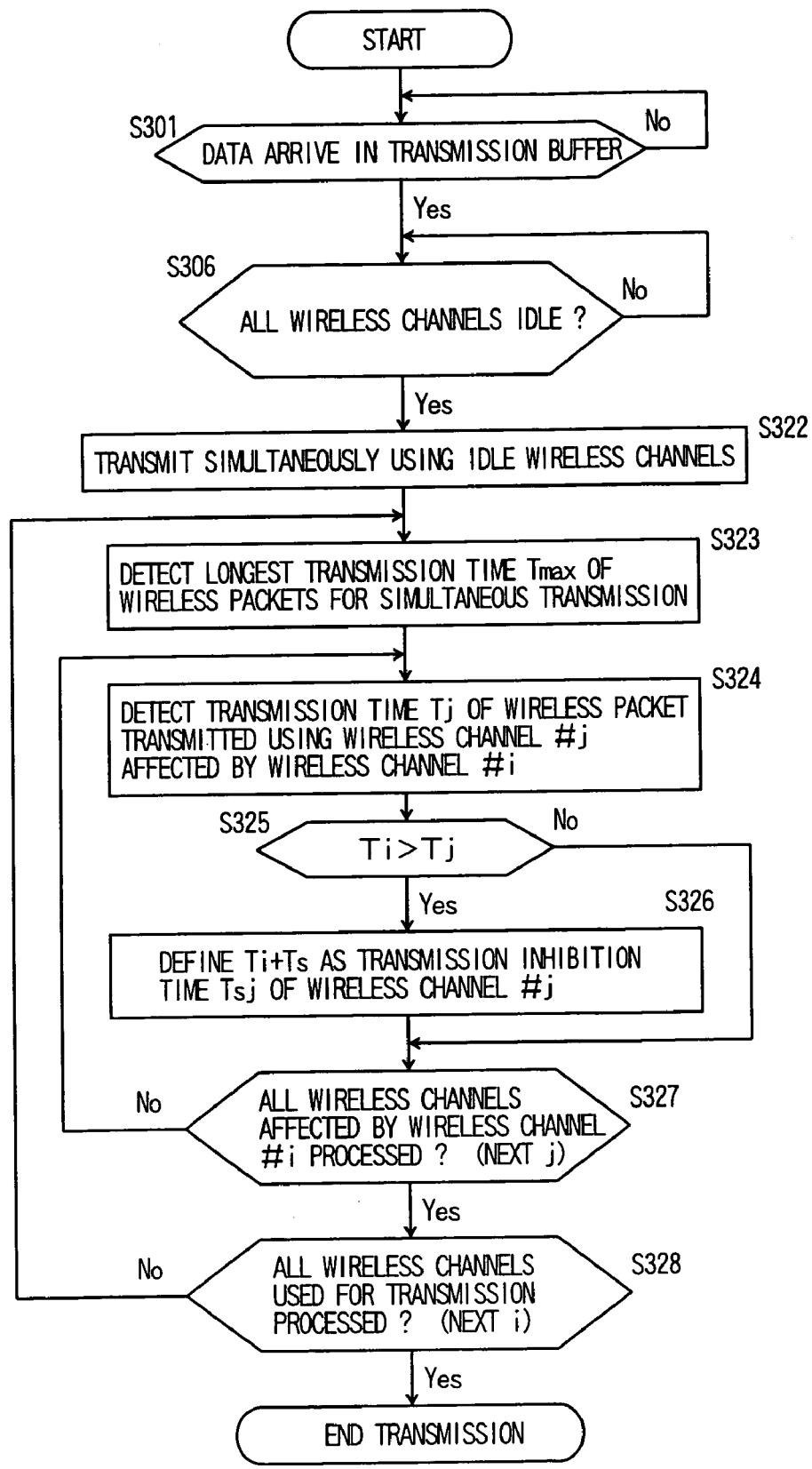
FIG. 33 is a flowchart showing a processing procedure according to a 21st embodiment of the present invention.
Figure 34:
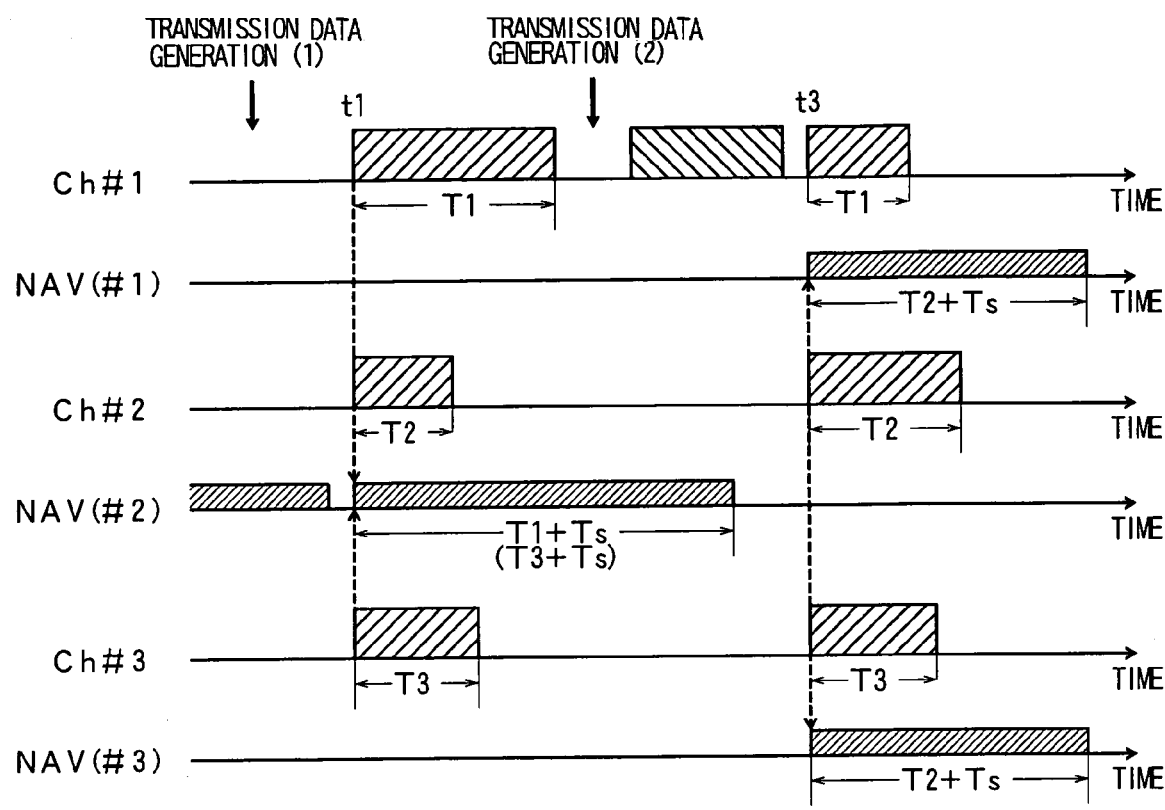
FIG. 34 is a time chart showing an example of operation according to the 21st embodiment of the present invention.

FIG. 33 shows a flowchart according to a 21st embodiment of the present invention. FIG. 34 shows an example of operation according to the 21st embodiment of the present invention. Here, wireless channels #1, #2, and #3 are prepared. It is assumed that at timing of transmission data generation (1), the wireless channel #2 is busy due to a virtual carrier sense by the NAV defined by a wireless packet received before then. It is also assumed that the wireless channels #1 to #3 are related to each other in that leakage can occur only between predefined wireless channels (e.g., between adjacent channels) (, which is different from the 20th embodiment in this point), and would not be able to receive wireless packets if there is any leakage.

First, upon arrival of data at a transmission buffer, the process performs a physical carrier sense by RSSI and a virtual carrier sense by NAV (a detection of transmission inhibition time) to determine whether all the wireless channels are idle (S301 and S306). Here, at timing of transmission data generation (1), the NAV of the wireless channel #2 has a set transmission inhibition time. Thus, the process waits by the timing t1 at which the transmission inhibition time elapses and all the wireless channels become idle. Then, at the timing t1, the process uses idle wireless channels to transmit a plurality of wireless packets simultaneously which are generated from data packets in a transmission queue (S322). Here, the wireless channels #1 to #3 are idle, and three (or the sum total of counts of MIMO in each wireless channel) wireless packets are transmitted using the wireless channels #1 to #3.

Then, processing is performed from S323 to S328 on each wireless channel #i (here, #1, #2, and #3) that has been used for transmission, as in the 15th embodiment. As a result, no setting is provided to the NAV of the wireless channels #1 and #3. The NAV of the wireless channel #2 is set to the greater one (T1+Ts) of the transmission inhibition time (T1+Ts) by the wireless channel #1 and the transmission inhibition time (T3+Ts) by the wireless channel #3.

Then, at timing of transmission data generation (2), the wireless channel #2 has the transmission inhibition time defined in S326 and the wireless channel #1 is busy due to a received signal. Thus, the process waits by the timing t3 at which all the wireless channels become idle. At the timing t3, the process transmits simultaneously using the wireless channels #1 to #3 in the same manner, in which the process sets the NAV of the wireless channels #1 and #3, which are adjacent to the wireless channel #2 having the longest transmission time, to a new transmission inhibition time (T2+Ts).

In the 20th and 21st embodiments, the received power may be detected to select a wireless channel that is actually affected by leakage. Alternatively, a check may be made for an error in a received wireless packet, so that if an error is detected, the wireless channel is selected as being affected by leakage.

22nd Embodiment

Figure 35:
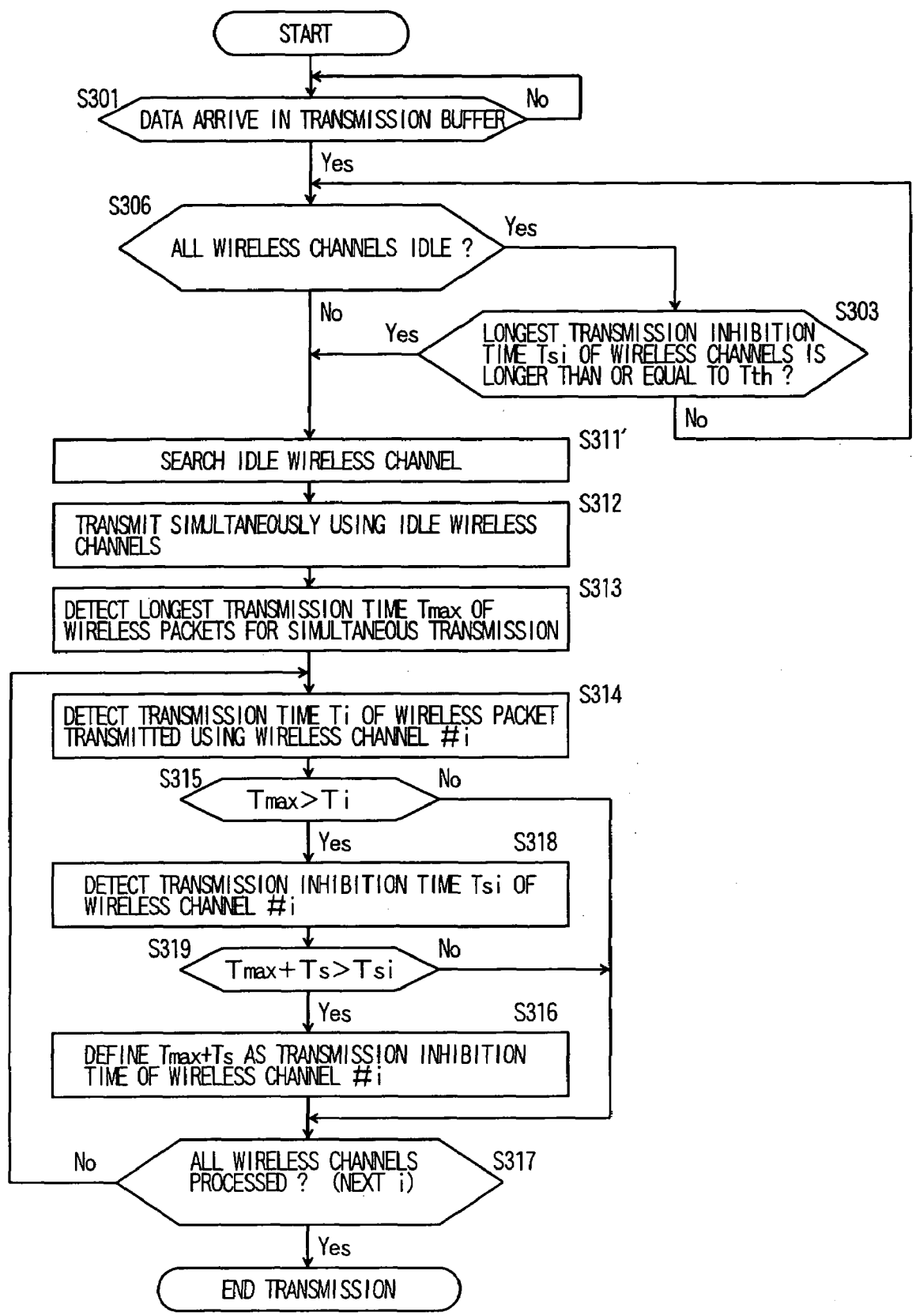
FIG. 35 is a flowchart showing a processing procedure according to a 22nd embodiment of the present invention.
Figure 36:
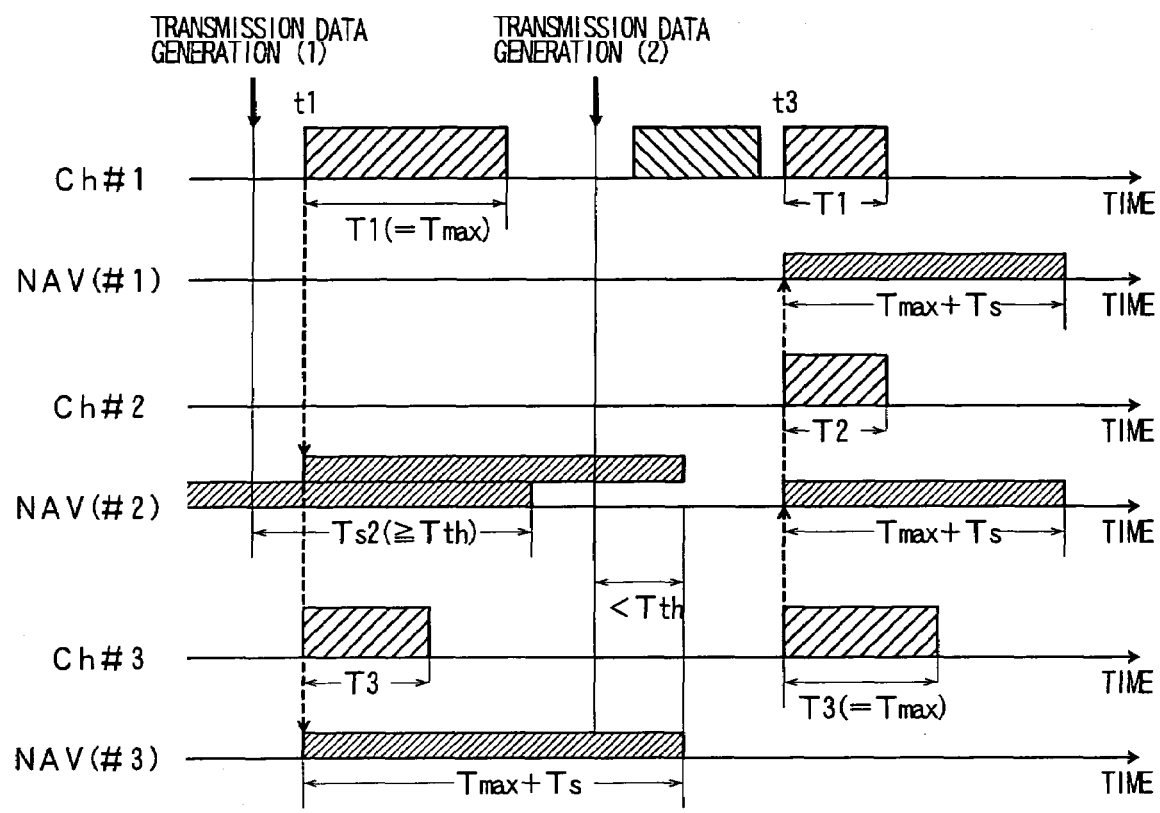
FIG. 36 is a time chart showing an example of operation according to the 22nd embodiment of the present invention.

FIG. 35 shows a flowchart according to a 22nd embodiment of the present invention. FIG. 36 shows an example of operation according to the 22nd embodiment of the present invention. Here, wireless channels #1, #2, and #3 are prepared. It is assumed that at timing of transmission data generation (1), the wireless channel #2 is busy due to a virtual carrier sense by the NAV defined by a wireless packet received before then. It is also assumed that the wireless channels #1, #2, and #3 are related to each other in that leakage can occur therebetween (, which is the same as the 20th embodiment in this point), and would not be able to receive wireless packets if there is any leakage.

First, upon arrival of data at a transmission buffer, the process performs a physical carrier sense by RSSI and a virtual carrier sense by NAV (a detection of transmission inhibition time) to determine whether all the wireless channels are idle. Then, if there are wireless channels which have a set transmission inhibition time and are thus not idle, the process determines whether the longest transmission inhibition time thereof is greater than or equal to the threshold value Tth. If it is less than the threshold value, then the process waits until the transmission inhibition time elapses and the wireless channel becomes idle (S301, S306, and S303). On the other hand, if the longest transmission inhibition time is greater than or equal to the threshold value Tth among the wireless channels having a set transmission inhibition time, then the process does not wait but proceeds to the next processing (S303).

Here, at the timing of transmission data generation (1), the NAV of the wireless channel #2 has a set transmission inhibition time and the transmission inhibition time Ts2 thereof is greater than or equal to the threshold value Tth. Thus, the process does not wait but proceeds to the next processing. At the timing ti, the process performs a physical carrier sense by RSSI and a virtual carrier sense by NAV to search for a wireless channel that is idle in both the detections (S311'). Then, the process uses the idle wireless channels to transmit a plurality of wireless packets simultaneously which are generated from data packets in a transmission queue (S312). Then, the process detects the longest transmission time Tmax of the transmission times of the wireless packets to be transmitted simultaneously (S313). Here, the wireless channels #1 and #3 are idle, and two (or the sum total of counts of MIMO in each wireless channel) wireless packets are transmitted using the wireless channels #1 and #3, in which the process detects the longest transmission time Tmax of them (here, the transmission time T1 of the wireless channel #1).

Then, processing is performed from S314 to S319 on each of the wireless channels #1, #2, and #3, as in the 17th embodiment. As a result, the process provides no setting to the NAV of the wireless channel #1 having the longest transmission time Tmax, whereas the process sets the NAV of the wireless channels #2 and #3 to the transmission inhibition time (Tmax+Ts). In this manner, the NAV of the wireless channels #2 and #3 is set to the transmission inhibition time (Tmax+Ts) assuming the presence of leakage from the wireless channel #1, thereby making it possible to prevent the situation where a wireless packet cannot be received and no setting can be provided to the NAV, as shown in FIG. 50.

Then, at timing of transmission data generation (2), the wireless channels #2 and #3 have the transmission inhibition time defined in S316 and the transmission inhibition time is less than or equal to the threshold value Tth. Additionally, the wireless channel #1 is busy due to a received signal. The process thus waits by the timing t3 at which all the wireless channels become idle. At the timing t3, the process transmits simultaneously using the wireless channels #1 to #3 in the same manner, in which the process sets the NAV of the wireless channels #1 and #2, excluding the wireless channel #3 having the longest transmission time, to a new transmission inhibition time (Tmax+Ts).

In the 22nd embodiment, S303, S311', S318, and S319 are added to the 20th embodiment shown in FIG. 31. Likewise, S303, S311', S318, and S319 can also be added to the 21st embodiment shown in FIG. 33. This can also be applied to modified examples of the 20th and 21st embodiments, in which received power is detected to select a wireless channel that is actually affected by leakage or in which a check is made for an error in a received wireless packet, so that if an error is detected, the wireless channel is selected as being affected by leakage.

23rd Embodiment

As the 17th embodiment and the 18th embodiment are related to each other, the 22nd embodiment can also be adapted such that if there are wireless channels having a set transmission inhibition time which is greater than or equal to the threshold value Tth or which is less than the threshold value Tth, the process may also wait until the transmission inhibition time of the wireless channel less than the threshold value Tth elapses.

24th Embodiment

FIG. 37 shows a flowchart according to a 24th embodiment of the present invention.

In the 22nd embodiment, If there are wireless channels which have a transmission inhibition time and are not idle and when the longest transmission inhibition time thereof is greater than or equal to the threshold value Tth, the process will not wait until the transmission inhibition time elapses but proceeds to the processing for searching for an idle wireless channel for transmission. This embodiment is characterized in that instead of the comparison processing (S303) of the longest transmission inhibition time with the threshold value Tth, the process proceeds to the processing of searching for an idle wireless channel with a probability p for transmission (S304), and then returns to determine whether there is a wireless channel which has a set transmission inhibition time (S302) after having waited for a certain period of time with a probability (1-p) (S305). This makes it possible to perform the transmission processing with a probability p regardless of the length of transmission inhibition time.

The probability p may be constant or alternatively variable depending on the set transmission inhibition time (e.g., a function monotonously decreasing with the transmission inhibition time).

25th Embodiment

Figure 39:
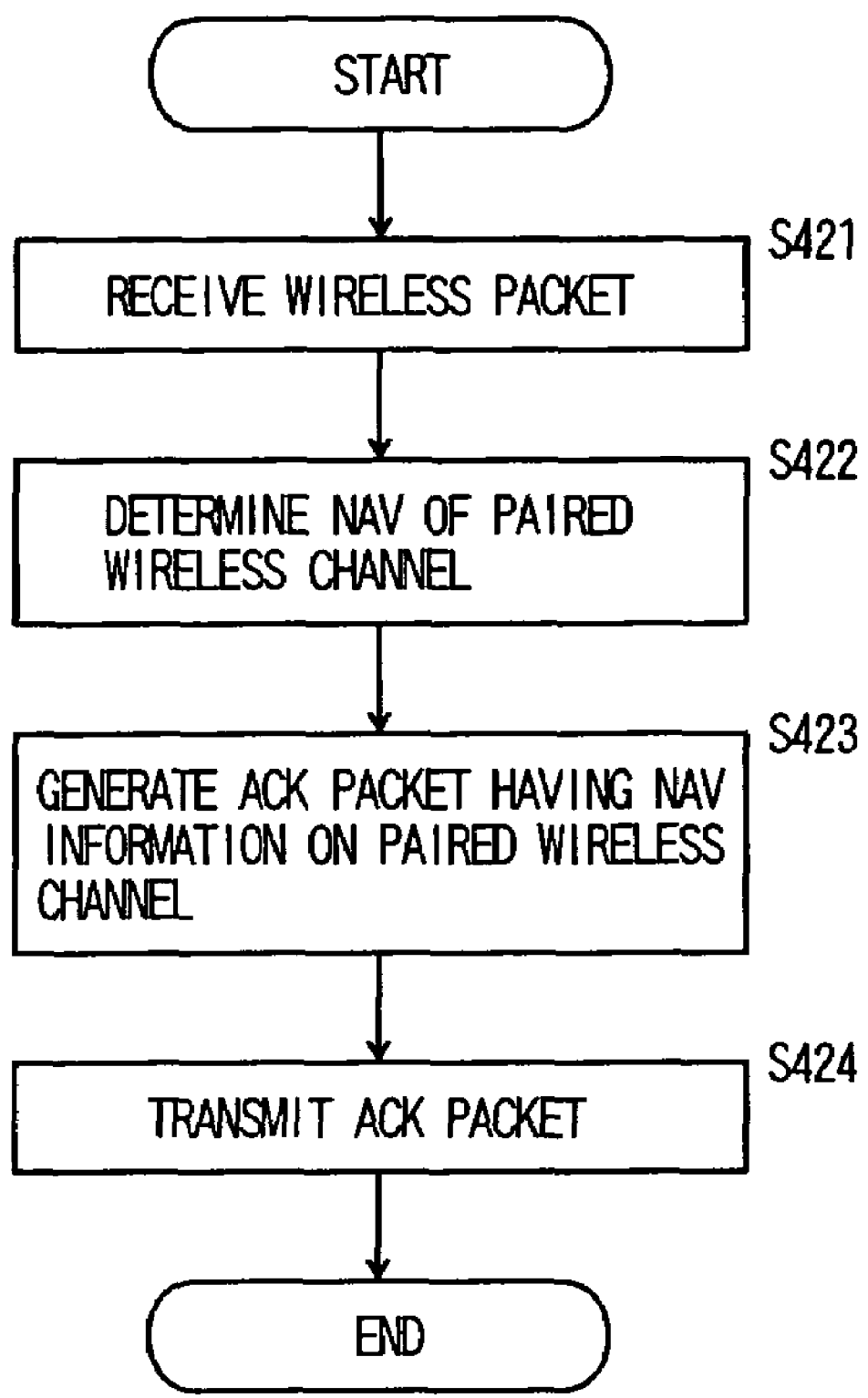
FIG. 39 is a flowchart showing a processing procedure on a receive side according to the 25th embodiment of the present invention.

FIG. 38 shows a flowchart of a processing procedure on a transmit side according to a 25th embodiment of the present invention. FIG. 39 shows a flowchart of a processing procedure on a receive side according to the 25th embodiment of the present invention. FIG. 40 shows examples of operation (1) and (2) according to the 25th embodiment of the present invention. Here, wireless channels #1 and #2 are prepared between STAs 1 and 2. It is assumed that at timing t1, the wireless channel #2 is busy due to a virtual carrier sense by the NAV defined by a wireless packet received before then. It is also assumed that the wireless channels #1 and #2 are related to each other in that leakage can occur therebetween and would not be able to receive wireless packets if there is any leakage.

In FIG. 38, a transmit-side STA searches for an idle wireless channel (S401). Here, the process performs a physical carrier sense by RSSI and a virtual carrier sense by NAV to determine that the wireless channel is idle if no carriers are detected in both the detections. Then, the process uses the idle wireless channel to transmit a wireless packet (S402). Then, the process sets the NAV of a wireless channel (here referred to as a "paired wireless channel"), which would be affected by leakage from the transmitting wireless channel, to a transmission inhibition time obtained by adding a predetermined time to the transmission time of the transmitted wireless packet (S403). The wireless channel #2 is known to be paired with the wireless channel #1 but may also be recognized by actually detecting the received power caused by leakage from the wireless channel #1 into the wireless channel #2. Then, the process starts an ACK timer to receive an ACK packet for a transmitted wireless packet and thus monitors whether or not to receive the ACK packet before an ACK timeout (S404, S405, and S406). Here, the process terminates the transmission processing if the ACK packet is not successfully received and the ACK timeout occurs, and then retransmits the wireless packet as required (S407).

On the other hand, if the ACK packet has been received before the ACK timeout occurs, the process stops the ACK timer (S408), and then checks for NAV information on the paired wireless channel in the ACK packet (S409). Here, for an ACK packet to which the NAV information is appended, the process updates the setting of NAV provided to the paired wireless channel according to the NAV information (S410), and then terminates the transmission processing (S411). On the other hand, for an ACK packet in the ordinary frame format without NAV information, the process terminates the transmission processing (S411). The processing in step S409 is directed to a system including a STA that can only transmit ACK packets in the ordinary frame format. For a system in which NAV information is appended to all ACK packets, the decision processing in step S409 is not required.

In FIG. 39, the receive-side STA determines the NAV defined in each wireless channel when having successfully received a wireless packet directed to the own STA (S421 and S422). It is assumed that the NAV of each wireless channel is defined in the respective wireless channels by the transmission inhibition time described in the received wireless packet (including those not directed to the own STA). Then, the process generates an ACK packet for the successfully received wireless packet. At this time, the NAV information on the paired wireless channel is appended to the ACK packet (S423). When no wireless packet is received over the paired wireless channel with the NAV equal to "0", the NAV information appended to the ACK packet is "0". The process transmits such an ACK packet to which the NAV information on the paired wireless channel is appended (S424), and then terminates the reception processing of the wireless packet.

Referring to FIG. 40, a more specific explanation will now be given to an example of operation following the processing procedure in the transmit-side STA 1 and the receive-side STA 2 described above. In FIGS. 38 and 39, the paired wireless channel refers to the wireless channel #2 for the wireless channel #1 over which a wireless packet is transmitted from the STA 1 to the STA 2.

In FIG. 40(1), at timing t1, the wireless channel #1 is idle, whereas the wireless channel #2 is busy by NAV (in a transmission inhibited state). The STA 1 detects the wireless channel #1 that is idle at the timing t1 to transmit a wireless packet directed to the STA 2. At this time, since the NAV of the paired wireless channel #2 is less than the transmission time of the wireless packet, the NAV of the wireless channel #2 is set to the transmission inhibition time obtained by adding a predetermined time (corresponding to the transmission inhibition time defined by a received packet during transmission of a wireless packet) to the transmission time of the wireless packet. Thereafter, the STA 1 waits for the reception of an ACK packet to be transmitted from the STA 2.

On the other hand, in the STA 2, after having successfully received the wireless packet over the wireless channel #1, the process determines the NAV defined for the paired wireless channel #2. Here, at timing t2, the NAV is defined in the wireless channel #2 by the received wireless packet. The process appends the NAV information to the ACK packet for transmission.

Having received the ACK packet for the wireless packet transmitted over the wireless channel #1, the STA 1 updates the NAV defined in the wireless channel #2 according to the NAV information appended to the ACK packet. Here, the process cancels the NAV defined at the timing t1 to shorten the NAV by the redefinition according to the NAV information appended to the ACK packet. In this manner, in the STA 1, even when the wireless packet of the wireless channel #2 cannot be received, a setting can be provided using the NAV of the wireless channel #2 of the STA 2, thus making it possible to update a potential NAV defined at the timing t1 and thereby provide an optimized one.

On the other hand, as shown in FIG. 40(2), an explanation is given as follows to a case where the STA 1 defines a NAV for the wireless channel #2 at the timing t1 but no received signal is present in the wireless channel #2. The NAV information appended to an ACK packet to be transmitted from the STA 2 is "0", and the STA 1 updates (cancels) the NAV defined for the wireless channel #2 when having received the ACK packet. This allows the potential setting of NAV for the wireless channel #2 to be canceled upon reception of the ACK packet, thereby immediately making the wireless channel #2 available for use.

26th Embodiment

The 26th embodiment is directed to multiple wireless channels being used at the same time, e.g., applied to a system which uses multiple wireless channels at the same time to transmit a plurality of wireless packets simultaneously. This embodiment may also be applied to a system which combines simultaneous transmission using multiple wireless channels and a known MIMO technique (Kurosaki et al., "100 Mbit/s SDM-COFDM over MIMO Channel for Broadband Mobile Communications", Technical Reports of the Institute of Electronics, Information and Communication Engineers, A P 2001-96, RCS2001-135(2001-10)).

Figure 41:
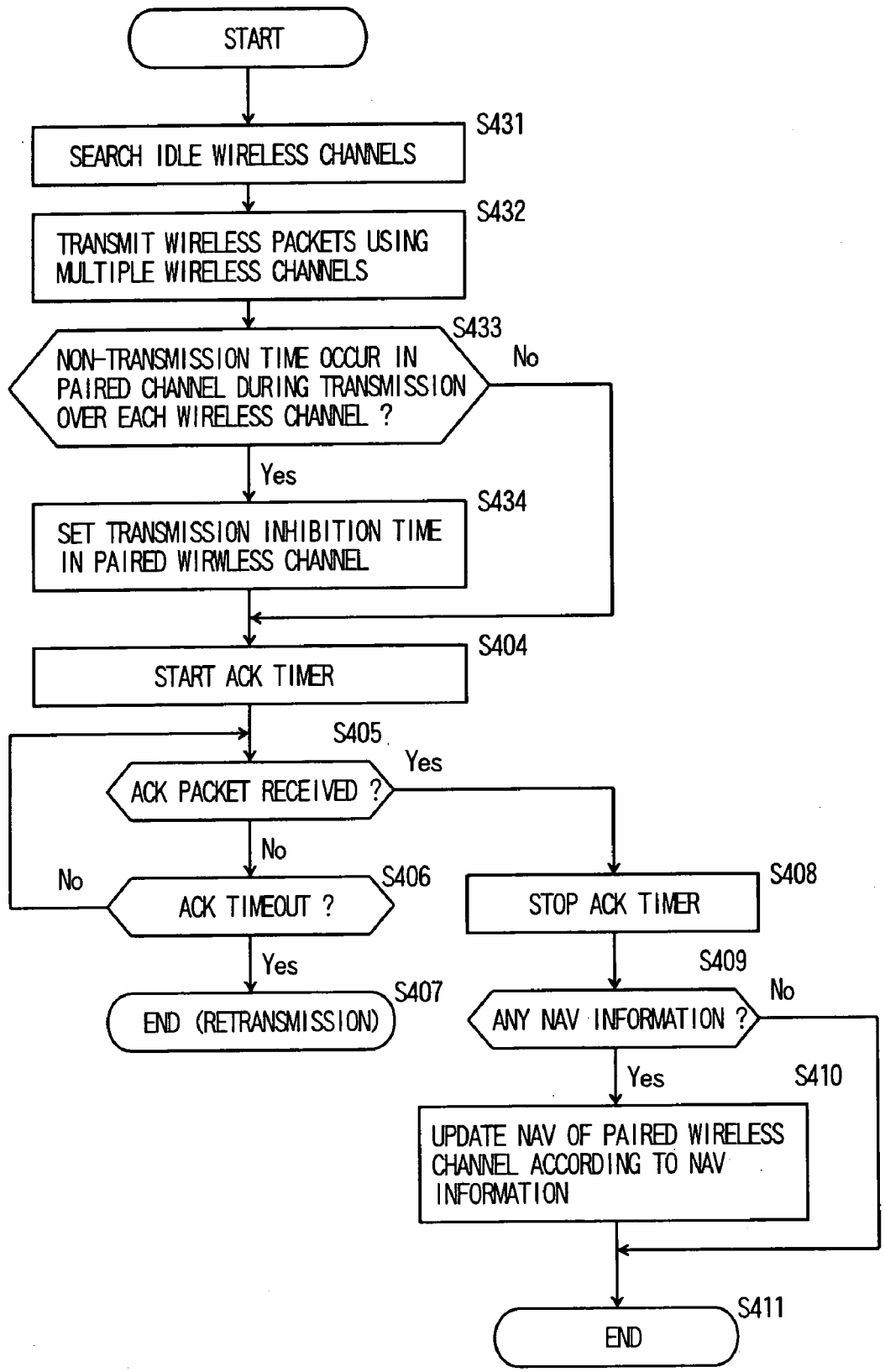
FIG. 41 is a time chart showing a processing procedure on a transmit side according to a 26th embodiment of the present invention.
Figure 42:
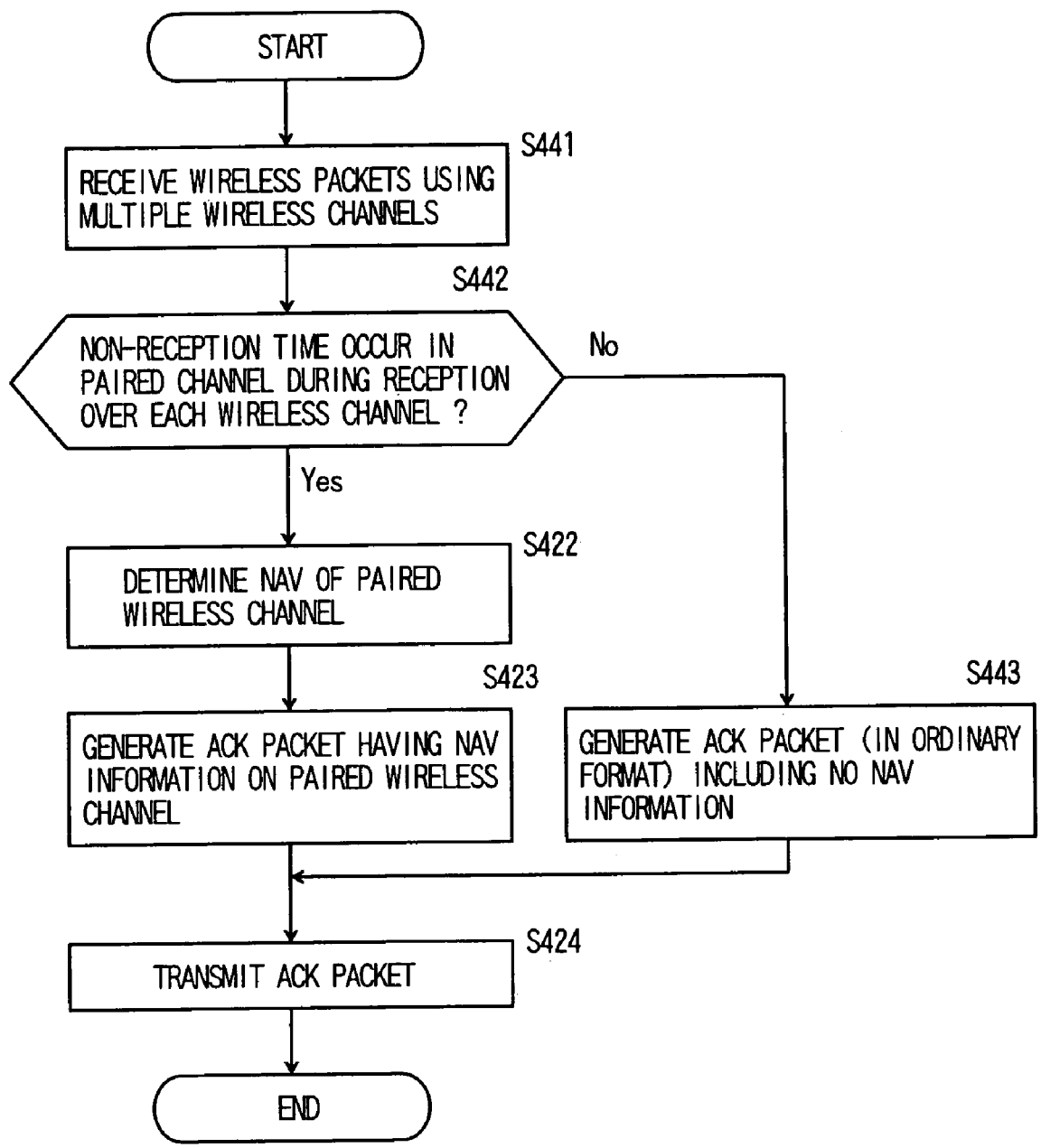
FIG. 42 is a flowchart showing a processing procedure on a receive side according to the 26th embodiment of the present invention.
Figure 44:
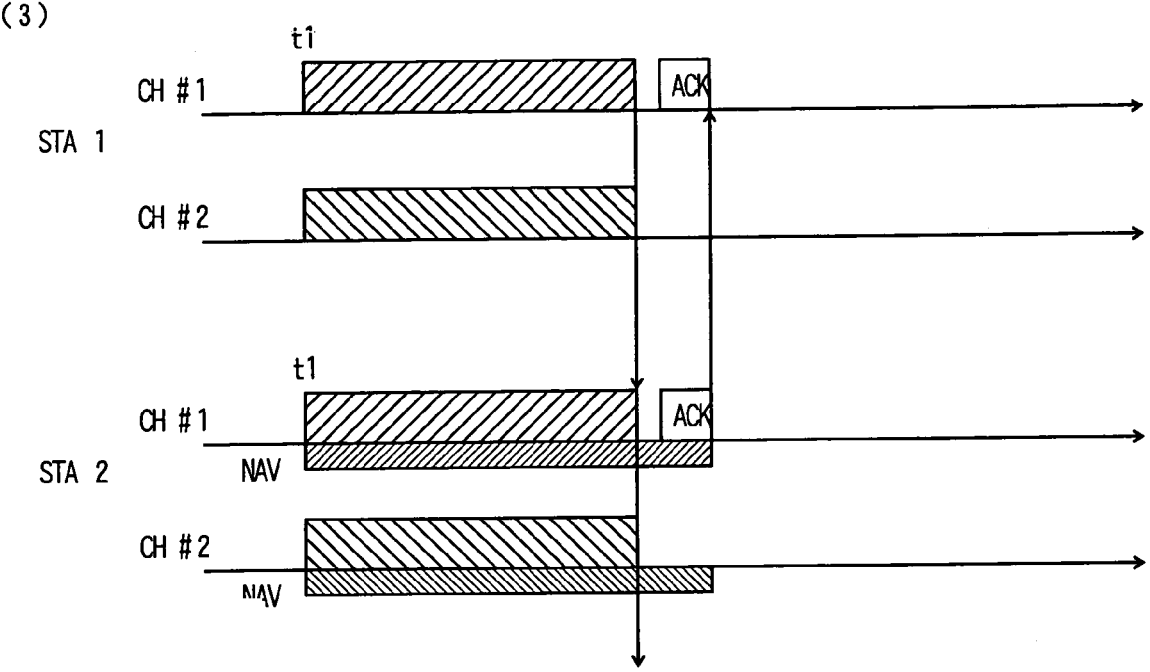
FIG. 44 is a time chart showing an example of operation according to the 26th embodiment of the present invention.

FIG. 41 shows a flowchart of a processing procedure on a transmit side according to a 26th embodiment of the present invention. FIG. 42 shows a flowchart of a processing procedure on a receive side according to the 26th embodiment of the present invention. FIGS. 43 and 44 show a time chart of examples of operation (1), (2), and (3) according to the 26th embodiment of the present invention. Here, wireless channels #1 and #2 are prepared between STAs 1 and 2. It is assumed that at timing t1, the wireless channels #1 and #2 are idle. It is also assumed that the wireless channels #1 and #2 are related to each other in that leakage can occur therebetween and would not be able to receive wireless packets if there is any leakage.

In FIG. 41, a transmit-side STA searches for an idle wireless channel, and then uses a plurality of idle wireless channels to transmit wireless packets (S431 and S432). Then, the process compares the transmission times of the wireless packets to be transmitted at the same time over the multiple wireless channels. Then, the process determines whether there occurs a non-transmission time (an idle state) in the paired wireless channel during transmission over each wireless channel, i.e., whether there is a paired wireless channel that is affected by leakage from a transmitting wireless channel (S433). Here, if there is a paired wireless channel, the process detects the longest transmission time Tmax of the transmission times of the wireless packets that are transmitted at the same time over the multiple wireless channels. Then, the process calculates a transmission inhibition time by adding a predetermined time to the transmission time Tmax. Then, the process provides this set transmission inhibition time to the NAV of the wireless channel paired with the wireless channel over which the wireless packet of the longest transmission time Tmax is transmitted (S434). The processing in S433 and S434 corresponds to the processing S103 to S109 of the second embodiment shown in FIG. 3, for example.

The following is the same as that of the 25th embodiment. That is, the process starts an ACK timer to receive an ACK packet for the transmitted wireless packet and thus monitors whether or not to receive the ACK packet before an ACK timeout (S404, S405, and S406). Here, the process terminates the transmission processing if the ACK packet is not successfully received and the ACK timeout occurs, and then retransmits the wireless packet as required (S407).

On the other hand, if the ACK packet has been received before the ACK timeout occurs, the process stops the ACK timer (S408), and then checks for NAV information on the paired wireless channel in the ACK packet (S409). Here, for an ACK packet to which the NAV information is appended, the process updates the setting of NAV provided to the paired wireless channel according to the NAV information (S410), and then terminates the transmission processing (S411). On the other hand, for an ACK packet in the ordinary frame format without NAV information, the process terminates the transmission processing (S411).

In FIG. 42, when having successfully received the wireless packets directed to the own STA which have been transmitted over the multiple wireless channels, the receive-side STA compares their respective reception times. Thus, the process determines whether there occurs a non-reception time in another wireless channel during reception over each wireless channel, i.e., whether a paired wireless channel in the transmit-side STA has a setting of NAV (S441 and S442). If there is a wireless channel in which a non-reception time occurs during reception over each wireless channel, the process follows steps S422, S423, and S424, as in the 25th embodiment, to generate and then transmits an ACK packet to which the NAV information on a paired wireless channel is appended. On the other hand, if there is no wireless channel in which non-reception time occurs, the process generates and then transmits an ACK packet (in an ordinary format) that includes no NAV information (S442, S443, and S424).

Referring to FIGS. 43 and 44, a more specific explanation will now be given to an example of operation following the processing procedure of the transmit-side STA 1 and the receive-side STA 2 described above.

In FIG. 43(1), at timing t1, the wireless channels #1 and #2 are idle, and each wireless channel transmits their respective wireless packets. Here, it is assumed that the transmission time of a wireless packet in the wireless channel #1 is greater than that of a wireless packet in the wireless channel #2. The STA 1 detects the wireless channels #1 and #2 that are idle at the timing t1 to transmit the respective wireless packets directed to the STA 2. At this time, since the transmission time of the wireless packet of the wireless channel #2 is shorter, the process sets the NAV of the wireless channel #2 paired with the wireless channel #1 to the transmission inhibition time obtained by adding a predetermined time to the transmission time of the wireless packet of the wireless channel #1. Thereafter, the STA 1 waits for the reception of an ACK packet to be transmitted from the STA 2.

On the other hand, in the STA 2, after having successfully received wireless packets over the wireless channels #1 and #2, the process determines that there occurs a non-reception time in the wireless channel #2 during reception over the wireless channel #1 (or there occurs no non-reception time in the wireless channel #1 during reception over the wireless channel #2). Accordingly, in the wireless channel #2, the process generates and then transmits an ACK packet in an ordinary format (which includes no NAV information) for the received wireless packet. On the other hand, in the wireless channel #1, the process determines the NAV defined for the paired wireless channel #2, and then appends the NAV information to the ACK packet for transmission.

Having received the ACK packet for the wireless packet transmitted over the wireless channel #1, the STA 1 updates the NAV defined for the wireless channel #2 according to the NAV information appended to the ACK packet. Here, the process cancels the NAV defined at the timing t1 to shorten the NAV by the redefinition according to the NAV information appended to the ACK packet.

As described above, the process compares the reception times of wireless packets over the wireless channels #1 and #2 at the receive-side STA 2. It can be thus seen that the NAV has been defined on the transmit side for the wireless channel #2. Accordingly, the STA 2 can attach NAV information on the wireless channel #2 to the ACK packet for a wireless packet in the wireless channel #1, thereby allowing for updating the NAV defined for the wireless channel #2 at the transmit-side STA 1. That is, in the STA 1, even when the wireless packet of the wireless channel #2 cannot be received, a setting can be provided using the NAV of the wireless channel #2 of the STA 2, thus making it possible to update a potential NAV defined at the timing t1 and thereby provide an optimized one.

On the other hand, as shown in FIG. 43(2), an explanation is given as follows to a case where the STA 1 defines a NAV for the wireless channel #2 at the timing t1 but no received signal is present in the wireless channel #2. The NAV information appended to an ACK packet to be transmitted from the STA 2 is "0", and the STA 1 updates (cancels) the NAV defined for the wireless channel #2 when having received the ACK packet. This allows the potential NAV defined for the wireless channel #2 to be canceled upon reception of the ACK packet, thereby making the wireless channel #2 available for use.

On the other hand, as in the example of operation (3) according to the 26th embodiment shown in FIG. 44, the wireless packets transmitted over the idle wireless channels #1 and #2 have the same transmission time (or transmitted completely simultaneously). In this case, there will never occur a non-transmission time (idle state) in one wireless channel during transmission over the other wireless channel. Accordingly, in this case, since the transmit-side STA does not need to define a transmission inhibition time for each wireless channel, the receive-side STA has to return only an ACK packet that includes no NAV information.

On the other hand, an ACK packet to which NAV information on the paired wireless channel is appended can be communicated from the receive-side STA to the transmit-side STA, e.g., by providing the header with a field for describing the paired wireless channel and its NAV information. When the reception has been successfully acknowledged through the CRC check of the ACK frame, the transmit-side STA refers the field to update the NAV of the paired wireless channel.

[Example of Configuration of Wireless Packet Communication Apparatus]

Figure 45:
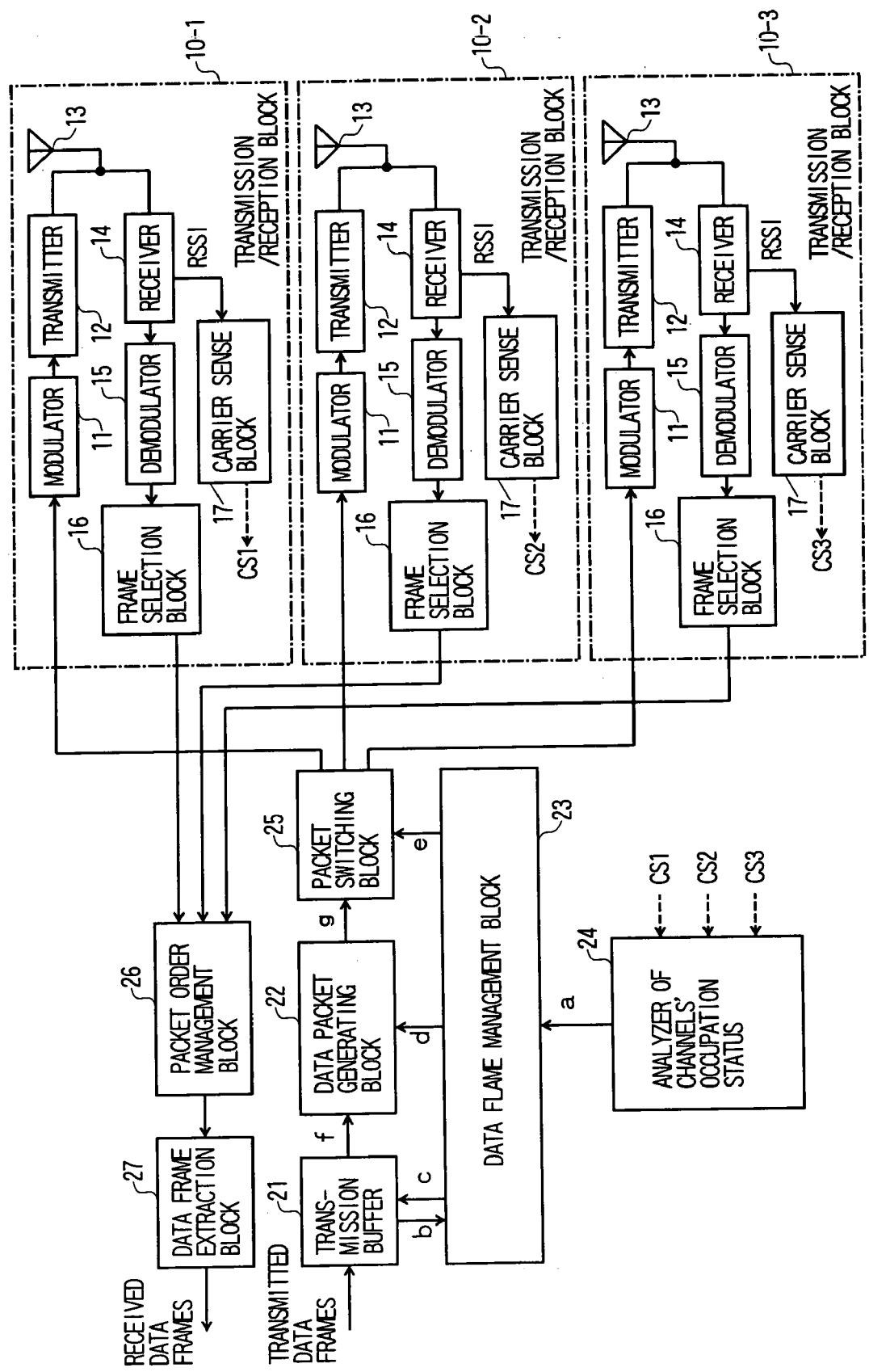
FIG. 45 is a block diagram illustrating an exemplary configuration of a wireless packet communication apparatus corresponding to the first to 26th embodiments of the present invention.

FIG. 45 illustrates an exemplary configuration of a wireless packet communication apparatus corresponding to the wireless packet communication method according to the first to 26th embodiments. Here, the configuration of a wireless packet communication apparatus is shown which can transmit and receive three wireless packets simultaneously using three wireless channels #1, #2, and #3; however, the number of simultaneous transmissions can be defined as required. Use of the MIMO for each wireless channel would make it possible to transmit and receive wireless packets simultaneously in the number of simultaneous transmissions which corresponds to the sum total of counts of MIMO in each of multiple wireless channels. However, the MIMO is omitted here. This also applies to a case where multiple wireless channels are individually used independent of each other.

Referring to the figure, the wireless packet communication apparatus includes transmission/reception blocks 10-1,10-2, and 10-3, a transmission buffer 21, a data packet generating block 22, a data frame management block 23, an analyzer of channels' occupation status 24, a packet switching block 25, a packet order management block 26, and a data frame extraction block 27.

The transmission/reception blocks 10-1,10-2, and 10-3 perform radio transmission over the wireless channels #1, #2, and #3 that are different from each other. These wireless channels are different from each other in radio frequency or the like and thus independent of each other, so that the transmission/reception blocks 10-1,10-2, and 10-3 are configured to be capable to perform radio transmission simultaneously using multiple wireless channels. Each transmission/reception block 10 includes a modulator 11, a transmitter 12, an antenna 13, a receiver 14, a demodulator 15, a frame selection block 16, and a carrier sense block 17.

Radio frequency signals that another wireless packet communication apparatus has transmitted via mutually different wireless channels #1, #2, and #3 are received at the receiver 14 via the antenna 13 of the respectively corresponding transmission/reception blocks 10-1,10-2, and 10-3. The receiver 14, which corresponds to each wireless channel, performs on the received radio frequency signal the reception processing which includes frequency translation, filtering, quadrature detection, and AD conversion. Each receiver 14 receives radio frequency signals all the time over the radio propagation path of each wireless channel while the respectively connected antenna 13 is not in use for transmission, so that an RSSI signal indicative of the received electric field strength of each wireless channel is delivered to the carrier sense block 17. On the other hand, when a radio frequency signal is received over the wireless channel corresponding to the receiver 14, a baseband signal having been subjected to the reception processing is delivered to the demodulator 15.

The demodulator 15 performs the demodulation processing on each baseband signal delivered from the receiver 14, so that the resulting data packet and ACK packet (or the ACK packet according to the first, 25th, and 26th embodiments) are delivered to the frame selection block 16. The frame selection block 16 performs a CRC check on the received packet, and then delivers those packets with no error detected to the carrier sense block 17 (to define NAV as discussed later). Additionally, when a data packet has been received successfully, the frame selection block 16 identifies whether the data packet has been transmitted to the own STA. That is, the frame selection block 16 checks to see if the destination ID of each data packet corresponds with the own STA. Then, the frame selection block 16 delivers those data packets directed to the own STA to the packet order management block 26 and allows an ACK packet generation block (not shown) to generate an ACK packet, which is in turn delivered to the modulator 11 to perform the acknowledgment processing. On the other hand, those data packets that are not directed to the own STA would be discarded at the frame selection block 16.

The packet order management block 26 checks the sequence number appended to each received data packet in order to sort a plurality of received data packets in an appropriate order, i.e., in the order of the sequence number. The result is delivered as a received data packets to the data frame extraction block 27. The data frame extraction block 27 removes the packet header from each data packet contained in the received data packets supplied, and then outputs the resulting data frames as received data frames.

Upon reception of an RSSI signal, the carrier sense block 17 compares the value of the received electric field strength represented by the signal with a predefined threshold value. Then, the carrier sense block 17 determines that the assigned wireless channel is idle when the received electric field strength continues to be less than the threshold value continuously during a predetermined period of time. The carrier sense block 17 otherwise determines that the assigned wireless channel is busy. The carrier sense block 17 corresponding to each wireless channel delivers this result of determination as a carrier sense result. When the antenna 13 is transmitting in each transmission/reception block 10, no RSSI signal is supplied to the carrier sense block 17. On the other hand, when the antenna 13 has been already transmitting, it is not possible to simultaneously transmit another data packet as a radio frequency signal using the same antenna 13. Accordingly, when no RSSI signal has been supplied, each carrier sense block 17 outputs a carrier sense result indicating that the assigned wireless channel is busy.

Additionally, the carrier sense block 17 sets the NAV to the occupied time described in the packet supplied from the frame selection block 16. Then, the carrier sense block 17 determines whether the corresponding wireless channel is idle or busy according to the NAV value and the RSSI signal supplied from the receiver 14. Carrier sense results cs1 to cs3 delivered from the carrier sense block 17 corresponding to each wireless channel are supplied to the analyzer of channels' occupation status 24. Based on the carrier sense result corresponding to each wireless channel, the analyzer of channels' occupation status 24 manages the idle state of each wireless channel, and informs the data frame management block 23 of information such as the idle wireless channel and the number of idle channels ("a" in FIG. 45).

On the other hand, the transmission buffer 21 receives transmitted data frames to be transmitted and buffers the transmitted data frames. The transmitted data frames are made up of one or a plurality of data frames. The transmission buffer 21 informs the data frame management block 23 successively of the number of data frames currently held, ID information on a directed wireless packet communication apparatus, data sizes, address information indicative of the position on the buffer and the like (b).

The data frame management block 23 determines how and from which data frame to generate a data packet and which wireless channel to use for transmission. This is based on the information regarding the data frame for each directed STA ID informed from the transmission buffer 21 and the information regarding the wireless channel informed from the analyzer of channels' occupation status 24. The determination results are informed to each of the transmission buffer 21, the data packet generating block 22, and the packet switching block 25(c, d, and e). For example, suppose that the number N of idle wireless channels is less than the number K of data frames in a transmission queue in the transmission buffer 21. In this case, the data frame management block 23 determines the number N of idle wireless channels as the number of data packets to be transmitted simultaneously, and then informs the transmission buffer 21 of the address information for designating N data frames among the K data frames (c). The data frame management block 23 also informs the data packet generating block 22 of the information for generating N data packets from the data frame supplied from the transmission buffer 21(d). The data frame management block 23 also instructs the packet switching block 25 on the correspondence between the N data packets generated at the data packet generating block 22 and the idle wireless channels (e).

The transmission buffer 21 delivers a data frame, designated for output, to the data packet generating block 22(f). The data packet generating block 22 extracts data fields from each data frame to generate a plurality of data blocks. Then, the data packet generating block 22 generates a data packet by attaching, to the data block, a packet header that contains the ID information on a directed STA serving as the destination of the data packet and the control information such as the sequence number indicative of the order of the data frame, and a CRC code (FCS field) serving as an error detection code. The data packet generating block 22 may generate a plurality of data blocks having the same packet time length or alternatively data blocks each having different packet time lengths. The control information also includes information required to convert a data packet received at the receive-side STA into the original data frame. The packet switching block 25 correlates each data packet supplied from the data packet generating block 22 with each wireless channel.

As a result of such a correlation, the data packet correlated with the wireless channel #1 is supplied to the modulator 11 within the transmission/reception block 10-1; the data packet correlated with the wireless channel #2 is supplied to the modulator 11 within the transmission/reception block 10-2; and the data packet correlated with the wireless channel #3 is supplied to the modulator 11 within the transmission/reception block 10-3. Upon reception of a data packet from the packet switching block 25, each modulator 11 performs the predetermined modulation processing on the data packet for output to the transmitter 12. Each transmitter 12 performs the transmission processing, which includes DA conversion, frequency translation, filtering, and power amplification, on the modulated data packet supplied from the modulator 11, and then transmits the resulting data packet as a wireless packet from the antenna 13 via the respectively corresponding wireless channel.

The processing shown in the first to 26th embodiments such as the definition, cancellation, and update of transmission inhibition time for each wireless channel is performed from the analyzer of channels' occupation status 24 on the NAV in the carrier sense block 17 under the control of the data frame management block 23. For example, for wireless channels other than one that requires the longest transmission/reception time Tmax among the wireless channels used for simultaneous transmission/reception, the data frame management block 23 calculates the time (Tmax+Ts) obtained by adding a predetermined time Ts to Tmax as the transmission inhibition time used for a virtual carrier sense. Then, the data frame management block 23 sets the NAV corresponding to each wireless channel of the carrier sense block 17 to the time (Tmax+Ts) via the analyzer of channels' occupation status 24. When multiple wireless channels are used, this prevents a situation where a wireless packet cannot be received and no setting can be provided to the NAV due to leakage into adjacent channels.

27th Embodiment

Figure 46:
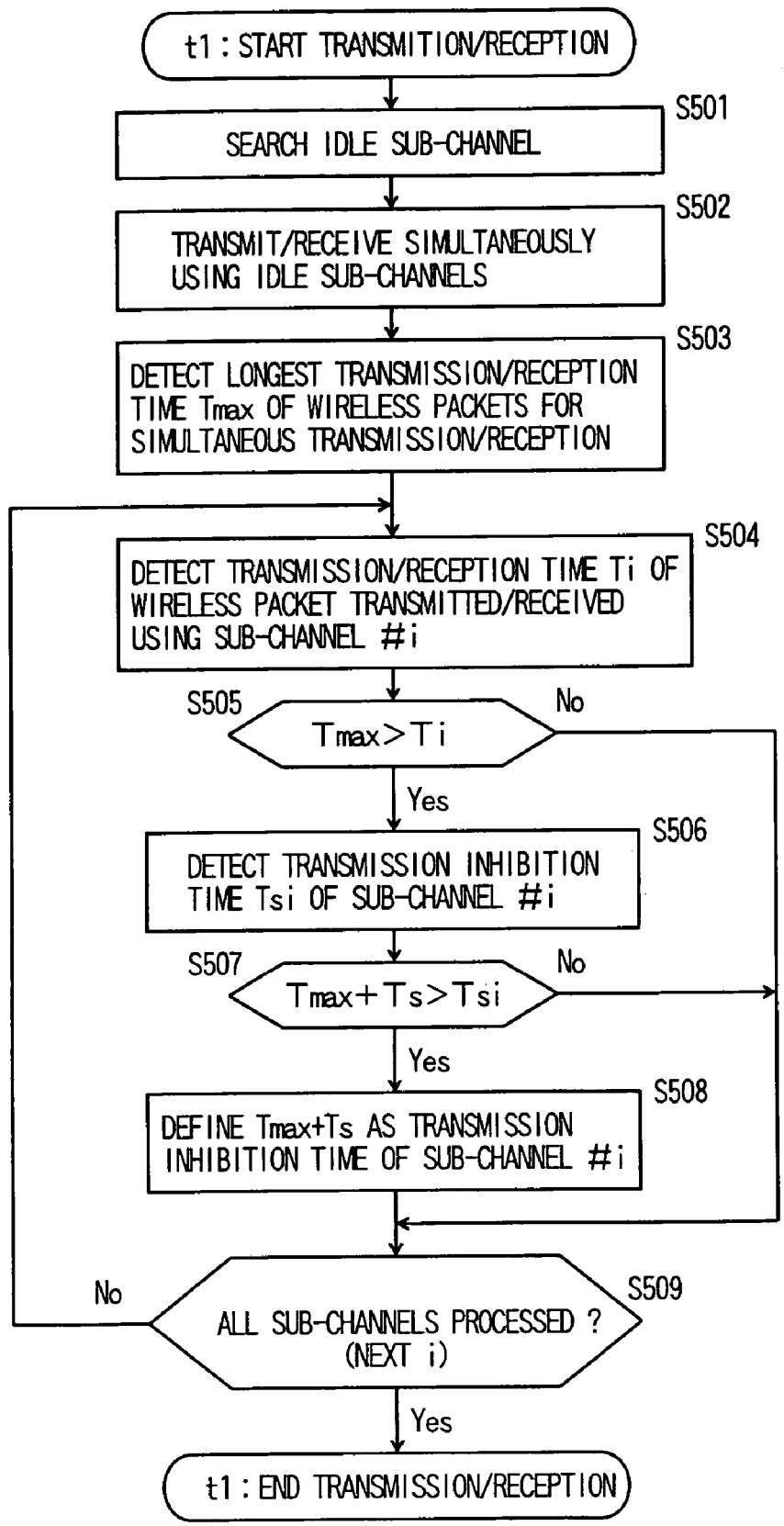
FIG. 46 is a flowchart showing a processing procedure according to a 27th embodiment of the present invention.
Figure 47:
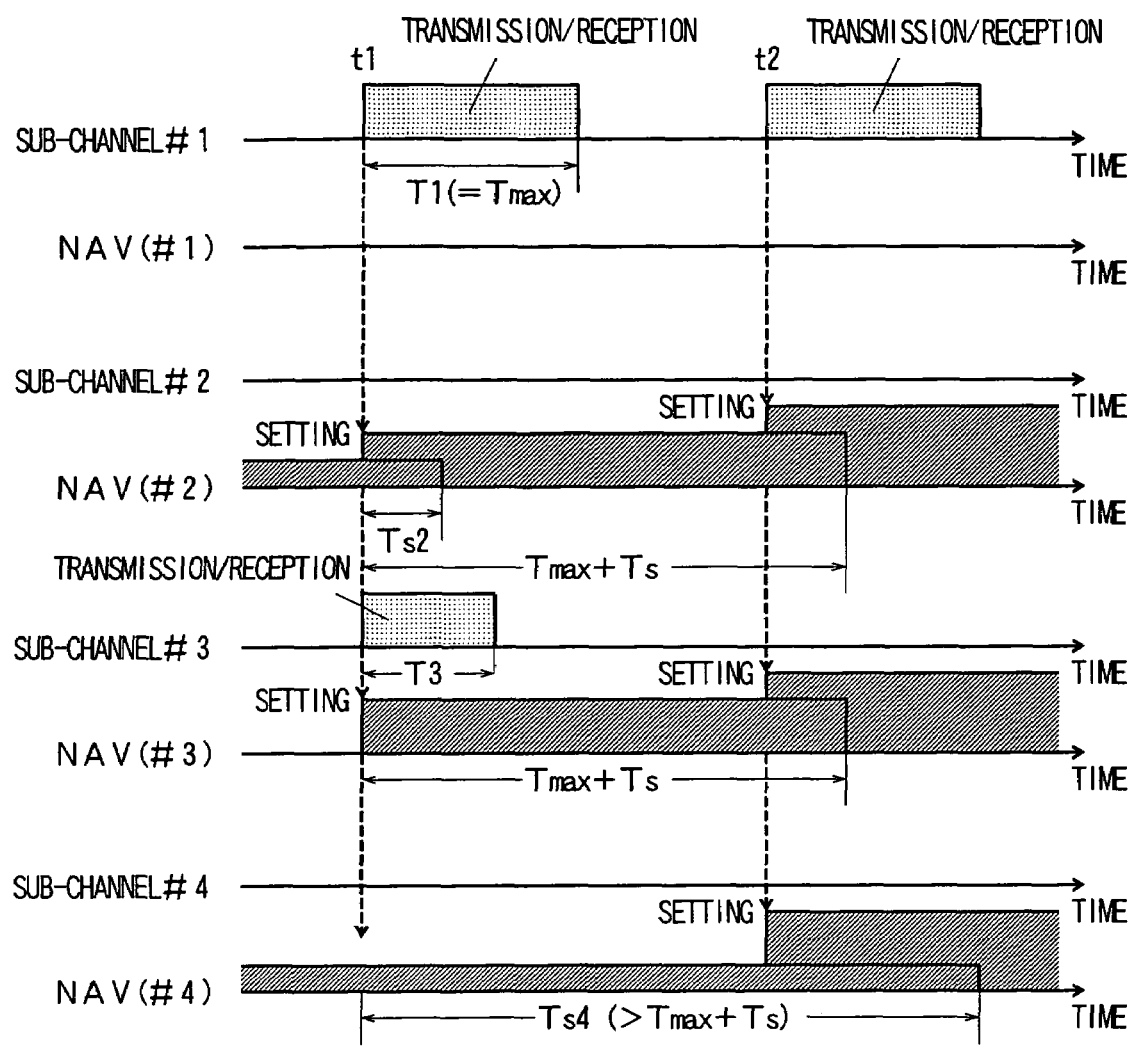
FIG. 47 is a time chart showing an example of operation according to the 27th embodiment of the present invention.

FIG. 46 shows a flowchart according to a 27th embodiment of the present invention. FIG. 47 shows an example of operation according to the 27th embodiment of the present invention. This embodiment shows an example which is applied to a case where a plurality of sub-channels are used which are multiplexed in one wireless channel. During transmission and reception over part of sub-channels of one wireless channel, the own STA cannot receive a wireless packet that has been transmitted by the STA at the other end using another sub-channel. Accordingly, the problem shown in FIG. 50 also applies to the case of utilizing a plurality of sub-channels.

Here, sub-channels #1, #2, #3, and #4 are prepared. It is assumed that at timing t1, the sub-channels #2 and #4 are busy due to a virtual carrier sense by the NAV defined by a wireless packet received before then. It is also assumed that since there is only one transceiver, part of sub-channels being used for transmission and reception would not allow the sub-channels #1, #2, #3, and #4 to transmit or receive using another sub-channel.

First, the process searches for a sub-channel that is idle at timing t1 (S501). Here, a physical carrier sense by RSSI and a virtual carrier sense by NAV (a detection of the transmission inhibition time) are performed to determine that the sub-channel is idle if no carriers are detected in both the detections. Then, the process uses the idle sub-channels to transmit and receive simultaneously according to the number of data packets in a transmission queue (S502). Then, the process detects the longest transmission/reception time Tmax of the transmission times (or reception times) of the wireless packets to be transmitted and received simultaneously (S503). Here, the sub-channels #1 and #3 are idle, and two wireless packets are transmitted and received simultaneously using the sub-channels #1 and #3, in which the process detects the longest transmission/reception time Tmax of them (here, the transmission/reception time T1 of the sub-channel #1).

Then, processing is performed from S504 to S509 on each of the sub-channels #1, #2, #3, and #4. First, the process detects the transmission/reception time Ti of the wireless packet to be transmitted and received over the sub-channel #i (i=1, 2, 3, and 4) (S504). Here, Ti=0 if no wireless packet is transmitted or received because the sub-channel #i is busy (here, T2=T4=0). Then, the process compares the longest transmission/reception time Tmax with the transmission/reception time Ti of the wireless packet to be transmitted and received over the sub-channel #i (S505). Here, since the transmission/reception time Ti of the sub-channel #1 is the longest (Tmax=T1), and Tmax >Ti in other than the sub-channel #1, the following processing is directed to other than the sub-channel #1.

The process detects a transmission inhibition time Tsi at which each NAV is set for the sub-channel #i with Tmax>Ti (S506). Here, the process detects Ts2 and Ts4 for the sub-channels #2 and #4, and Ts3=0 for the sub-channel #3. Then, the process compares the time (Tmax+Ts) obtained by adding a predetermined time Ts to Tmax with the existing set transmission inhibition time Tsi. If Tmax+Ts>Tsi, then the NAV is set to Tmax+Ts as a new transmission inhibition time to perform processing on the next sub-channel (S507, S508, and S509). On the other hand, the process performs no processing on the sub-channel #i (here, #1) for which Tmax>Ti is not true or on the sub-channel #i (here, #4) for which Tmax+Ts>Tsi is not true, but performs processing on the next sub-channel (S505, S507, and S509).

As a result, the process provides no setting to the NAV of the sub-channel #1 having the longest transmission/reception time Tmax, whereas the process sets the NAV of the sub-channels #2 and #3 to the transmission inhibition time (Tmax+Ts), and allows the NAV of the sub-channel #4 to be held at the current transmission inhibition time (Ts4). Accordingly, at the next timing t2, the process determines that the sub-channels #2, #3, and #4 are busy due to a virtual carrier sense by NAV, and thus allows only the sub-channel #1 to be used for transmission of wireless packets.

In this manner, the set transmission inhibition time (Tmax+Ts) is provided to the NAV of the sub-channels #2 and #3 that cannot perform the reception processing due to transmission and reception over the sub-channel #1, thereby making it possible to prevent the situation where a wireless packet cannot be received and no setting can be provided to the NAV, as shown in FIG. 50.

[Example of Configuration of Wireless Packet Communication Apparatus]

Figure 48:
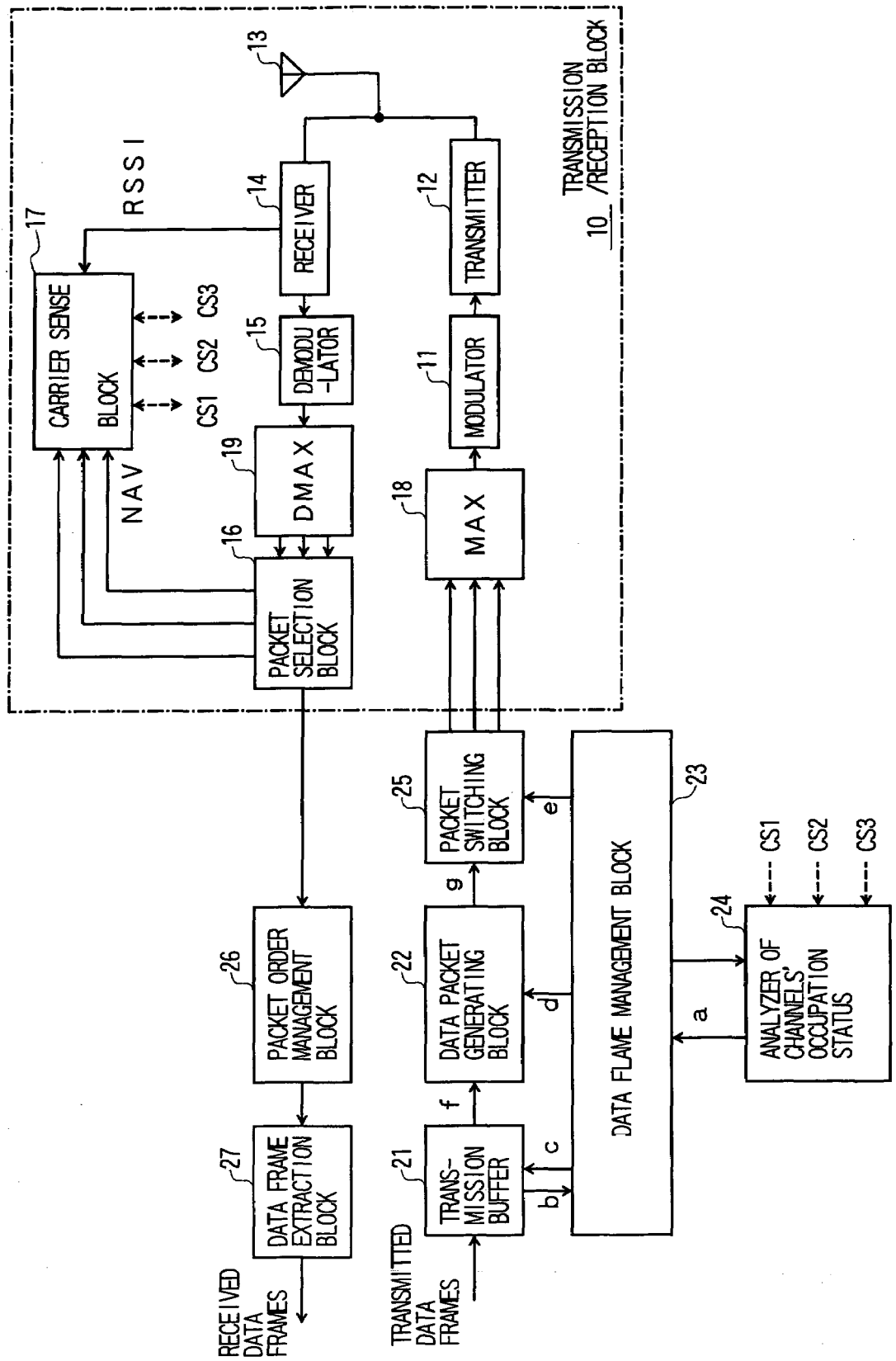
FIG. 48 is a block diagram illustrating an exemplary configuration of a wireless packet communication apparatus corresponding to the 27th embodiment of the present invention.
Figure 49:
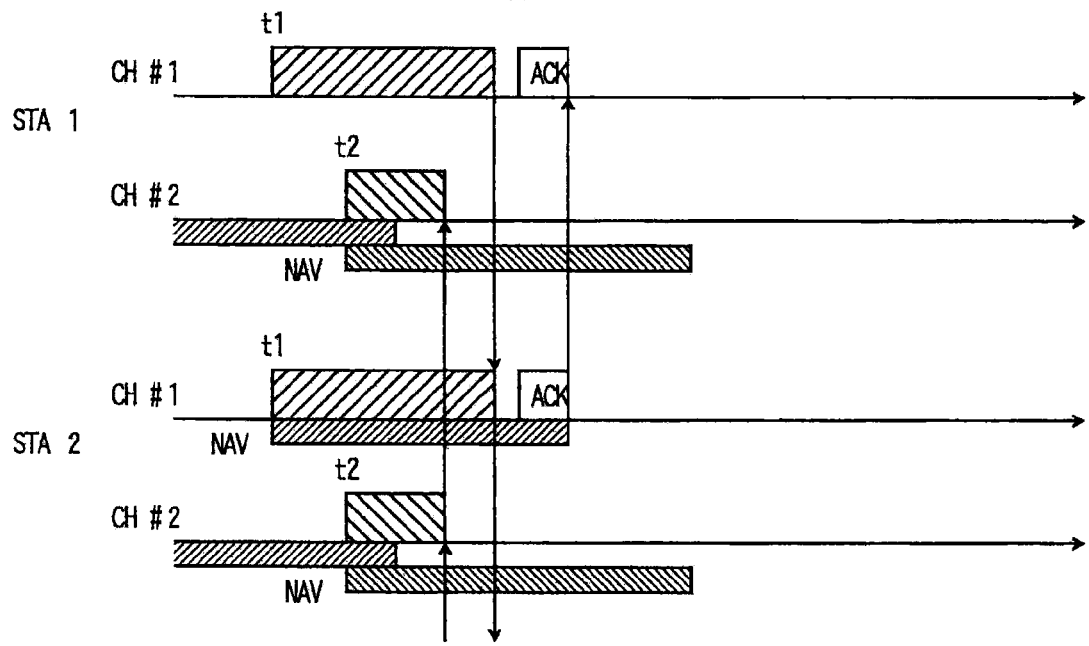
FIG. 49 is an explanatory view illustrating an exemplary method for wireless packet communication using two wireless channels.

FIG. 48 illustrates an exemplary configuration of a wireless packet communication apparatus corresponding to the wireless packet communication method according to the 27th embodiment.

Here, the configuration of a wireless packet communication apparatus is shown which can transmit and receive three wireless packets simultaneously using three sub-channels #1, #2, and #3; however, the number of parallels can be defined as required.

Referring to the figure, the wireless packet communication apparatus includes a transmission/reception block 10, a transmission buffer 21, a data packet generation portion 22, a data frame management block 23, an analyzer of channels' occupation status 24, a packet switching block 25, a packet order management block 26, and a data frame extraction block 27.

The transmission/reception block 10 is configured to demultiplex a signal in the sub-channels #1, #2, and #3 for wireless transmission using one wireless channel. For example, these sub-channels are different from each other in sub-carrier frequency and can be multiplexed into one wireless channel. The transmission/reception block 10 includes a modulator 11, a transmitter 12, an antenna 13, a receiver 14, a demodulator 15, a frame selection block 16, a carrier sense block 17, a multiplexer 18, and a demultiplexer 19.

Radio frequency signals that another wireless packet communication apparatus has transmitted are received at the receiver 14 via the antenna 13 of the transmission/reception block 10. The receiver 14 performs on the received radio frequency signal the reception processing which includes frequency translation, filtering, quadrature detection, and AD conversion, and then delivers to the demodulator 15 the baseband signal that has been subjected to the reception processing. The receiver 14 receives radio frequency signals all the time over the radio propagation path while the antenna 13 is not in use for transmission, so that an RSSI signal indicative of the received electric field strength is delivered to the carrier sense block 17.

The demodulator 15 performs the demodulation processing on the baseband signal supplied from the receiver 14, so that the data packet of each sub-channel is delivered to the frame selection block 16 via the demultiplexer 19. The frame selection block 16 performs a CRC check on the data packet of each sub-channel, and then delivers those packets with no error detected to the carrier sense block 17 (to define NAV as discussed later). Additionally, when a data packet has been received successfully, the frame selection block 16 identifies whether the data packet has been transmitted to the own STA. That is, the frame selection block 16 checks to see if the destination ID of each data packet corresponds with the own STA. Then, the frame selection block 16 delivers those data packets directed to the own STA to the packet order management block 26. On the other hand, when the data packet is not directed to the own STA, the frame selection block 16 discards the packet.

The packet order management block 26 checks the sequence number appended to each received data packet in order to sort a plurality of received data packets in an appropriate order, i.e., in the order of the sequence number. The result is delivered as a received data packets to the data frame extraction block 27. The data frame extraction block 27 removes the packet header from each data packet contained in the received data packets supplied, and then outputs the resulting data frames as received data frames.

The carrier sense block 17 detects an RSSI signal corresponding to each sub-channel to compare the value of the received electric field strength represented by each signal with a predefined threshold value. Then, when the received electric field strength of each sub-channel continues to be less than the threshold value continuously during a predetermined period of time, the carrier sense block 17 determines that the sub-channel is idle. The carrier sense block 17 otherwise determines that the sub-channel is busy. In the transmission/reception block 10, no RSSI signal is supplied to the carrier sense block 17 when the antenna 13 is transmitting. On the other hand, when the antenna 13 has been already transmitting, it is not possible to simultaneously transmit another data packet as a radio frequency signal using the same antenna 13. Accordingly, when no RSSI signal has been supplied, the carrier sense block 17 outputs a carrier sense result indicating that the sub-channel is busy.

Additionally, the carrier sense block 17 sets the NAV to the occupied time described in the data packet supplied from the frame selection block 16. Then, the carrier sense block 17 determines whether the corresponding sub-channel is idle or busy according to the NAV value and the RSSI signal supplied from the receiver 14. Carrier sense results cs1 to cs3 supplied from the carrier sense block 17 corresponding to each sub-channel are supplied to the analyzer of channels' occupation status 24. Based on the carrier sense result corresponding to each sub-channel, the analyzer of channels' occupation status 24 manages the idle state of each sub-channel, and informs the data frame management block 23 of information such as the idle sub-channel and the number of idle channels ("a" in FIG. 48).

On the other hand, the transmission buffer 21 receives transmitted data frames to be transmitted and buffers the transmitted data frames. The transmitted data frames is made up of one or a plurality of data frames. The transmission buffer 21 informs the data frame management block 23 successively of the number of data frames currently held, ID information on a directed wireless packet communication apparatus, data sizes, address information indicative of the position on the buffer and the like (b).

The data frame management block 23 determines how and from which data frame to generate a data packet. This is based on the information regarding the data frame for each directed STA ID informed from the transmission buffer 21 and the information regarding the sub-channel informed from the analyzer of channels' occupation status 24. The determination results are informed to each of the transmission buffer 21, the data packet generating block 22, and the packet switching block 25(c, d, and e). For example, suppose that the number N of idle sub-channels is less than the number K of data frames in a transmission queue in the transmission buffer 21. In this case, the data frame management block 23 determines the number N of idle sub-channels as the number of data packets to be transmitted simultaneously, and then informs the transmission buffer 21 of the address information for designating N data frames among the K data frames (c). The data frame management block 23 also informs the data packet generating block 22 of the information for generating N data packets from the data frame supplied from the transmission buffer 21(d). The data frame management block 23 also instructs the packet switching block 25 on the correspondence between the N data packets generated at the data packet generating block 22 and the idle sub-channels (e).

The transmission buffer 21 delivers a data frame, designated for output, to the data packet generating block 22(f). The data packet generating block 22 extracts data fields from each data frame to generate a plurality of data blocks. Then, the data packet generating block 22 generates a data packet by attaching, to the data block, a packet header that contains the ID information on a directed STA serving as the destination of the data packet and the control information such as the sequence number indicative of the order of the data frame, and a CRC code (FCS field) serving as an error detection code. The data packet generating block 22 may generate a plurality of data blocks having the same packet time length or alternatively data blocks each having different packet time lengths. The control information also includes information required to convert a data packet received at the receive-side STA into the original data frame. The packet switching block 25 correlates each data packet supplied from the data packet generating block 22 with each sub-channel.

For example, suppose that all the three sub-channels #1, #2, and #3 are idle; the packet switching block 25 selects all the three sub-channels #1, #2, and #3; and three data packets are simultaneously supplied from the transmission buffer 21. In this case, these three data packets should be correlated with the sub-channels #1, #2, and #3 in orderly sequence, respectively. The data packet correlated with each sub-channel is supplied to the modulator 11 via the multiplexer 18. Upon reception of the data packet from the packet switching block 25, the modulator 11 performs the predetermined modulation processing on the data packet for output to the transmitter 12. The transmitter 12 performs the transmission processing, which includes DA conversion, frequency translation, filtering, and power amplification, on the modulated data packet supplied from the modulator 11, and then transmits the resulting data packet as a wireless packet from the antenna 13

The processing shown in the 27th embodiment such as setting of transmission inhibition time for each sub-channel is performed from the analyzer of channels' occupation status 24 on the NAV in the carrier sense block 17 under the control of the data frame management block 23. For example, for sub-channels other than one that requires the longest transmission/reception time Tmax among the sub-channels used for simultaneous transmission and reception, the data frame management block 23 calculates the time (Tmax+Ts) obtained by adding a predetermined time Ts to Tmax as the transmission inhibition time used for a virtual carrier sense. Then, the data frame management block 23 sets the NAV corresponding to each sub-channel of the carrier sense block 17 to the time (Tmax+Ts) via the analyzer of channels' occupation status 24. When a plurality of sub-channels are used, this prevents a situation where a wireless packet cannot be received and no setting can be provided to the NAV due to leakage into adjacent channels.

The invention is not limited to the above embodiments and various modifications may be made without departing from the spirit and scope of the invention. Any improvement may be made in part or all of the components.

INDUSTRIAL AVAILABILITY

The present invention autonomously sets transmission inhibition time corresponding to the transmission time of a wireless packet to a paired wireless channel which is affected by leakage from a transmitting wireless channel and thus incapable of receiving successfully, thereby allowing a virtual carrier sense to be properly performed.

Furthermore, where a wireless packet is successfully received or information on transmission inhibition time is informed from the party at the other end over a wireless channel provided autonomously with a set transmission inhibition time, it is possible to cancel or update the current transmission inhibition time to thereby avoid an unnecessary setting of transmission inhibition time and provide improved efficiency.

Furthermore, where there is a wireless channel having a setting of transmission inhibition time when transmission data is generated, it is possible to wait until the transmission inhibition time elapses, thereby avoiding continual settings of transmission inhibition time.

Still furthermore, when transmission data is generated, depending on the setting of transmission inhibition time, it is possible to selectively wait until the transmission inhibition time elapses or alternatively not to wait but to transmit a wireless packet using an idle wireless channel. This allows for defining an upper wait time limit as well as avoiding continual settings of transmission inhibition time.

The invention claimed is:

1. A wireless packet communication method for simultaneously transmitting from a transmit-side STA a plurality of wireless packets by using multiple wireless channels determined to be idle by both of physical carrier sense and virtual carrier sense when multiple wireless channels are provided between the transmit-side STA and one or more receive-side STAs, the physical carrier sense determining a wireless channel to be busy or idle from received power, the virtual carrier sense determining a wireless channel to be busy during a set transmission inhibition time, the method characterized by comprising setting, by said transmit-side STA, time (Tmax+Ts) as transmission inhibition time to a paired wireless channel other than a wireless channel which requires longest transmission time Tmax among wireless channels used for simultaneous transmission, the transmission inhibition time used in the virtual carrier sense, the time (Tmax+Ts) obtained by adding predetermined time Ts to the longest transmission time Tmax; and setting, by said transmit-side STA, the time (Tmax+Ts) to the paired wireless channel as a new transmission inhibition time when an existing set transmission inhibition time for said virtual carrier sense is smaller than the time (Tmax+Ts).

2. A wireless packet communication method for simultaneously transmitting from a transmit-side STA a plurality of wireless packets by using multiple wireless channels determined to be idle by both of physical carrier sense and virtual carrier sense when multiple wireless channels are provided between the transmit-side STA and one or more receive-side STAs, the physical carrier sense determining a wireless channel to be busy or idle from received power, the virtual carrier sense determining a wireless channel to be busy during a set transmission inhibition time, the method characterized by comprising:

predetermining, by said transmit-side STA, combinations of wireless channels among the multiple wireless channels, the combinations of wireless channels having an effect on each other due to a leakage of transmitted power;

setting, by said transmit-side STA, time (Ti+Ts) as transmission inhibition time to a paired wireless channel other than a wireless channel which requires longest transmission time Ti among respective combinations of wireless channels, the transmission inhibition time being used in the virtual carrier sense, the time (Ti+Ts) obtained by adding a predetermined time Ts to the longest transmission time Ti; and setting, by said transmit-side STA, the time (Ti+Ts) to the paired wireless channel as a new transmission inhibition time when an existing set transmission inhibition time for said virtual carrier sense is smaller than the time (Ti+Ts).

3. The wireless packet communication method according to any one of claims 1 or 2, characterized by further comprising detecting, by said transmit-side STA, received power due to a leakage from a transmitting wireless channel in the paired wireless channel, and setting the transmission inhibition time to a paired wireless channel which has received power greater than or equal to a predetermined threshold value.

4. The wireless packet communication method according to any one of claims 1 or 2, characterized by further comprising detecting, by said transmit-side STA, an error in a received signal in the paired wireless channel, and setting the transmission inhibition time to a paired wireless channel having the error detected.

5. The wireless packet communication method according to any one of claims 1 or 2, characterized by further comprising:

when receiving a wireless packet over the paired wireless channel at said transmit-side STA, performing, by said transmit-side STA, an error detection to the received wireless packet:

when a wireless channel having normally received a wireless packet directed to an own STA has the set transmission inhibition time, canceling the transmission inhibition time by said transmit-side STA; and when occupied time is set in a header of the received wireless packet, setting, by said transmit-side STA, a new transmission inhibition time in accordance with the occupied time.

6. The wireless packet communication method according to any one of claims 1 or 2, characterized by further comprising when there is a wireless channel having the set transmission inhibition time at the time of transmission data generation, transmitting, by said transmit-side STA, a wireless packet using said wireless channel determined to be idle after waiting until the transmission inhibition time elapses.

7. The wireless packet communication method according to any one of claims 1 or 2, characterized by further comprising:

when there are wireless channels having set transmission time at the time of transmission data generation, transmitting, by said transmit-side STA, a wireless packet using said wireless channel determined to be idle after waiting until the transmission inhibition time elapses when the longest transmission inhibition time is smaller than a predetermined threshold value; or transmitting, by said transmit-side STA, a wireless packet using said wireless channel determined to be idle without waiting until the transmission inhibition time elapses when the longest transmission inhibition time is greater than or equal to the predetermined threshold value.

8. The wireless packet communication method according to any one of claims 1 or 2, characterized by further comprising when there is a wireless channel having the set transmission inhibition time at the time of transmission data generation, transmitting, by said transmit-side STA, a wireless packet using said wireless channel determined to be idle with a predetermined probability without waiting until the transmission inhibition time elapses.

9. The wireless packet communication method according to any one of claims 1 or 2, characterized by further comprising when transmission data is generated, transmitting, by said transmit-side STA, a wireless packet using said wireless channel determined to be idle after waiting until all wireless channels are determined to be idle by said physical carrier sense and said virtual carrier sense.

10. The wireless packet communication method according to any one of claims 1 or 2, characterized by further comprising:
when transmission data is generated,
transmitting, by said transmit-side STA, wireless packets using said wireless channels determined to be idle after waiting until all wireless channels are determined to be idle by said physical carrier sense and said virtual carrier sense; or
transmitting, by said transmit-side STA, wireless packets using said wireless channels determined to be idle without waiting until the transmission inhibition time elapses when the longest transmission inhibition time of the set transmission inhibition time of wireless channels is greater than or equal to a predetermined threshold value.

11. The wireless packet communication method according to any one of claims 1 or 2, characterized by further comprising
when transmission data is generated, transmitting, by said transmit-side STA, a wireless packet using said wireless channel determined to be idle after waiting or without waiting with a predetermined probability until all wireless channels are determined to be idle by said physical carrier sense and said virtual carrier sense.

12. The wireless packet communication method according to any one of claims 1 or 2, characterized by further comprising:
when receiving a wireless packet having set transmission inhibition time, setting, by said receive-side STA, the transmission inhibition time to a wireless channel having received the wireless packet, and when normally receiving a wireless packet directed to an own STA, transmitting, by said receive-side STA, an ACK packet to said transmit-side STA, the ACK packet including the transmission inhibition time set in the paired wireless channel; and
when receiving a corresponding ACK packet within a predetermined period of time after having transmitted said wireless packet, updating, by said transmit-side STA, transmission inhibition time set for the paired wireless channel to transmission inhibition time of the paired wireless channel included in the ACK packet.

13. The wireless packet communication method according to claim 10, characterized by further comprising:
when there are wireless channels having the set transmission inhibition time,
transmitting, by said transmit-side STA, a wireless packet using said wireless channel determined to be idle after waiting until the transmission inhibition time elapses when there is a wireless channel having set transmission inhibition time smaller than a predetermined threshold value; or
transmitting, by said transmit-side STA, a wireless packet using said wireless channel determined to be idle without waiting until the transmission inhibition time elapses when no wireless channel has set transmission inhibition time smaller than the predetermined threshold value.

14. The wireless packet communication method according to claim 13, characterized by further comprising
said transmit-side STA's returning to determine whether there is a wireless channel having the set transmission inhibition time or whether all wireless channels are idle, after waiting until the transmission inhibition time elapses when there are wireless channels having the set transmission inhibition time and there is a wireless channel having set transmission inhibition time smaller than a predetermined threshold value.

15. A wireless packet communication method for assigning, by a transmit-side STA, a plurality of wireless packets, respectively, to a plurality of sub-channels determined to be idle by both physical carrier sense and virtual carrier sense for simultaneous transmission, when sub-channels to be multiplexed into one wireless channel are provided between a transmit-side STA and one or more receive-side STAs, the physical carrier sense in which said transmit-side STA determines each sub-channel to be busy or idle from received power, the virtual carrier sense in which said transmit-side STA determines each sub-channel to be busy during set transmission inhibition time, the method characterized by comprising
setting, by said transmit-side STA, time (Tmax+Ts) as transmission inhibition time to sub-channels other than a sub-channel which requires longest transmission/reception time Tmax among sub-channels used for simultaneous transmission, the time (Tmax+Ts) being obtained by adding a predetermined time Ts to the longest transmission/reception time Tmax, the transmission inhibition time being used in the virtual carrier sense;
setting the time (Tmax+Ts) as a new transmission inhibition time by said transmit-side STA when an existing set transmission inhibition time for said virtual carrier sense is smaller than the time (Tmax+Ts).

16. A wireless packet communication apparatus provided with multiple wireless channels between a transmit-side STA and one or more receive-side STAs for simultaneously transmitting from the transmit-side STA a plurality of wireless packets by using multiple wireless channels determined to be idle by both of a physical carrier sense unit and a virtual carrier sense unit, the physical carrier sense unit determining a wireless channel to be busy or idle from received power, the virtual carrier sense unit determining a wireless channel to be busy during set transmission inhibition time, the apparatus characterized by comprising
a virtual carrier sense unit of said transmit-side STA setting time (Tmax+Ts) as the transmission inhibition time to a paired wireless channel other than a wireless channel which requires longest transmission time Tmax among wireless channels used for simultaneous transmission, the time (Tmax+Ts) obtained by adding the predetermined time Ts to the longest transmission Tmax,
when an existing set transmission inhibition time is smaller than the time (Tmax+Ts), the virtual carrier sense unit of said transmit-side STA sets the time (Tmax+Ts) to the paired wireless channel as a new transmission inhibition time.

17. A wireless packet communication apparatus provided with multiple wireless channels between a transmit-side STA and one or more receive-side STAs for simultaneously transmitting from the transmit-side STA a plurality of wireless packets by using multiple wireless channels determined to be idle by both of a physical carrier sense unit and a virtual carrier sense unit, the physical carrier sense unit determining a wireless channel to be busy or idle from received power, the virtual carrier sense unit determining a wireless channel to be busy during set transmission inhibition time, the apparatus characterized by comprising
a virtual carrier sense unit of said transmit-side STA predetermining combinations of wireless channels which have an effect of leakage of transmitted power on each other among multiple wireless channels, and setting time (Ti+Ts) as the transmission inhibition time to a paired wireless channel other than a wireless channel which requires longest transmission time Ti among respective combinations of wireless channels, the time (Ti+Ts) obtained by adding a predetermined time Ts to the longest transmission time Ti, when an existing set transmission inhibition time is smaller than the time (Ti+Ts), the virtual carrier sense unit of said transmit-side STA sets the time (Ti +Ts) to the paired wireless channel as a new transmission inhibition time.

18. The wireless packet communication apparatus according to any one of claims 16 or 17, characterized in that said transmit-side STA includes a unit which detects received power in the paired wireless channel caused by leakage from a transmitting wireless channel, and said virtual carrier sense unit sets the transmission inhibition time to a paired wireless channel having the received power greater than or equal to a predetermined threshold value.

19. The wireless packet communication apparatus according to any one of claims 16 or 17, characterized in that said transmit-side STA includes a unit which detects an error in a received signal in the paired wireless channel, and said virtual carrier sense unit sets the transmission inhibition time to a paired wireless channel having an error detected.

20. The wireless packet communication apparatus according to any one of claims 16 or 17, characterized in that:

said transmit-side STA includes a unit which detects, when receiving a wireless packet over the paired wireless channel, an error in the received wireless packet;

when a wireless channel having normally received a wireless packet directed to an own STA has the set transmission inhibition time, said virtual carrier sense unit cancels the transmission inhibition time; and when occupied time is set in a header of the received wireless packet, said virtual carrier sense unit sets a new transmission inhibition time in accordance with the occupied time.

21. The wireless packet communication apparatus according to any one of claims 16 or 17, characterized in that when transmission data is generated, the virtual carrier sense unit of said transmit-side STA transmits a wireless packet using said wireless channel determined to be idle after waiting until the transmission inhibition time elapses when there is a wireless channel having the set transmission inhibition time.

22. The wireless packet communication apparatus according to any one of claims 16 or 17, characterized in that:

when transmission data is generated, when the longest transmission inhibition time of the set transmission inhibition time of wireless channels is smaller than a predetermined threshold value, the virtual carrier sense unit of said transmit-side STA transmits a wireless packet using said wireless channel determined to be idle after waiting until the transmission inhibition time elapses; or when the longest transmission inhibition time is greater than or equal to the predetermined threshold value, said virtual carrier sense unit transmits a wireless packet using said wireless channel determined to be idle without waiting until the transmission inhibition time elapses.

23. The wireless packet communication apparatus according to any one of claims 16 or 17, characterized in that when there is a wireless channel having the set transmission inhibition time at the time of transmission data generation, the virtual carrier sense unit of said transmit-side STA transmits a wireless packet using said wireless channel determined to be idle, without waiting with a predetermined probability until the transmission inhibition time elapses.

24. The wireless packet communication apparatus according to any one of claims 16 or 17, characterized in that when transmission data is generated, the physical carrier sense unit and the virtual carrier sense unit of said transmit-side STA transmit a wireless packet using said wireless channel determined to be idle after waiting until all the wireless channels are determined to be idle.

25. The wireless packet communication apparatus according to any one of claims 16 or 17, characterized in that:

when transmission data is generated, the physical carrier sense unit and the virtual carrier sense unit of said transmit-side STA transmit a wireless packet using said wireless channel determined to be idle after waiting until all the wireless channels are determined to be idle; or when the longest transmission inhibition time of the set transmission inhibition time of the wireless channels is greater than or equal to a predetermined threshold value, the physical carrier sense unit and the virtual carrier sense unit transmit a wireless packet using said wireless channel determined to be idle without waiting until the transmission inhibition time elapses.

26. The wireless packet communication apparatus according to any one of claims 16 or 17, characterized in that when transmission data is generated, the physical carrier sense unit and the virtual carrier sense unit of said transmit-side STA transmit a wireless packet using said wireless channel determined to be idle after waiting or without waiting with a predetermined probability until all the wireless channels are determined to be idle.

27. The wireless packet communication apparatus according to any one of claims 16 or 17, characterized in that:

said receive-side STA includes a unit which sets transmission inhibition time to a wireless channel receiving a wireless packet when the received wireless packet has the set transmission inhibition time, and which transmits an ACK packet to said transmit-side STA when a wireless packet directed to the own STA has been normally received, the ACK packet including the transmission inhibition time set in the paired wireless channel; and said transmit-side STA includes a unit which updates the transmission inhibition time set for the paired wireless channel to transmission inhibition time of a paired wireless channel included in a corresponding ACK packet when receiving the ACK packet within a predetermined period of time after having transmitted said wireless packet.

28. The wireless packet communication apparatus according to claim 22, characterized in that:

when there are wireless channels having the set transmission inhibition time, when there is a wireless channel having set transmission inhibition time smaller than a predetermined threshold value, the virtual carrier sense unit of said transmit-side STA transmits a wireless packet using said wireless channel determined to be idle after waiting until the transmission inhibition time elapses; or when no wireless channel has set transmission inhibition time smaller than the predetermined threshold value, the virtual carrier sense unit of said transmit-side STA transmits a wireless packet using said wireless channel determined to be idle without waiting until the transmission inhibition time elapses.

29. The wireless packet communication apparatus according to claim 28, characterized in that
the virtual carrier sense unit of said transmit-side STA returns to determine whether there is a wireless channel having the set transmission inhibition time or whether all the wireless channels are idle, after waiting until the transmission inhibition time elapses when there are wireless channels having the set transmission inhibition time and there is a wireless channel having set transmission inhibition time smaller than a predetermined threshold value.

30. The wireless packet communication apparatus according to claim 25, characterized in that:
when there are wireless channels having the set transmission inhibition time,
when there is a wireless channel having set transmission inhibition time smaller than a predetermined threshold value, the virtual carrier sense unit of said transmit-side STA transmits a wireless packet using said wireless channel determined to be idle after waiting until the transmission inhibition time elapses; or
when no wireless channel has set transmission inhibition time smaller than the predetermined threshold value, the virtual carrier sense unit of said transmit-side STA transmits a wireless packet using said wireless channel determined to be idle without waiting until the transmission inhibition time elapses.

31. The wireless packet communication apparatus according to claim 30, characterized in that
the virtual carrier sense unit of said transmit-side STA returns to determine whether there is a wireless channel having the set transmission inhibition time or whether all the wireless channels are idle, after waiting until the transmission inhibition time elapses when there are wireless channels having the set transmission inhibition time and there is a wireless channel having set transmission inhibition time smaller than a predetermined threshold value.

32. A wireless packet communication apparatus comprising: one transceiver which multiplexes a plurality of sub-channels into one wireless channel for transmission and reception; a physical carrier sense unit which determines whether each of said sub-carriers is busy or idle from received power; and a virtual carrier sense unit which determines each of said sub-carriers to be busy during set transmission inhibition time, wherein said transceiver assigns, for simultaneous transmission and reception, a plurality of wireless packets respectively to a plurality of sub-channels determined to be idle by both said physical carrier sense unit and said virtual carrier sense unit, the apparatus characterized in that
said virtual carrier sense unit sets time (Tmax+Ts) as transmission inhibition time to sub-channels other than a sub-channel which requires longest transmission time Tmax among sub-channels used for simultaneous transmission and reception, the time (Tmax+Ts) obtained by adding a predetermined time Ts to the longest transmission time Tmax
when an existing set transmission inhibition time is smaller than the time (Tmax+Ts), said virtual carrier sense unit sets the time (Tmax+Ts) to said sub-channel as a new transmission inhibition time.

33. The wireless packet communication method according to claim 32, characterized by further comprising:
when there are wireless channels having the set transmission inhibition time,
transmitting, by said transmit-side STA, a wireless packet using said wireless channel determined to be idle after waiting until the transmission inhibition time elapses when there is a wireless channel having set transmission inhibition time smaller than a predetermined threshold value; or
transmitting, by said transmit-side STA, a wireless packet using said wireless channel determined to be idle without waiting until the transmission inhibition time elapses when no wireless channel has set transmission inhibition time smaller than the predetermined threshold value.

34. The wireless packet communication method according to claim 33, characterized by further comprising
said transmit-side STA's returning to determine whether there is a wireless channel having the set transmission inhibition time or whether all wireless channels are idle, after waiting until the transmission inhibition time elapses when there are wireless channels having the set transmission inhibition time and there is a wireless channel having set transmission inhibition time smaller than a predetermined threshold value.

* * * * *

UNITED STATES PATENT AND TRADEMARK OFFICE
CERTIFICATE OF CORRECTION

| | | |
|---|---|---|
| PATENT NO. | : 7,545,781 B2 | Page 1 of 1 |
| APPLICATION NO. | : 10/549242 | |
| DATED | : June 9, 2009 | |
| INVENTOR(S) | : Otsuki et al. | |

It is certified that error appears in the above-identified patent and that said Letters Patent is hereby corrected as shown below:

On the cover page,

Item [*] Notice: Subject to any disclaimer, the term of this patent is extended or adjusted under 35 USC 154(b) by (527) days Delete the phrase "by 527 days" and insert -- by 797 days --

Signed and Sealed this

Thirty-first Day of August, 2010

David J. Kappos
*Director of the United States Patent and Trademark Office*